(12) United States Patent
Jaeger

(10) Patent No.: US 10,487,881 B2
(45) Date of Patent: Nov. 26, 2019

(54) COLLET LOCKING YOKE

(71) Applicant: Actuant Corporation, Menomonee Falls, WI (US)

(72) Inventor: Daryl Jaeger, West Bend, WI (US)

(73) Assignee: Weasler Engineering, Inc., West Bend, WI (US)

( * ) Notice: Subject to any disclaimer, the term of this patent is extended or adjusted under 35 U.S.C. 154(b) by 304 days.

(21) Appl. No.: 15/407,087

(22) Filed: Jan. 16, 2017

(65) Prior Publication Data

US 2017/0204913 A1    Jul. 20, 2017

Related U.S. Application Data

(60) Provisional application No. 62/279,307, filed on Jan. 15, 2016.

(51) Int. Cl.
*F16D 3/38* (2006.01)
*F16D 1/10* (2006.01)

(52) U.S. Cl.
CPC ........ *F16D 3/387* (2013.01); *F16D 2001/102* (2013.01)

(58) Field of Classification Search
CPC ... F16D 3/41; F16D 3/43; F16D 3/387; F16D 2001/102; F16D 2001/103; Y10T 403/7028; Y10T 403/7031; Y10T 403/7033; Y10T 403/7058
See application file for complete search history.

(56) References Cited

U.S. PATENT DOCUMENTS

| | | | | |
|---|---|---|---|---|
| 3,969,033 A | * | 7/1976 | Recker | A01B 71/08 403/322.2 |
| 4,075,872 A | * | 2/1978 | Geisthoff | F16C 3/035 464/167 |
| 4,254,639 A | * | 3/1981 | Teramachi | F16C 29/04 464/167 |
| 4,367,053 A | * | 1/1983 | Stratienko | F16D 1/094 403/371 |
| 5,580,184 A | * | 12/1996 | Riccitelli | F16D 1/0864 280/779 |

(Continued)

FOREIGN PATENT DOCUMENTS

| | | |
|---|---|---|
| DE | 10054384 | 5/2002 |
| DE | 102015212857 | 1/2016 |
| GB | 2292178 | 2/1996 |

OTHER PUBLICATIONS

PCT/US2017/013670 International Search Report and Written Opinion of the International Searching Authority dated Apr. 18, 2017 (11 pages).

*Primary Examiner* — Joshua T Kennedy
(74) *Attorney, Agent, or Firm* — Michael Best & Friedrich LLP

(57) ABSTRACT

An insert, a motion-transmitting mechanism and a method of operating a motion-transmitting mechanism. The insert may include an insert body receivable in a bore, the insert body having an outer surface at least partially engageable in a driving relationship with a bore surface, the insert body defining an insert bore operable to receive a shaft in a driving relationship, torque transmission between the shaft and the motion-transmitting member through the insert body causing a portion of the insert body to compress toward the shaft.

20 Claims, 82 Drawing Sheets

(56) References Cited

U.S. PATENT DOCUMENTS

| | | | | |
|---|---|---|---|---|
| 5,628,578 A | * | 5/1997 | McClanahan | B62D 1/16 |
| | | | | 403/13 |
| 5,632,568 A | * | 5/1997 | Fechter | F16D 1/116 |
| | | | | 403/325 |
| 5,730,546 A | * | 3/1998 | Kato | F01D 5/025 |
| | | | | 403/179 |
| 5,762,556 A | * | 6/1998 | Kurian | F16D 1/0864 |
| | | | | 464/160 |
| 5,779,385 A | | 7/1998 | Fechter | |
| 6,712,544 B2 | * | 3/2004 | Kruger | F16B 5/0233 |
| | | | | 403/370 |

* cited by examiner

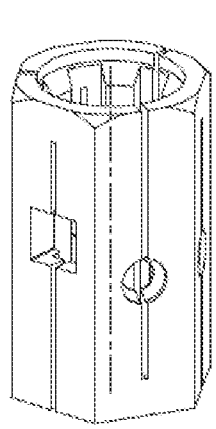
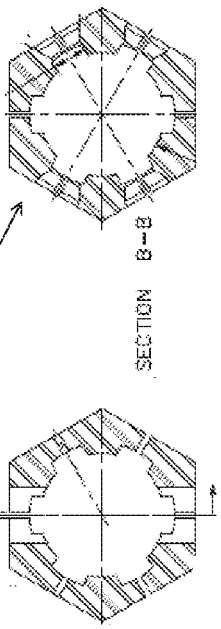
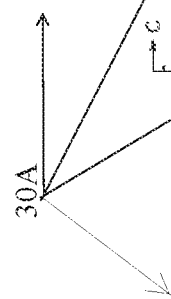
FIG.58C
FIG.58F
FIG.58E
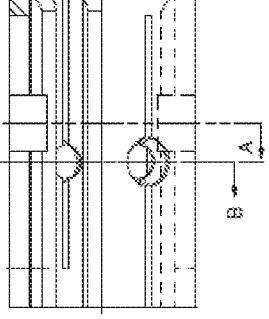
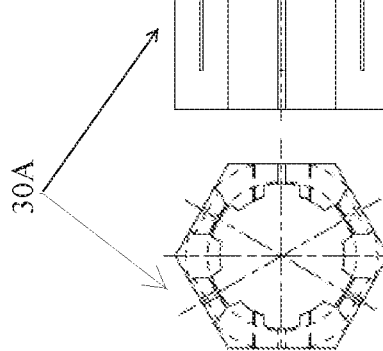
FIG.58A
FIG.58B
FIG.58D

COLLET LOCKING YOKE

RELATED APPLICATION

This application claims priority to prior-filed U.S. Provisional Patent Application No. 62/279,307, filed Jan. 15, 2016, the entire contents of which are incorporated by reference.

FIELD

This invention generally relates to a coupling for removable axial locking of a hub on a rotating power transmission shaft.

SUMMARY

In one independent aspect, an insert for a motion-transmitting mechanism may be provided. The motion-transmitting mechanism may include a member defining a bore with a bore surface, and a shaft. The insert may generally include an insert body receivable in the bore, the insert body having an outer surface at least partially engageable in a driving relationship with the bore surface, the insert body defining an insert bore operable to receive the shaft in a driving relationship, torque transmission between the shaft and the motion-transmitting member through the insert body causing a portion of the insert body to compress toward the shaft.

In another independent aspect, a motion-transmitting mechanism may generally include a motion-transmitting member defining a bore with a bore surface; a shaft; and an insert including an insert body receivable in the bore, the insert body having an outer surface and defining an insert bore operable to receive the shaft, engagement between the bore surface and the outer surface providing torque transmission between the insert and the motion-transmitting member and causing a portion of the insert body to compress toward the shaft.

In yet another independent aspect, a method of operating a motion-transmitting mechanism may be provided. The motion-transmitting mechanism may include a motion-transmitting member defining a bore with a bore surface, a shaft, and an insert, the insert having an insert body received in the bore, the insert body having an outer surface and defining an insert bore for receiving the shaft. The method may generally include transmitting torque between the shaft and the motion-transmitting member, transmitting including engaging the bore surface and the outer surface to transmit torque between the insert and the motion-transmitting member; and by torque transmitted between the insert and the motion-transmitting member, causing a portion of the insert body to compress toward the shaft.

In a further independent aspect, an insert for a yoke assembly may be provided. The assembly may include a yoke, and a hub connected to the yoke, the hub defining a bore with a bore surface. The insert may generally include an insert body receivable in the bore, the insert body having an outer surface at least partially engageable in a driving relationship with the bore surface, the insert body defining an insert bore operable to receive a shaft in a driving relationship, torque transmission between the shaft and the motion-transmitting member through the insert body causing a portion of the insert body to compress toward the shaft.

In another independent aspect, a yoke assembly may generally include a yoke; a hub connected to the yoke, the hub defining a bore with a bore surface; and an insert including an insert body receivable in the bore, the insert body having an outer surface at least partially engageable in a driving relationship with the bore surface, the insert body defining an insert bore operable to receive a shaft in a driving relationship, torque transmission between the shaft and the motion-transmitting member through the insert body causing a portion of the insert body to compress toward the shaft.

In a yet another independent aspect, a method of operating a yoke assembly may be provided. The assembly may include a yoke, a hub connected to the yoke, the hub defining a bore with a bore surface, and an insert including an insert body received in the bore, the insert body having an outer surface and defining an insert bore for receiving a shaft. The method may generally include transmitting torque between the shaft and the hub, transmitting including engaging the bore surface and the outer surface to transmit torque between the insert and the hub; and, by torque transmitted between the insert and the hub, causing a portion of the insert body to compress toward the shaft.

In a further independent aspect, a method of manufacturing an insert for a motion-transmitting mechanism may be provided. The motion-transmitting mechanism may include a motion-transmitting member defining a bore with a bore surface, and a shaft. The method may generally include providing bar stock having a polygonal outer surface, when the insert is formed, the outer surface being at least partially engageable in a driving relationship in the bore; cutting the bar stock to a length for the insert; forming an insert bore in the insert for receiving the shaft in a driving relationship, forming including providing a side wall having adjacent wall sections; and forming a slot in at least one wall section to accommodate compression of the insert, in operation, torque transmission between the shaft and the motion-transmitting member through the insert causing a portion of the insert to compress toward the shaft.

Other independent features and independent aspects of the invention will become apparent by consideration of the following detailed description, claims and accompanying drawings.

BRIEF DESCRIPTION OF THE DRAWINGS

FIG. 58A is a front view of the insert of FIG. 46.

FIG. 58B is a top view of the insert of FIG. 46.

FIG. 58C is a perspective view of the insert of FIG. 46.

FIG. 58D is a cross-sectional view of the insert of FIG. 46, taken along the line C-C in FIG. 58E.

FIG. 58E is a cross-sectional view of the insert of FIG. 46, taken along the line A-A in FIG. 58D.

FIG. 58F is a cross-sectional view of the insert of FIG. 46, taken along the line B-B in FIG. 58D.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Figure 1:
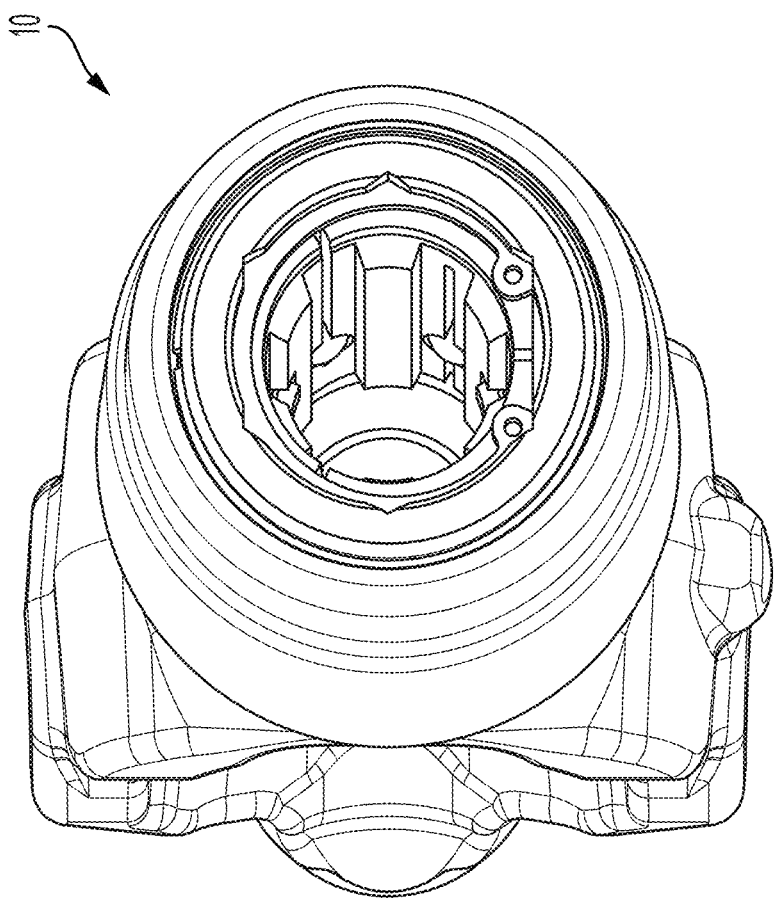
FIG. 1 is a front perspective view of a collet locking yoke.
Figure 2:
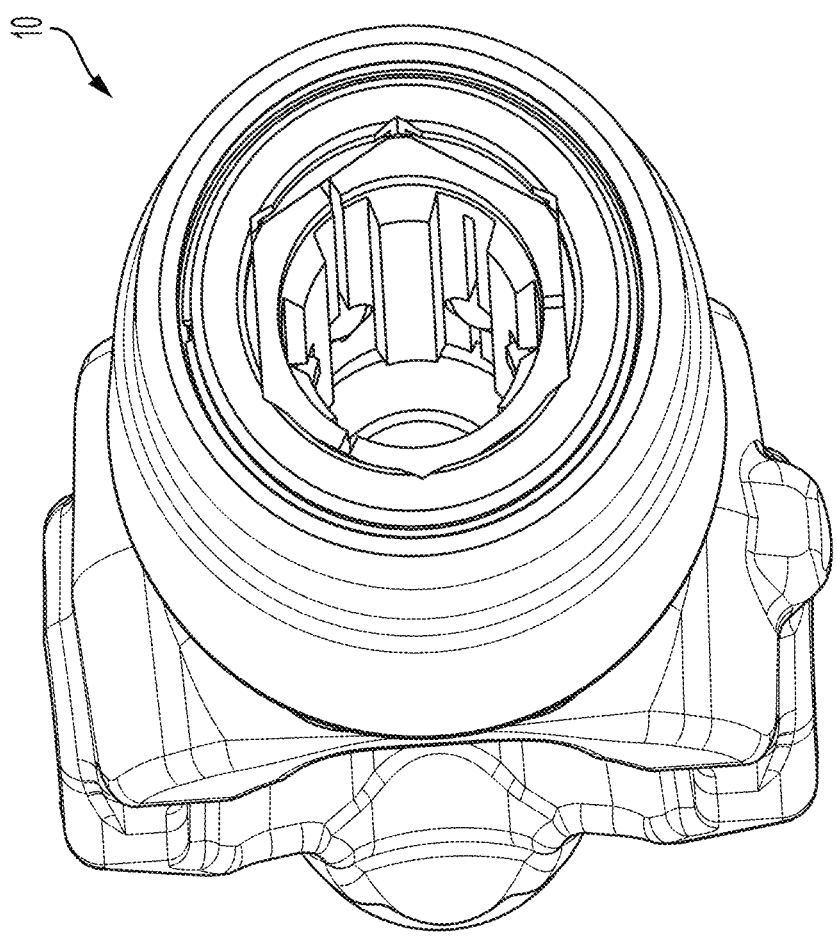
FIG. 2 is another front perspective view of the yoke of FIG. 1 with the insert retaining ring removed.
Figure 3:
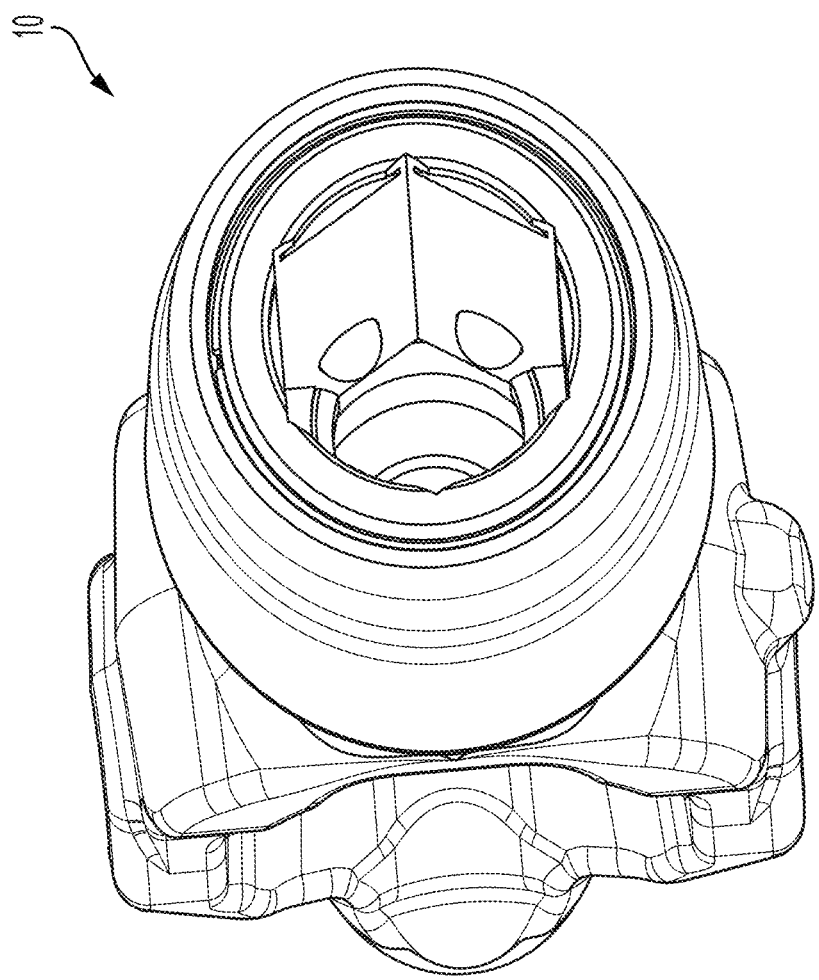
FIG. 3 is a front perspective view of the yoke of FIG. 1 with the insert removed.
Figure 4:
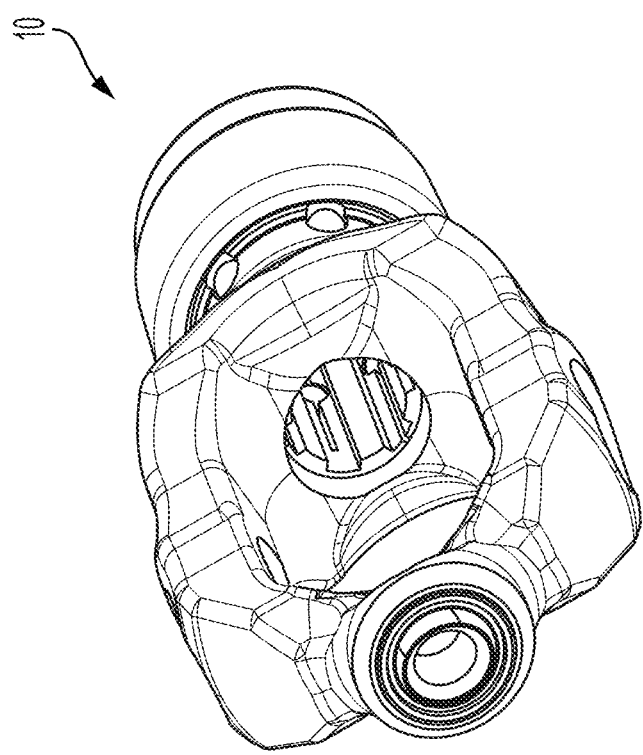
FIG. 4 is a rear perspective view of the yoke of FIG. 1.
Figure 82:
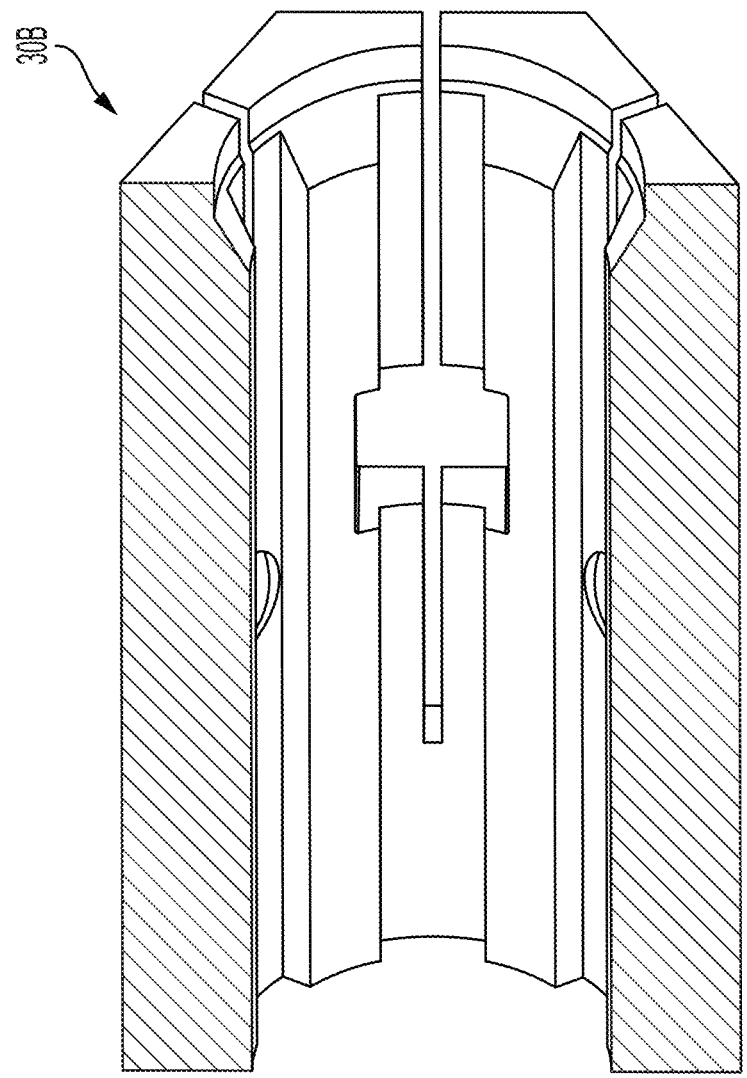
FIG. 82 is another cross-sectional view of the insert of FIG. 73.

FIGS. 1-82 illustrate motion transmitting mechanisms and components, such as yoke assemblies for coupling a farm implement to a tractor. Exemplary devices are shown and described in U.S. Pat. No. 5,779,385, filed Jan. 16, 1997, the entire contents of which are hereby incorporated by reference.

Referring to FIGS. 1-30, a collet locking yoke 10 generally includes a yoke 14, a hub 18, and a collar 22 slidable on the hub 18. The illustrated hub 18 defines a hub bore 26 which receives an insert 30 through an end 102, and a retaining ring 168 abuts the front end 40 of the insert 30 and the hub bore 26 proximate the front end 102. The opposite end 106 of the hub 18 mates with an end 110 of the yoke 14. The hub 18 defines a number of radial openings 68 and 72, and an outer surface of the hub 18 also defines a circumferential groove 148 proximate the front end 102.

Figure 16:
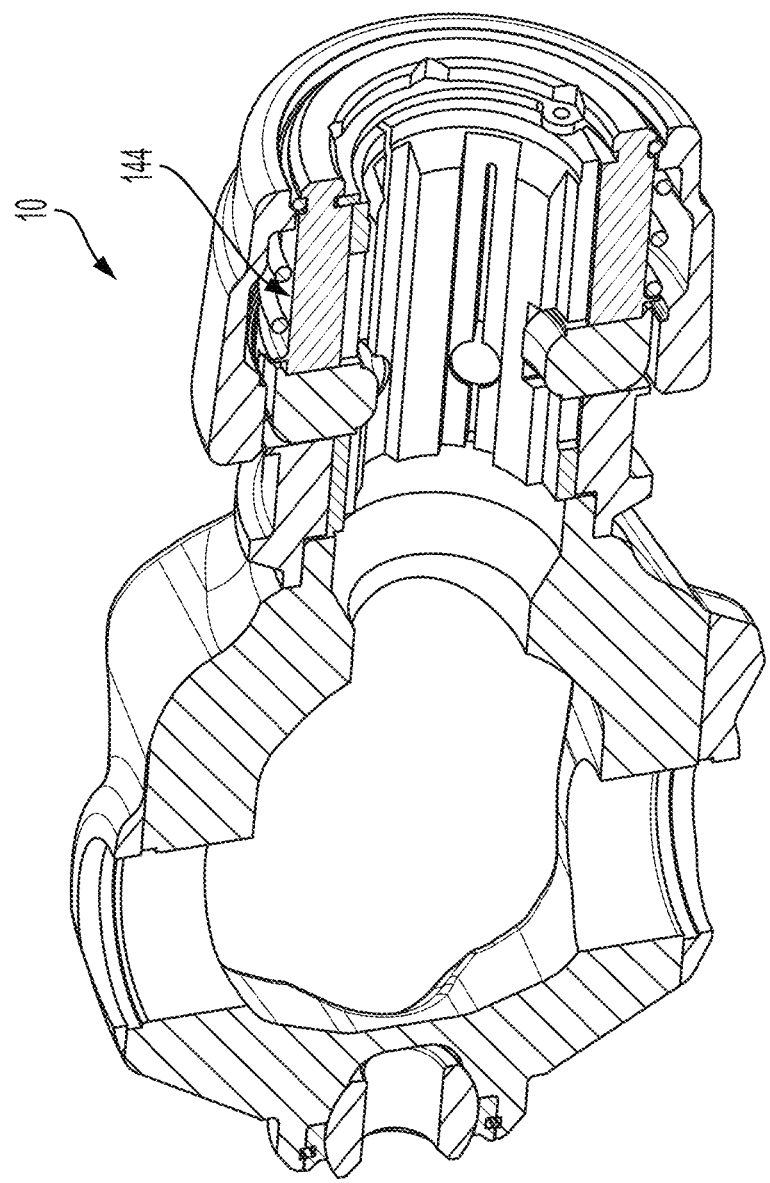
FIG. 16 is a cross-sectional view of the yoke of FIG. 1, taken generally in a vertical plane through the axis.
Figure 17:
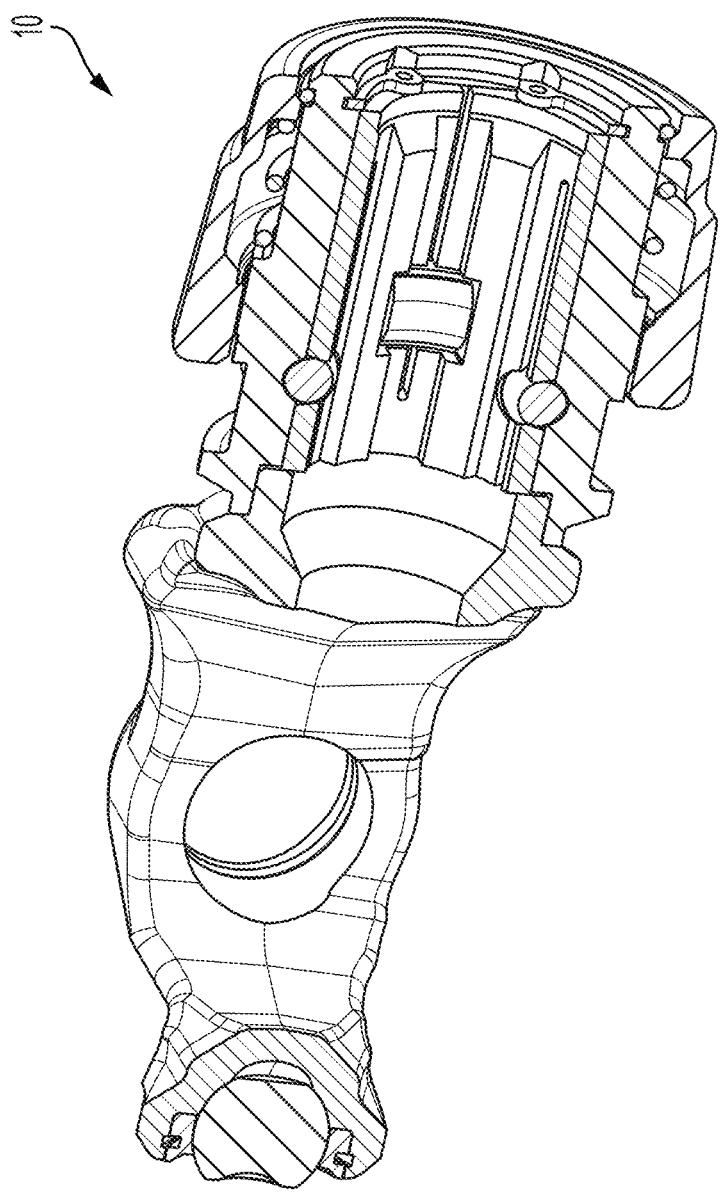
FIG. 17 is a cross-sectional view of the yoke of FIG. 1, taken generally in a horizontal plane through the axis.
Figure 18:
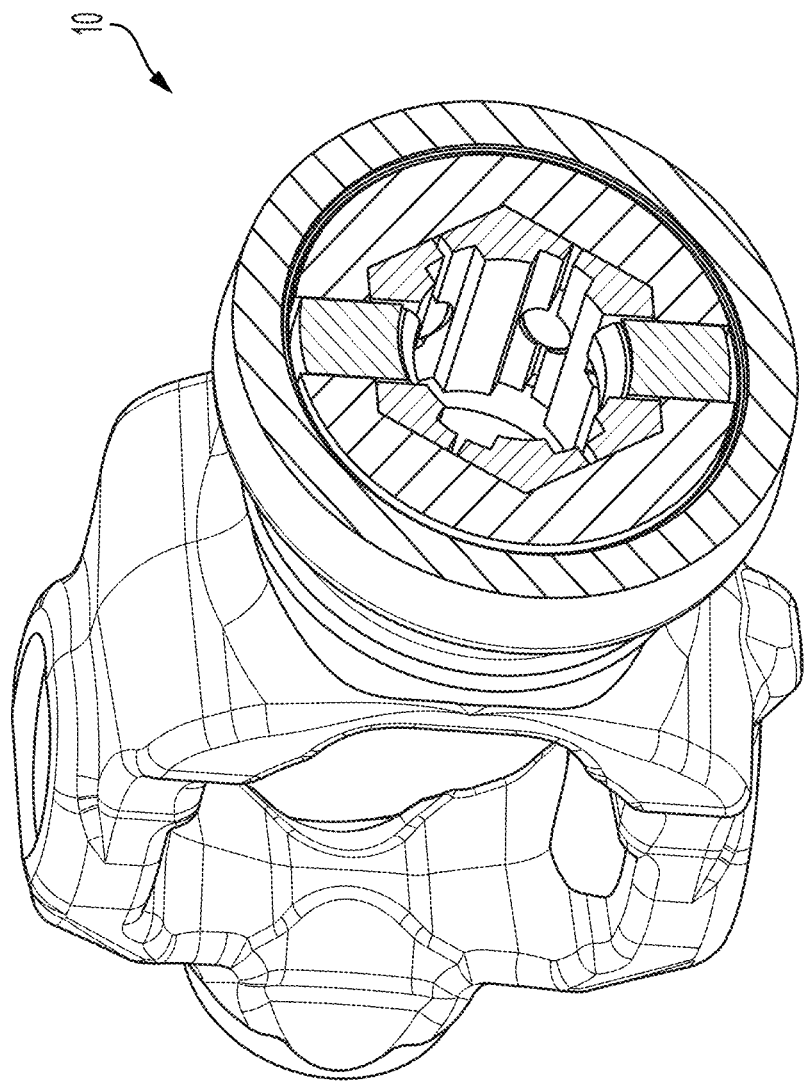
FIG. 18 is a cross-sectional view of the yoke of FIG. 1, taken generally through the shaft retaining pawls.
Figure 19:
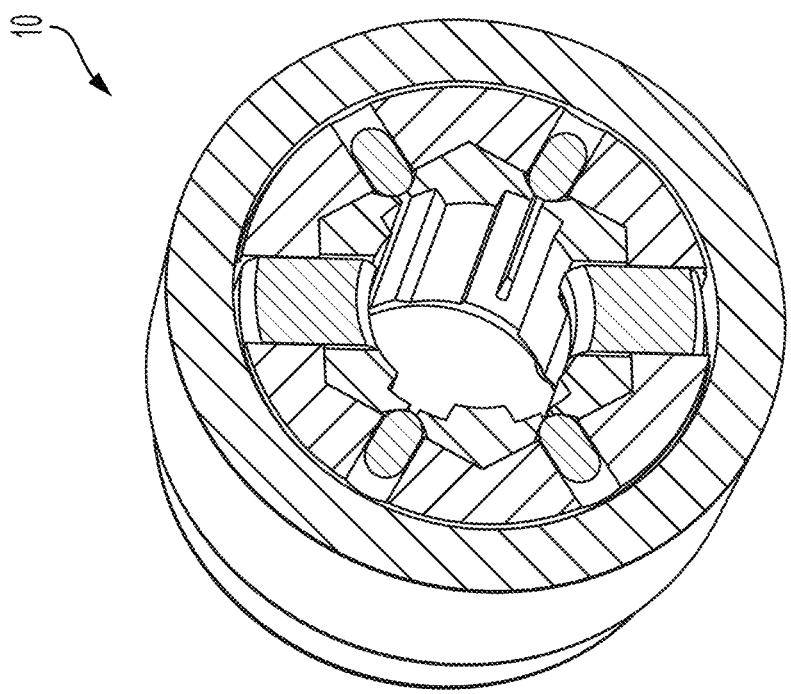
FIG. 19 is a cross-sectional view of the yoke of FIG. 1, taken generally through the insert retaining members and the shaft retaining pawls.
Figure 20:
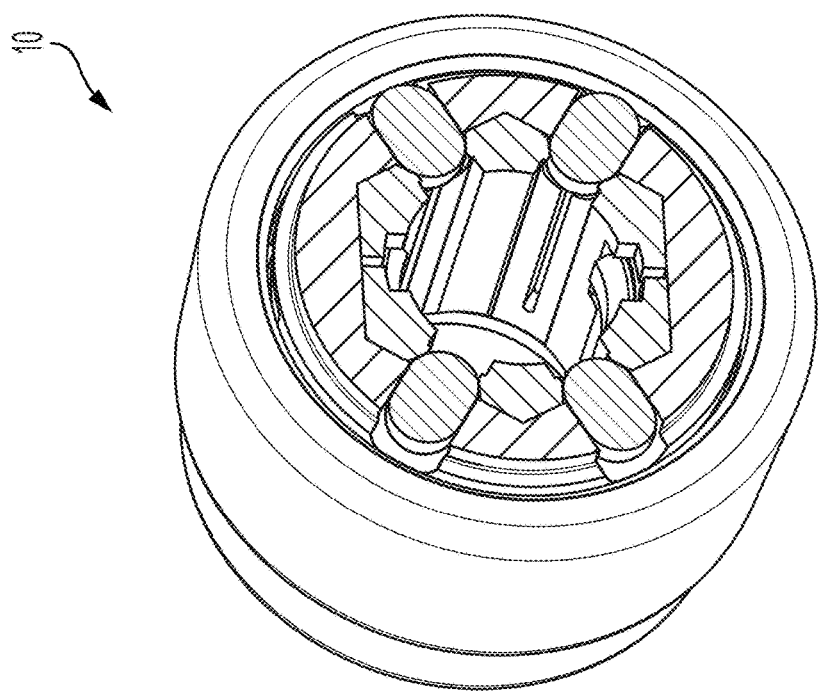
FIG. 20 is a cross-sectional view of the yoke of FIG. 1, taken generally through the insert retaining members.
Figure 21:
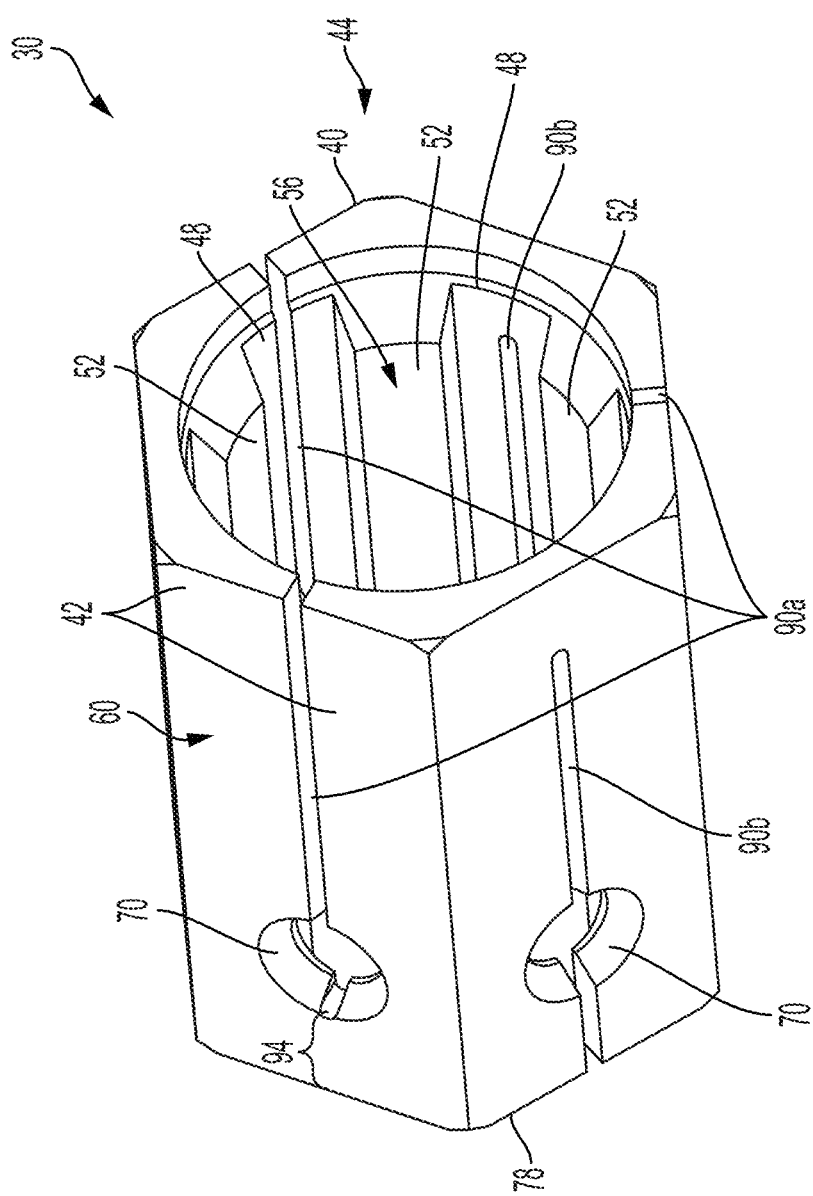
FIG. 21 is a perspective view of an insert of the yoke of FIG. 1.
Figure 22:
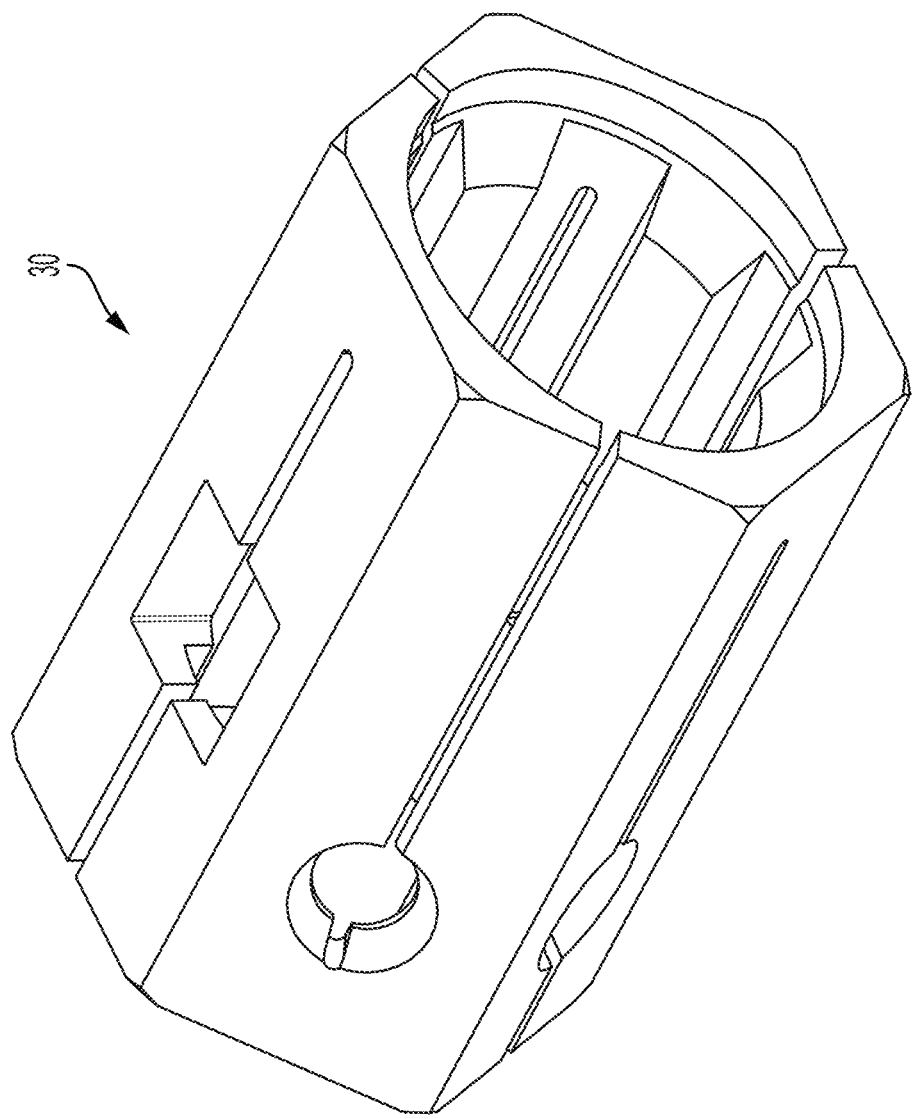
FIG. 22 is another perspective view of the insert of FIG. 21.

The collar 22 (see FIGS. 5-7) is annular and has opposite ends 114, 118. The rear end 118 is larger in diameter than the front end 114. As best shown in FIGS. 16-17, the collar 22 has an outer surface 122 that expands from the front end 114 to the rear end 118. Further, the collar 22 has an inner surface 140 defining (see FIG. 16) a pocket 144 between the ends 114, 118. A snap ring 160 fits within the circumferential groove 148 in the hub 18. A spring 164 (i.e., a compression spring), shown in FIGS. 16-17, abuts the outer surface 122 of the hub 18 and extends from the inner surface 140 of the collar 22 to a radially-outwardly extending ridge of the hub 18.

The insert 30 is shaped and sized to receive a splined shaft (not shown) through an end 40 of the insert 30. In the illustrated construction, the splined shaft may be, for example, a six-spline power take off (PTO) shaft of a tractor. As best shown in FIGS. 21-24, the insert 30 has a side wall 42 and defines an insert bore 44 defining insert grooves 48 separated by radially-inward extending splines 52. The splines 52 have generally trapezoidal-shaped cross-sections and sloped surfaces facing towards the end 40. The insert bore 44, the grooves 48, and the splines 52 together define an inner surface 56 which mates with the shaft.

Figure 23:
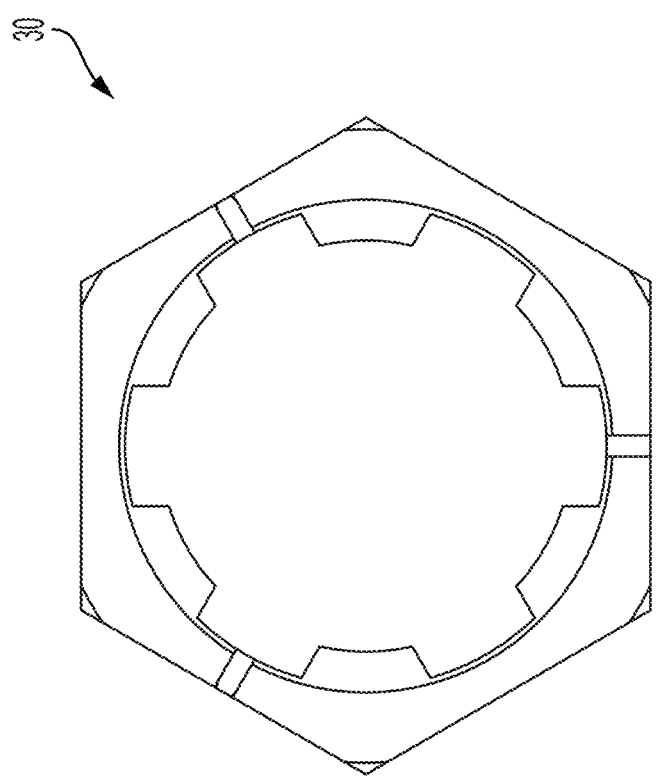
FIG. 23 is a front view of the insert of FIG. 21.
Figure 24:
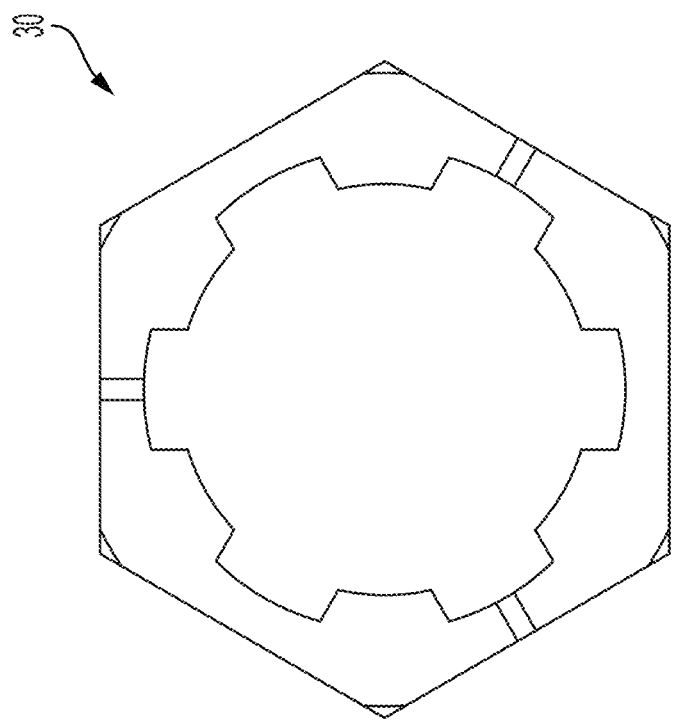
FIG. 24 is a rear view of the insert of FIG. 21.
Figure 25:
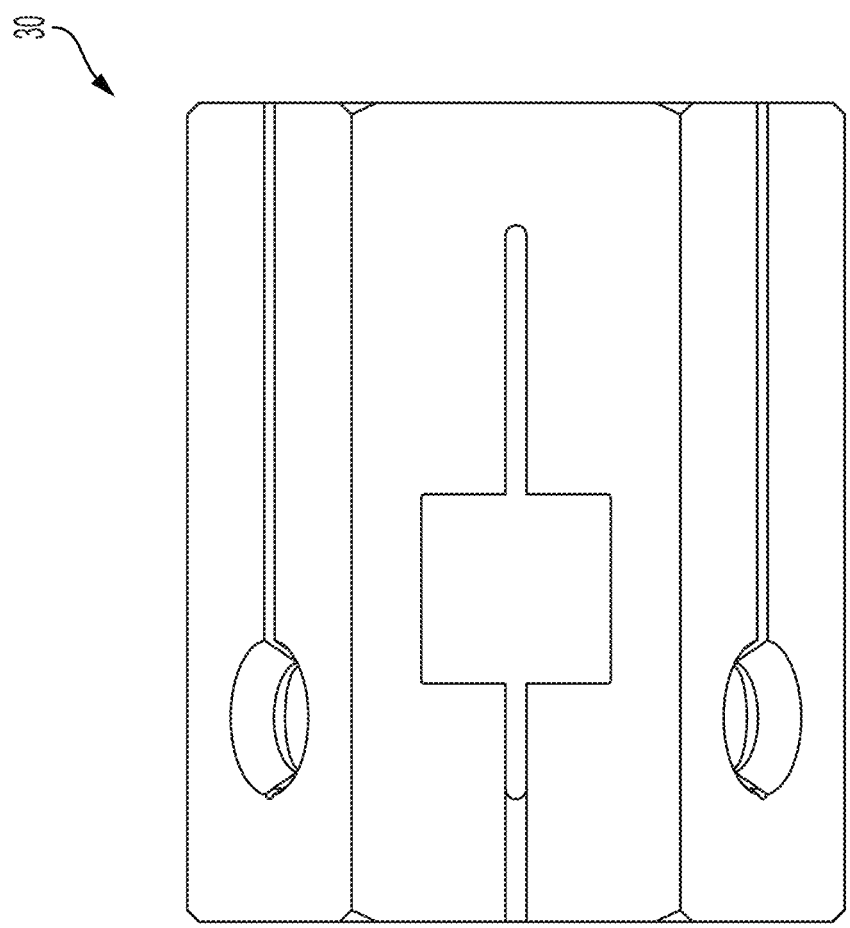
FIG. 25 is a top view of the insert of FIG. 21.
Figure 26:
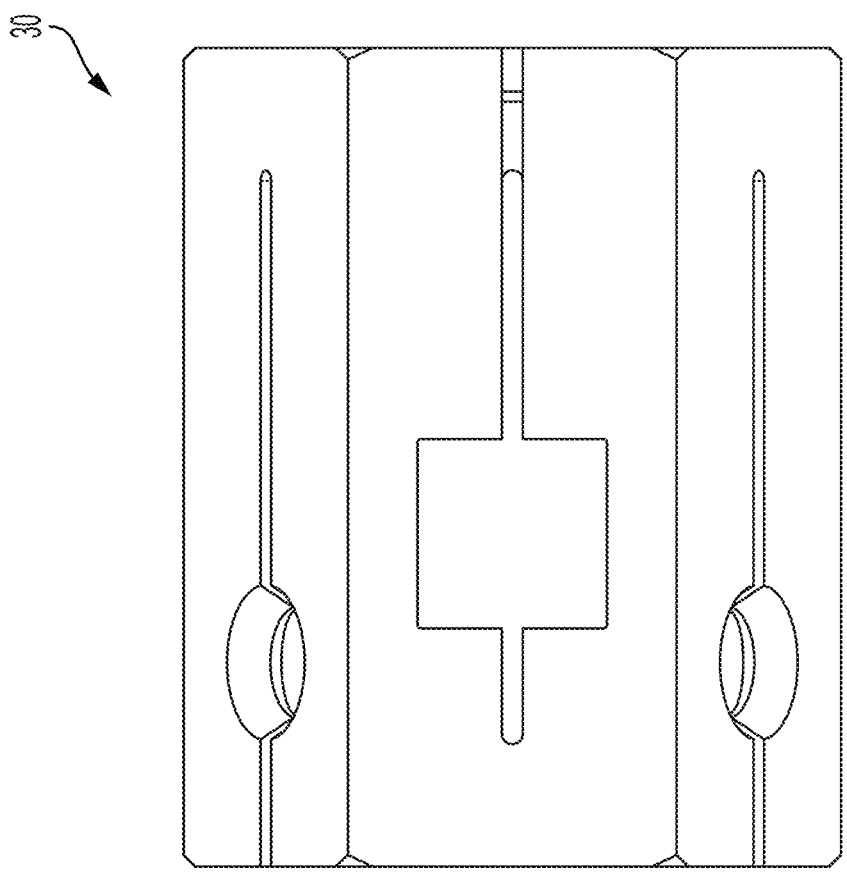
FIG. 26 is a bottom view of the insert of FIG. 21.
Figure 27:
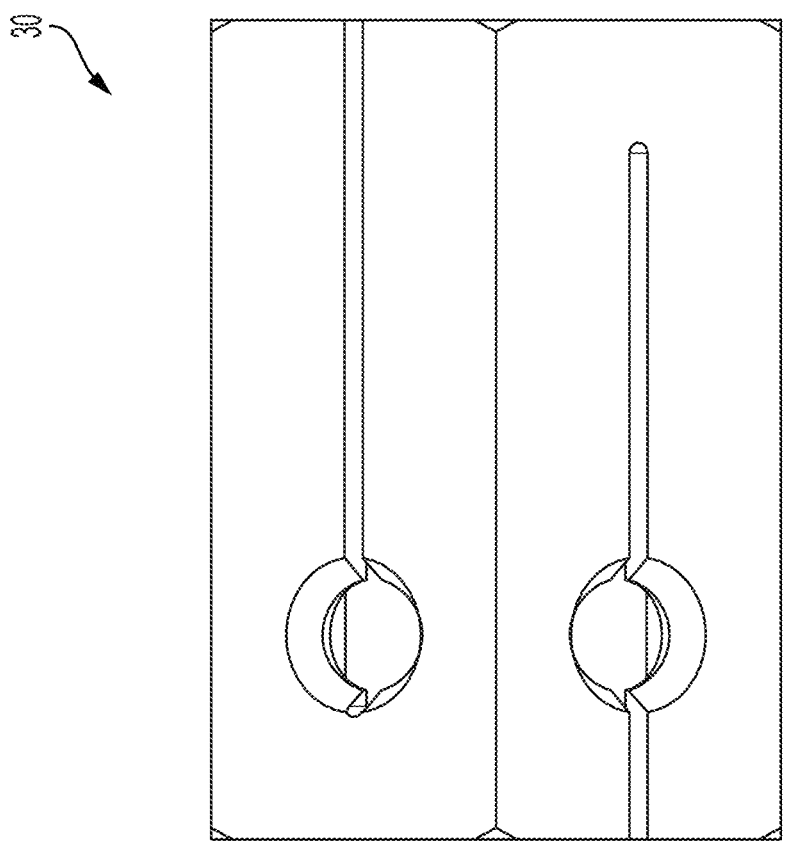
FIG. 27 is a side view of the insert of FIG. 21.
Figure 28:
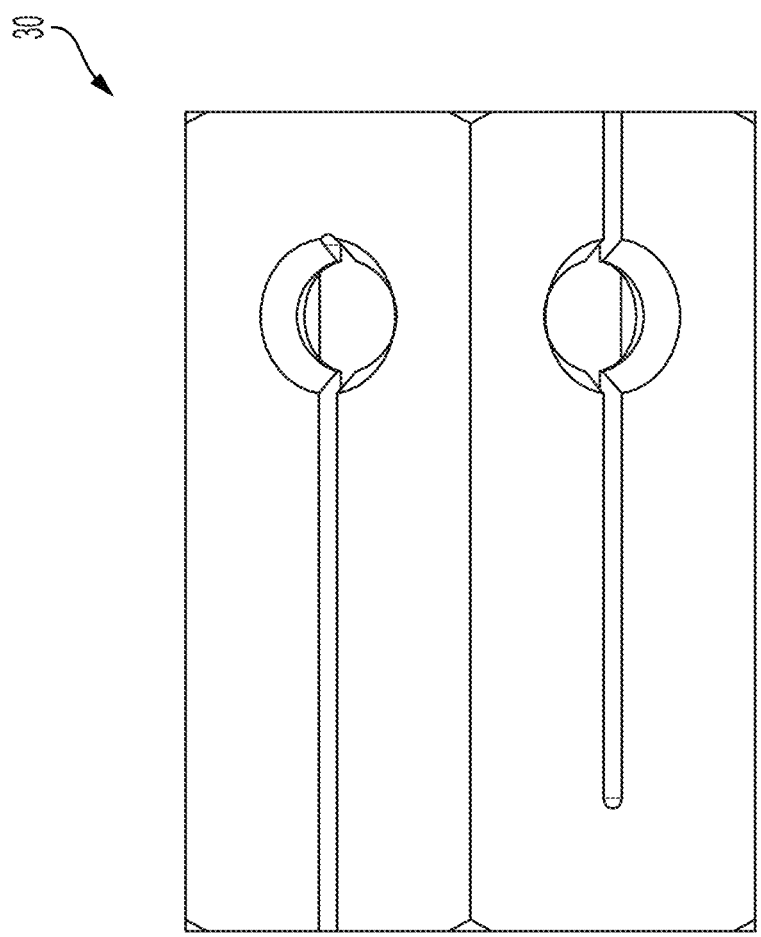
FIG. 28 is an opposite side view of the insert of FIG. 21.
Figure 29:
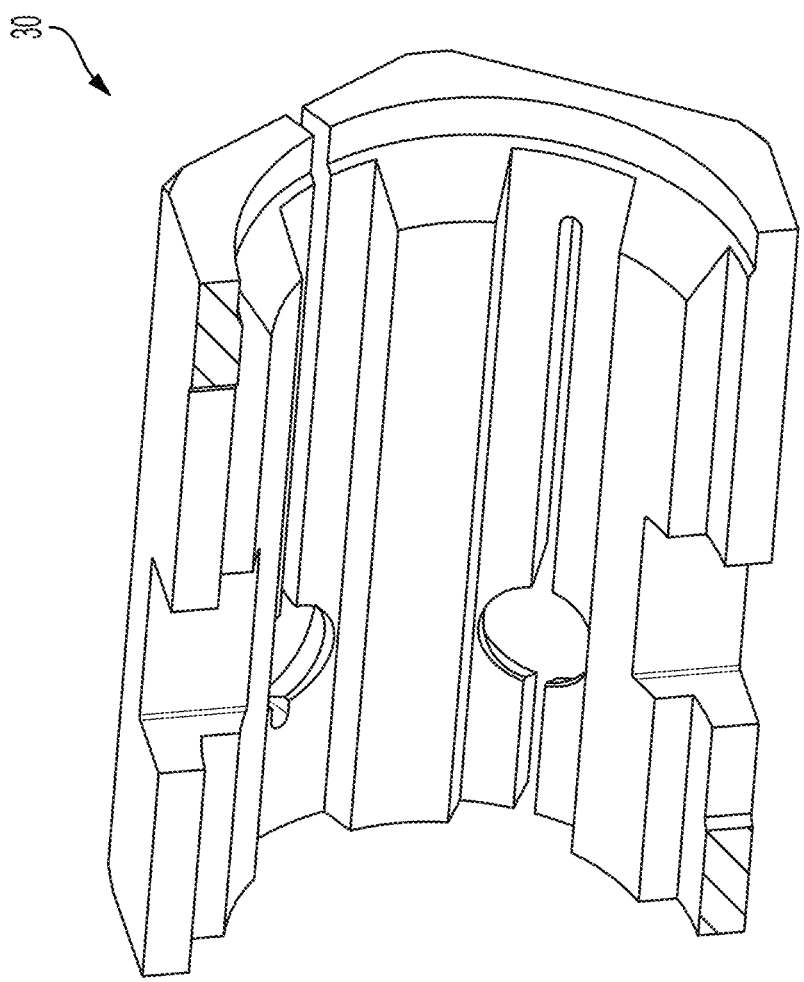
FIG. 29 is a cross-sectional view of the insert of FIG. 21.
Figure 30:
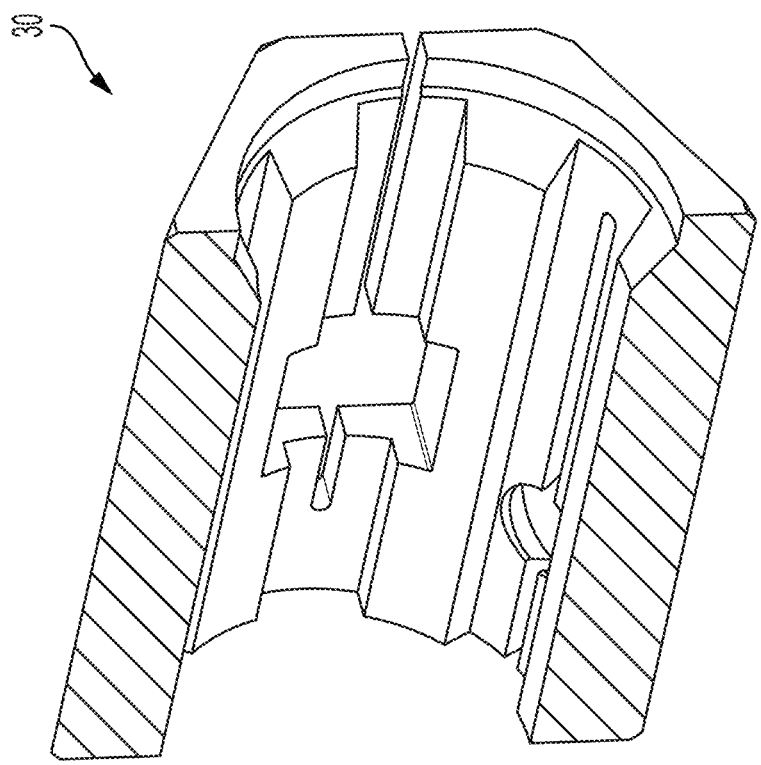
FIG. 30 is another cross-sectional view of the insert of FIG. 21.
Figure 31:
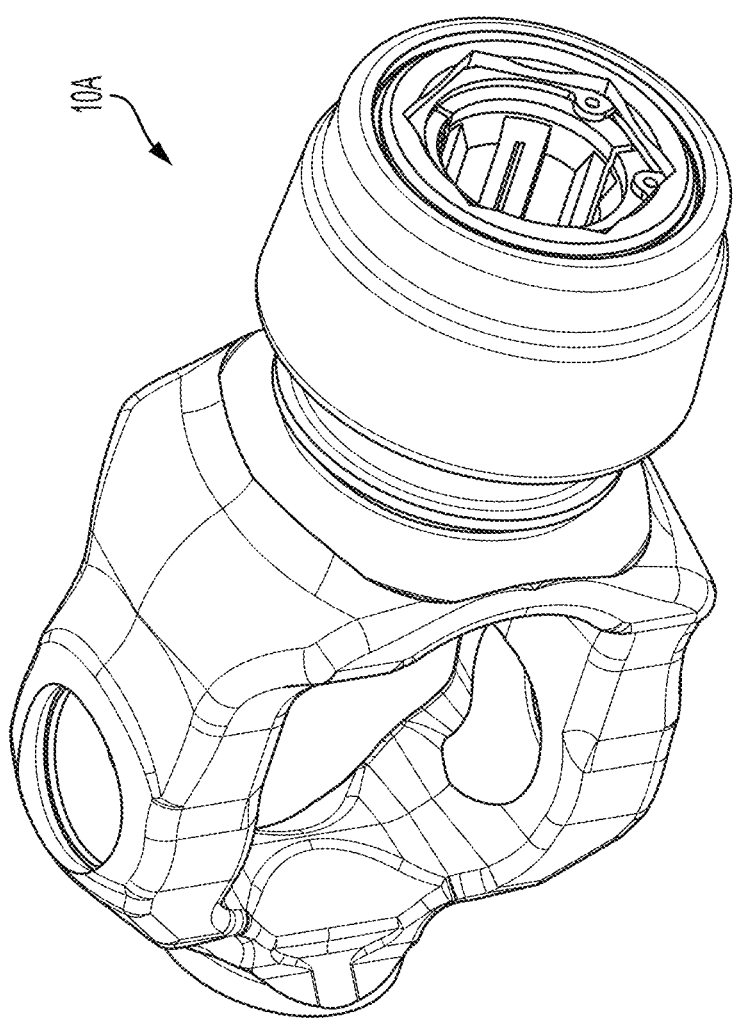
FIG. 31 is a front perspective view of an alternative construction of a collet locking yoke.
Figure 32:
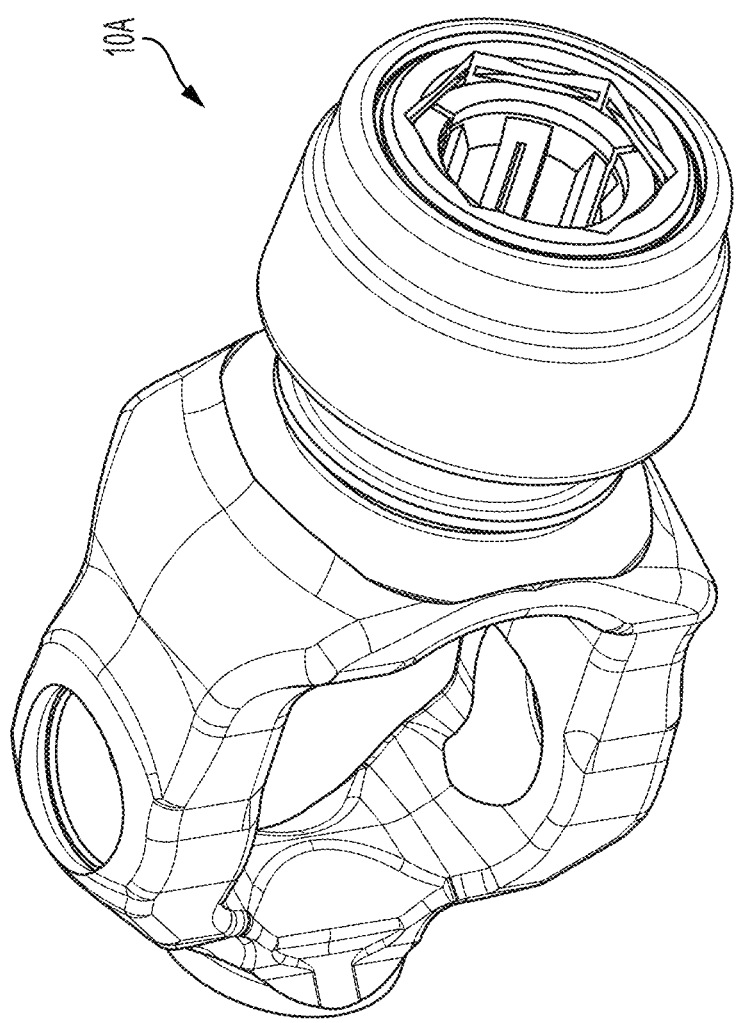
FIG. 32 is a front perspective view of the yoke of FIG. 31 with the retaining ring removed.
Figure 33:
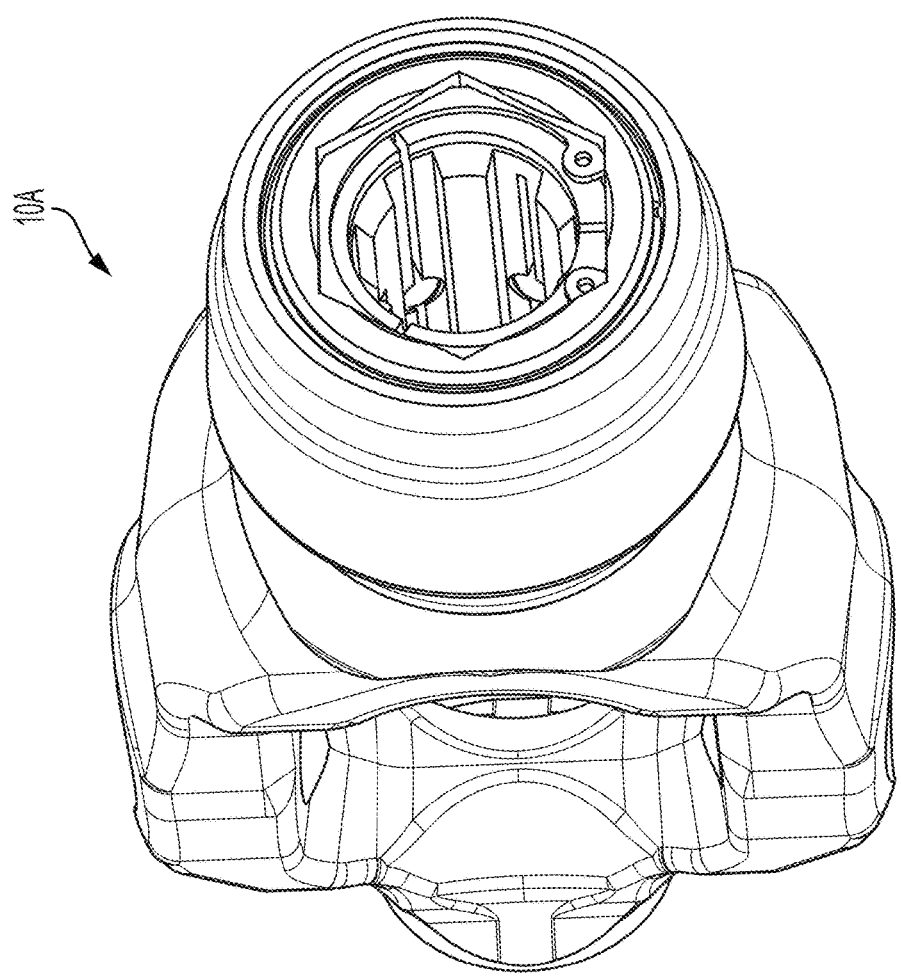
FIG. 33 is another front perspective view of the yoke of FIG. 31.
Figure 34:
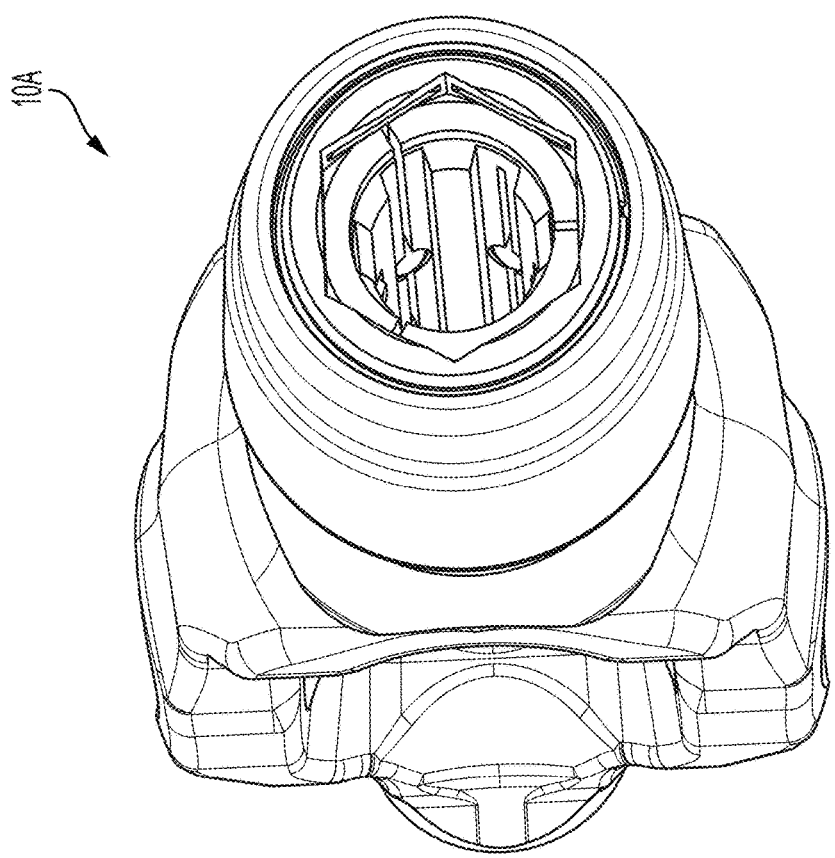
FIG. 34 is a front perspective view of the yoke of FIG. 31 with the retaining ring removed.
Figure 35:
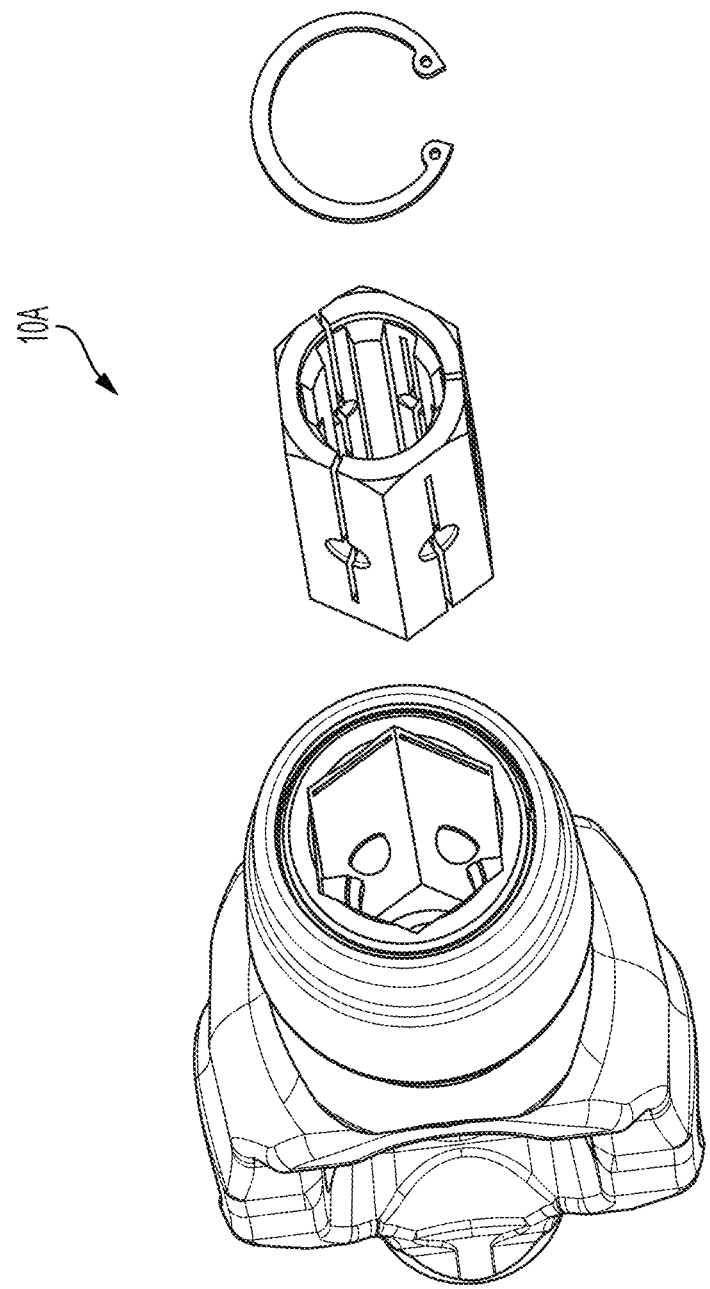
FIG. 35 is a front perspective view of the yoke of FIG. 31 with the insert and the retaining ring removed.
Figure 36:
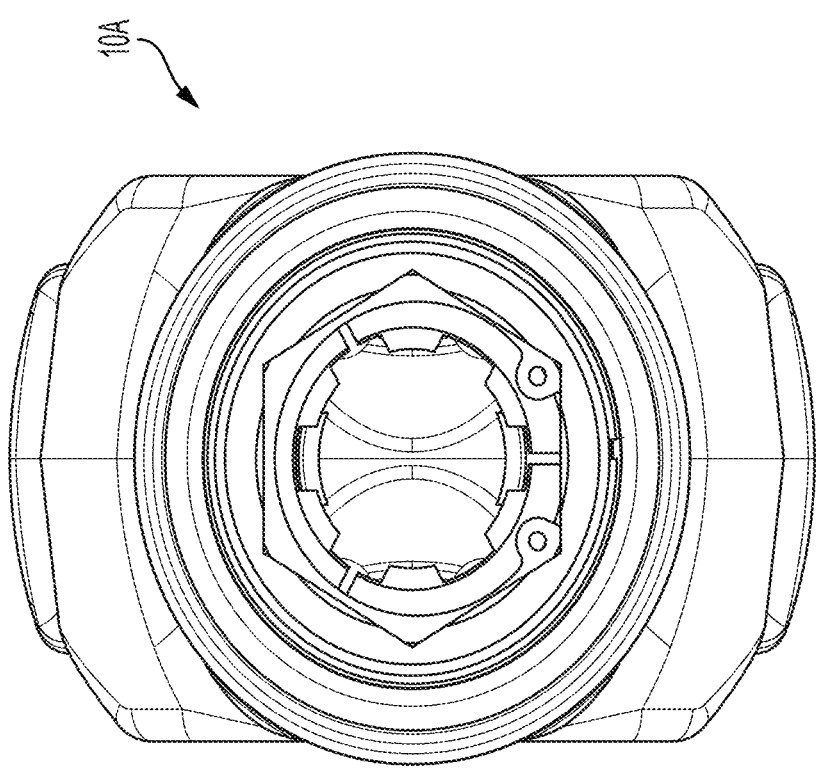
FIG. 36 is a front view of the yoke of FIG. 31.
Figure 37:
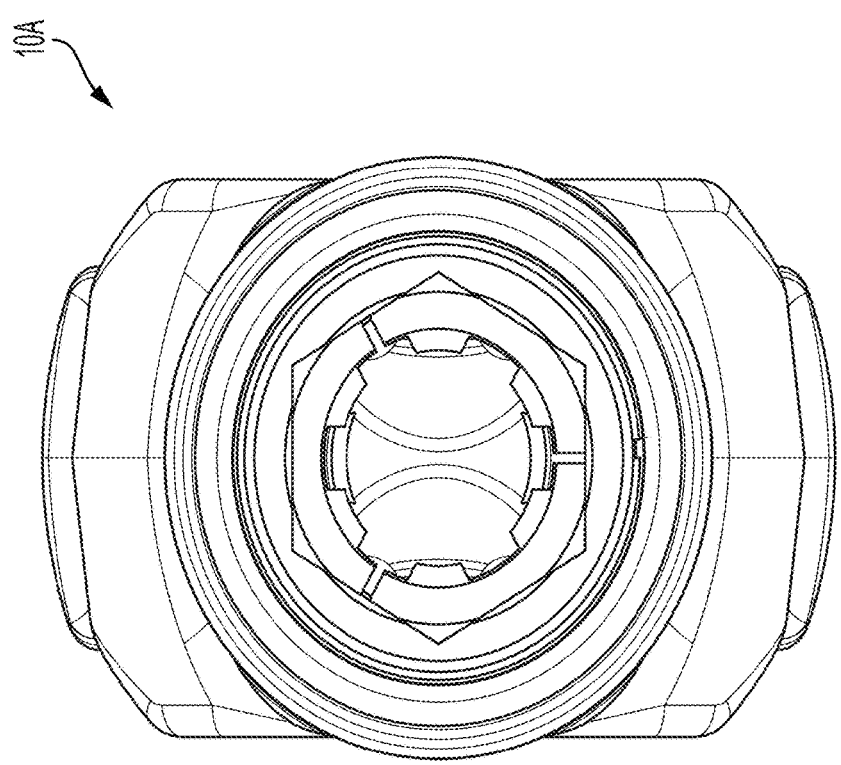
FIG. 37 is a front view of the yoke of FIG. 31 with the retaining ring removed.
Figure 38:
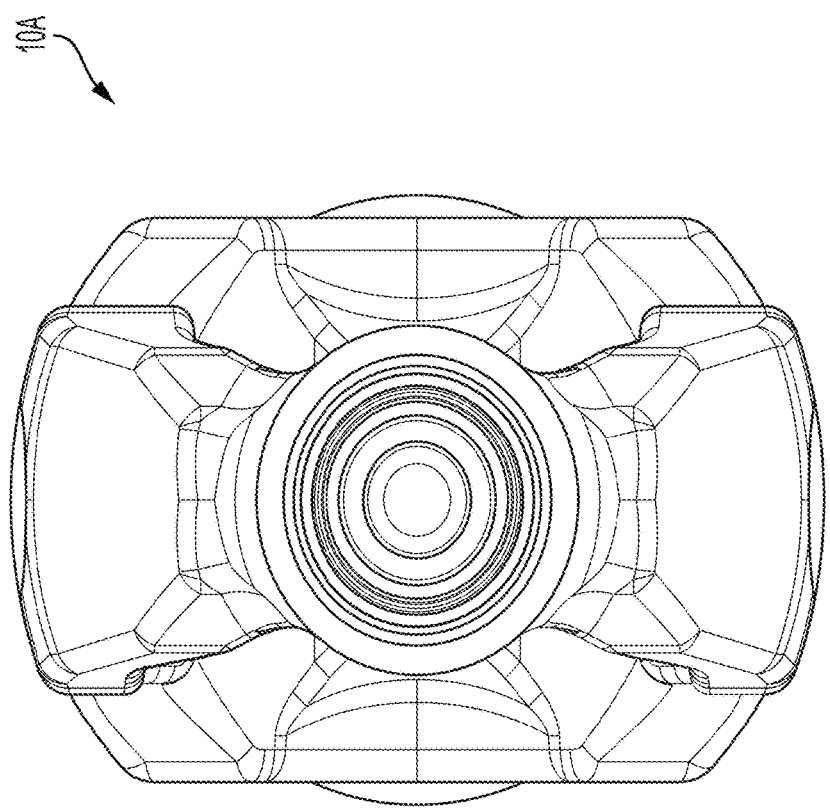
FIG. 38 is a rear view of the yoke of FIG. 31.
Figure 39:
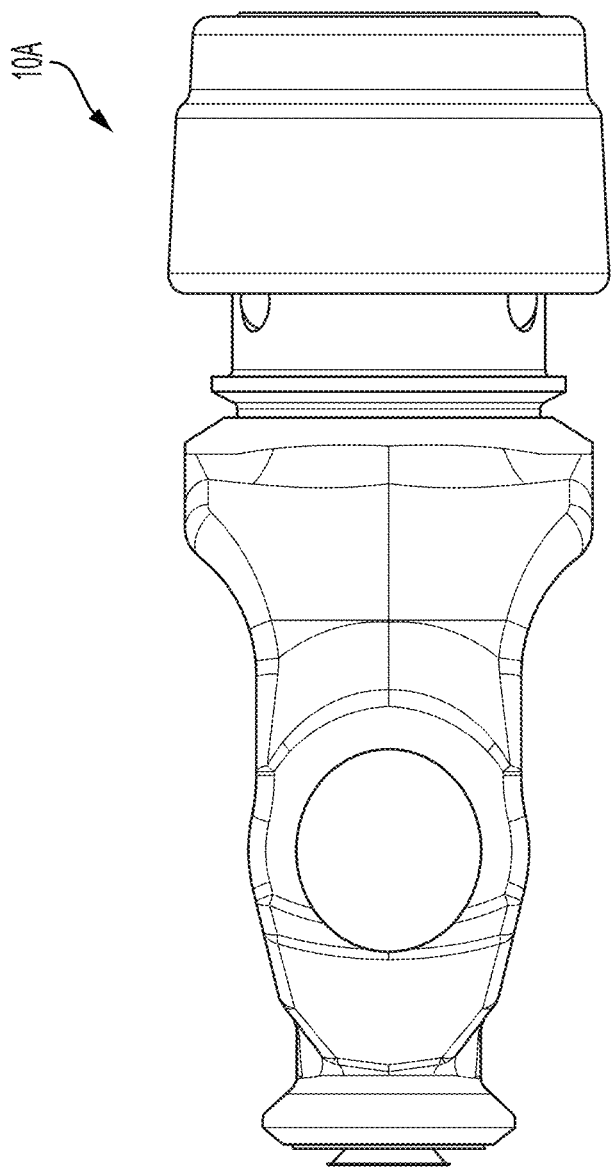
FIG. 39 is a top view of the yoke of FIG. 31.
Figure 40:
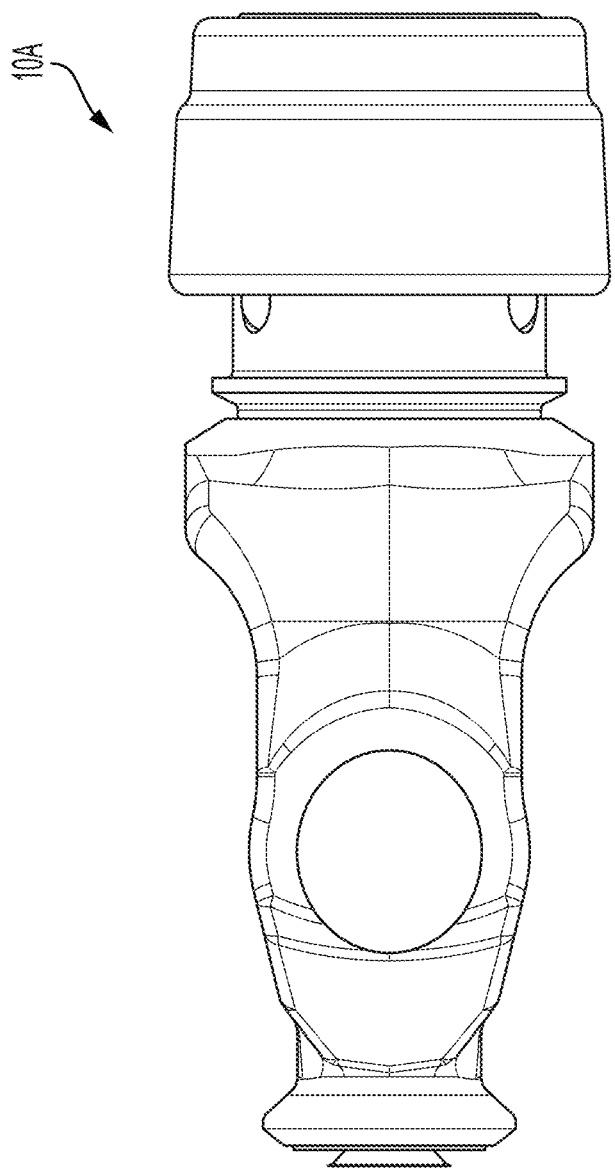
FIG. 40 is a bottom view of the yoke of FIG. 31.
Figure 41:
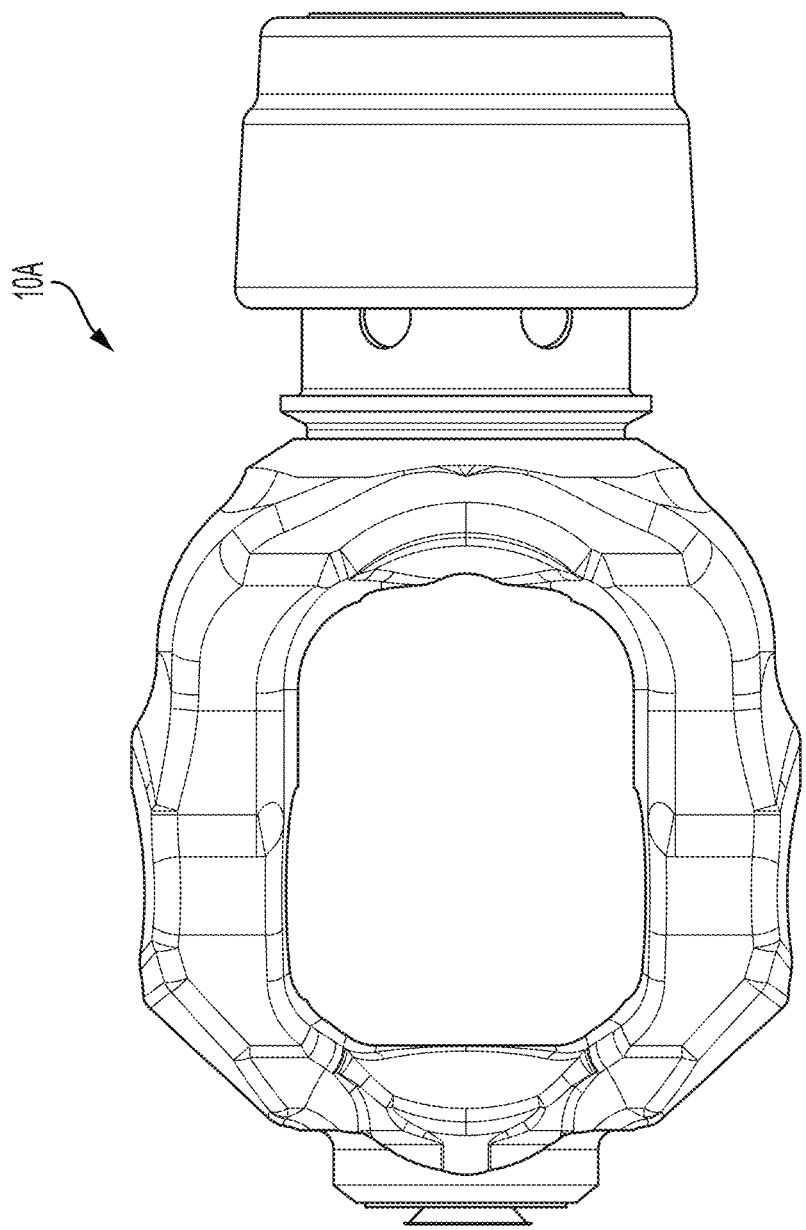
FIG. 41 is a side view of the yoke of FIG. 31.
Figure 42:
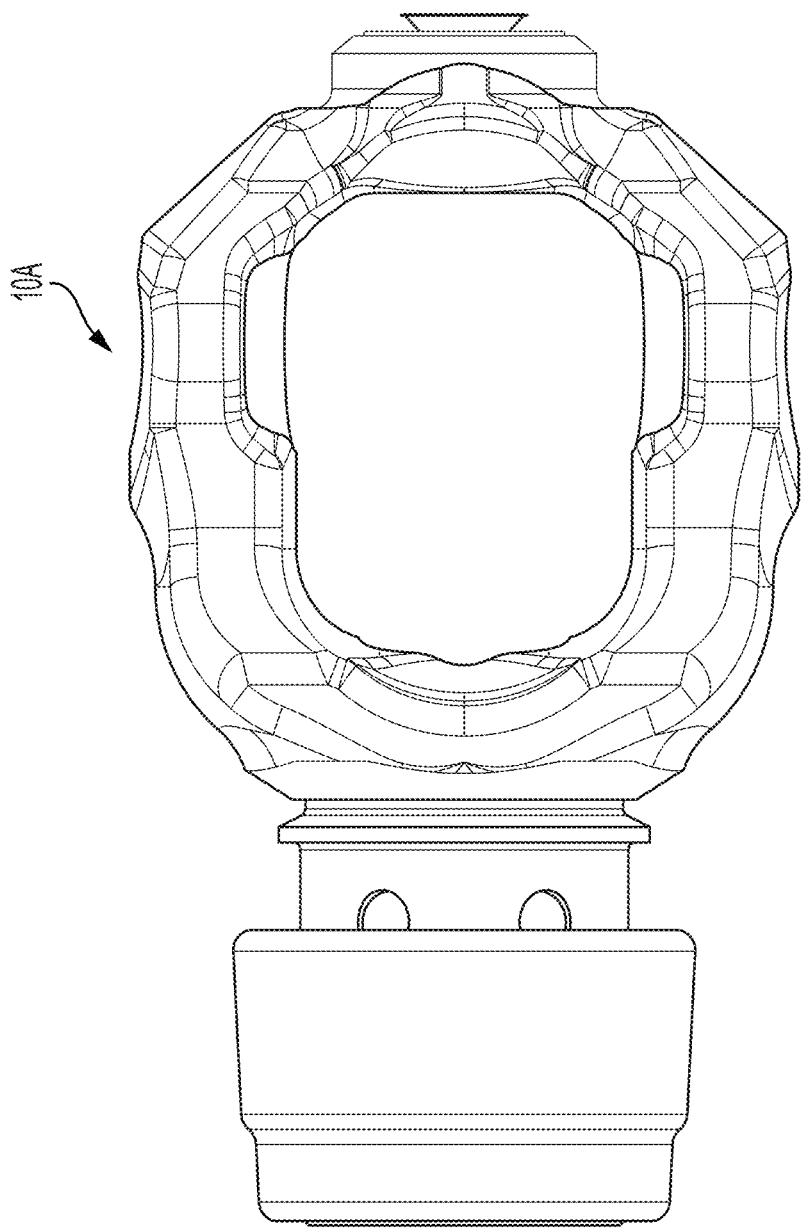
FIG. 42 is an opposite side view of the yoke of FIG. 31.
Figure 43:
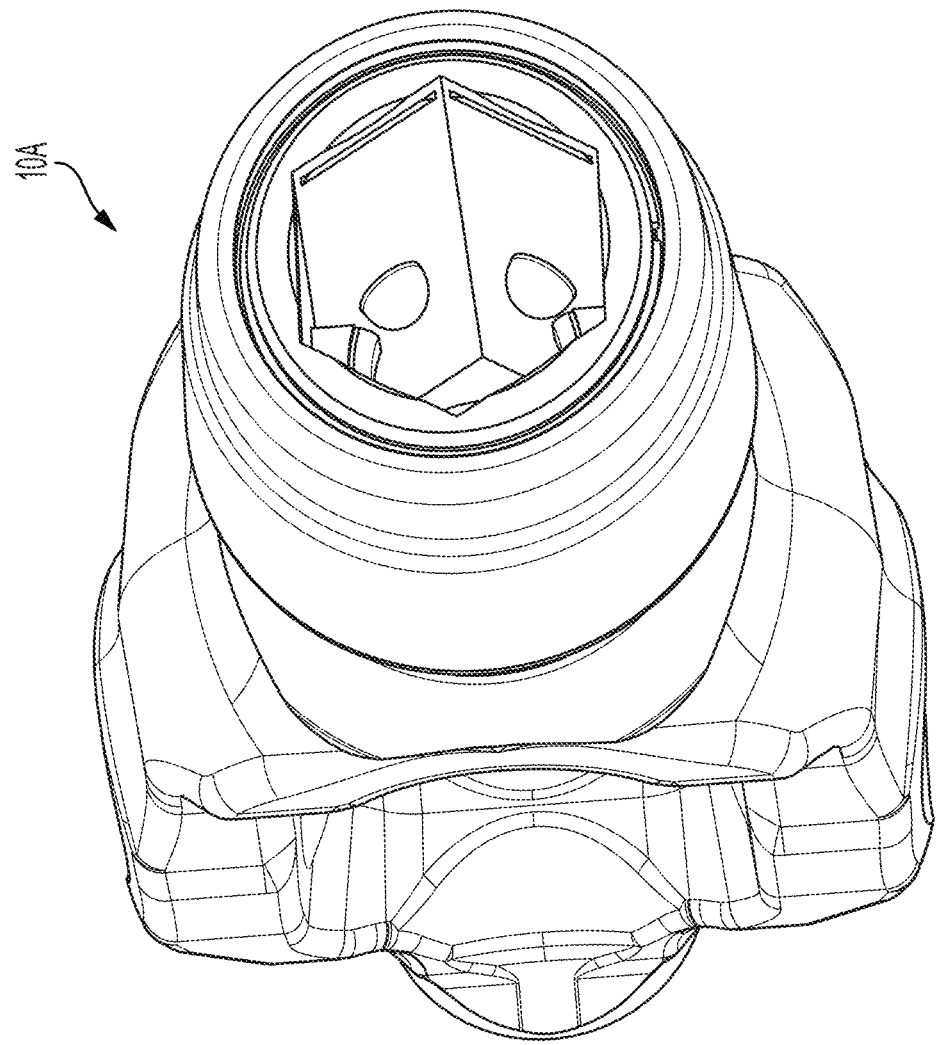
FIG. 43 is front perspective view of the yoke of FIG. 31 with the insert and the retaining ring removed.
Figure 44:
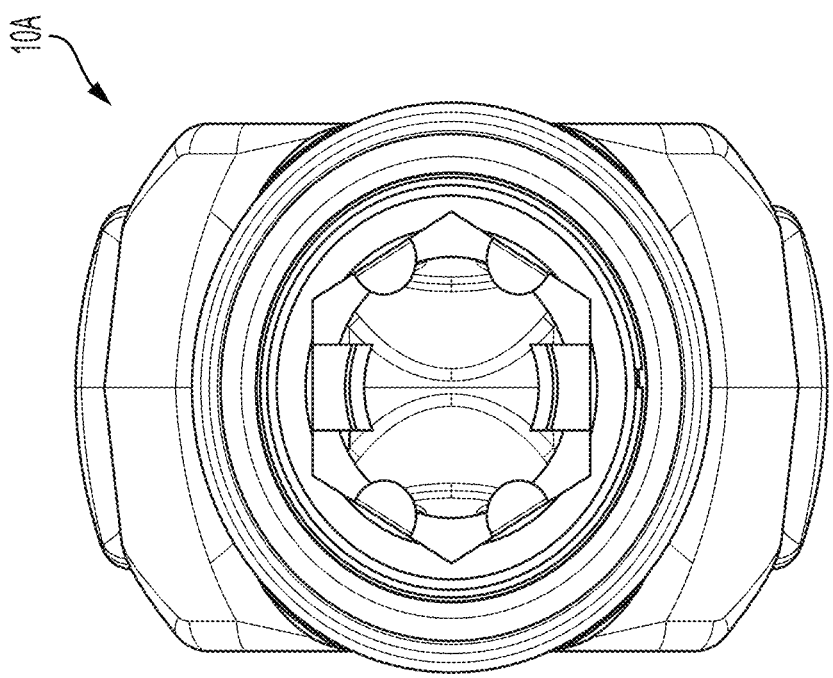
FIG. 44 is a front view of the yoke of FIG. 31 with the insert and the retaining ring removed.
Figure 45:
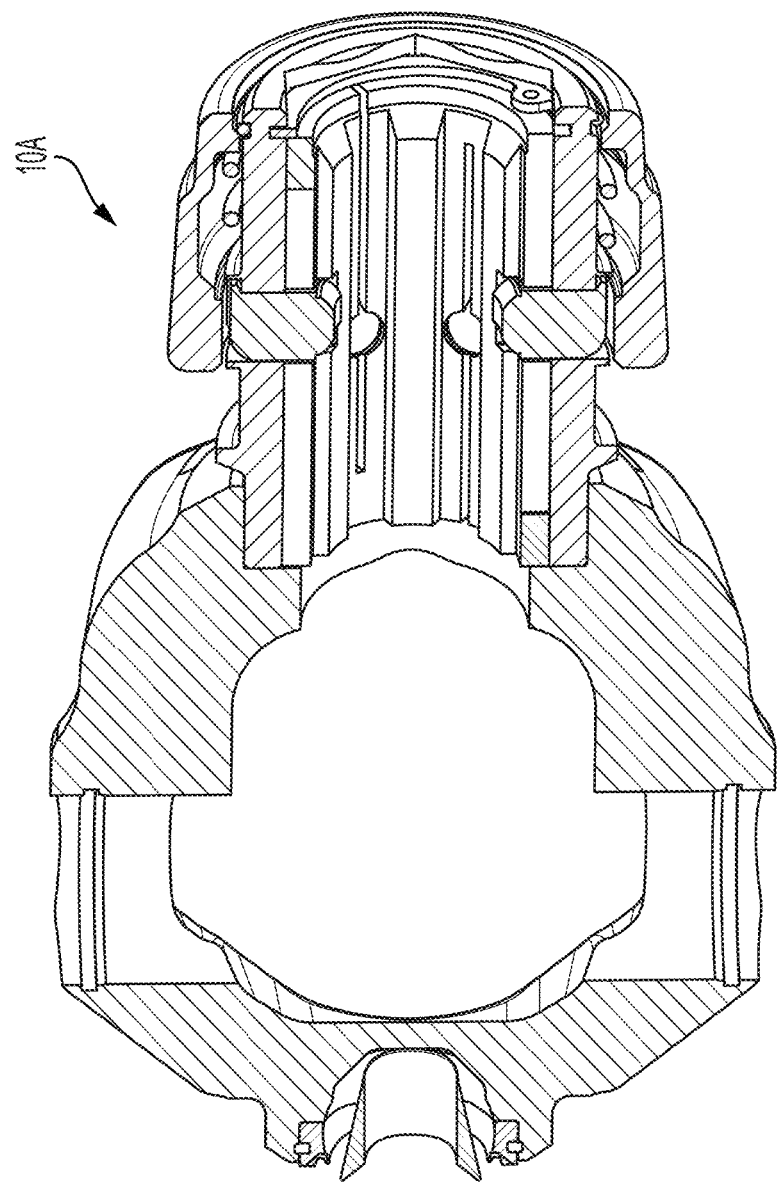
FIG. 45 is a cross-sectional view of the yoke of FIG. 31, taken generally in a vertical plane through the axis.
Figure 46:
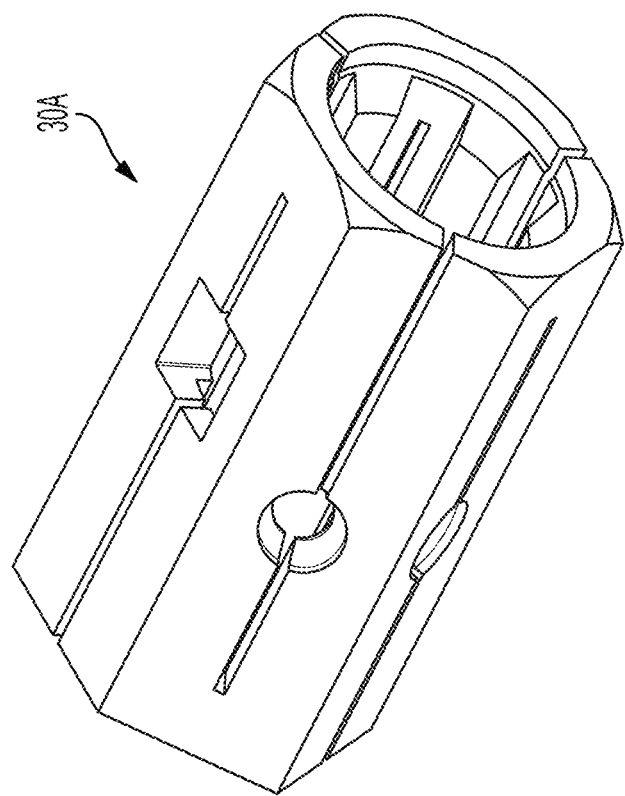
FIG. 46 is a front perspective view of an insert of the yoke of FIG. 31.
Figure 47:
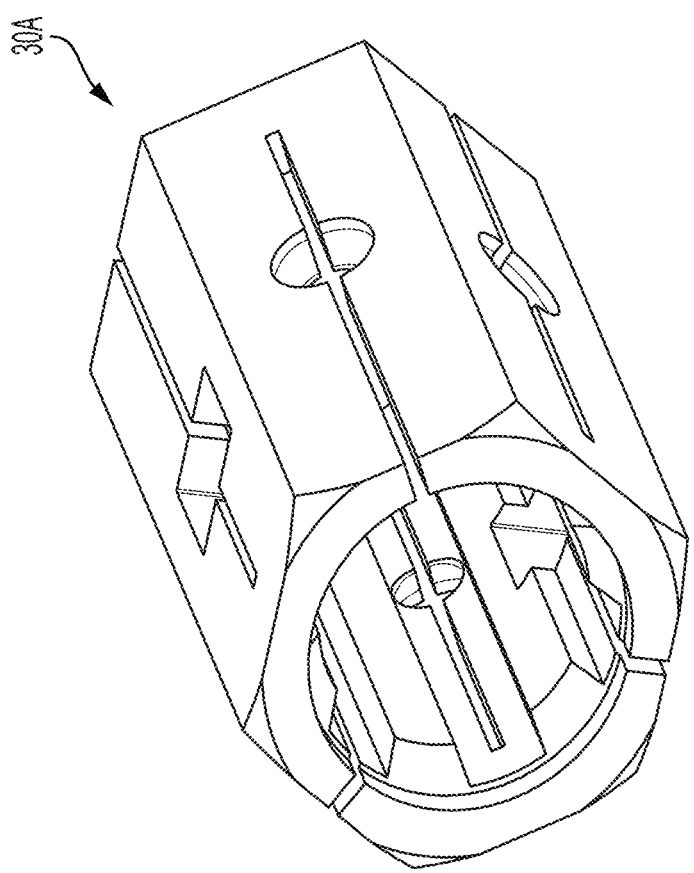
FIG. 47 is another front perspective view of the insert of FIG. 46.
Figure 48:
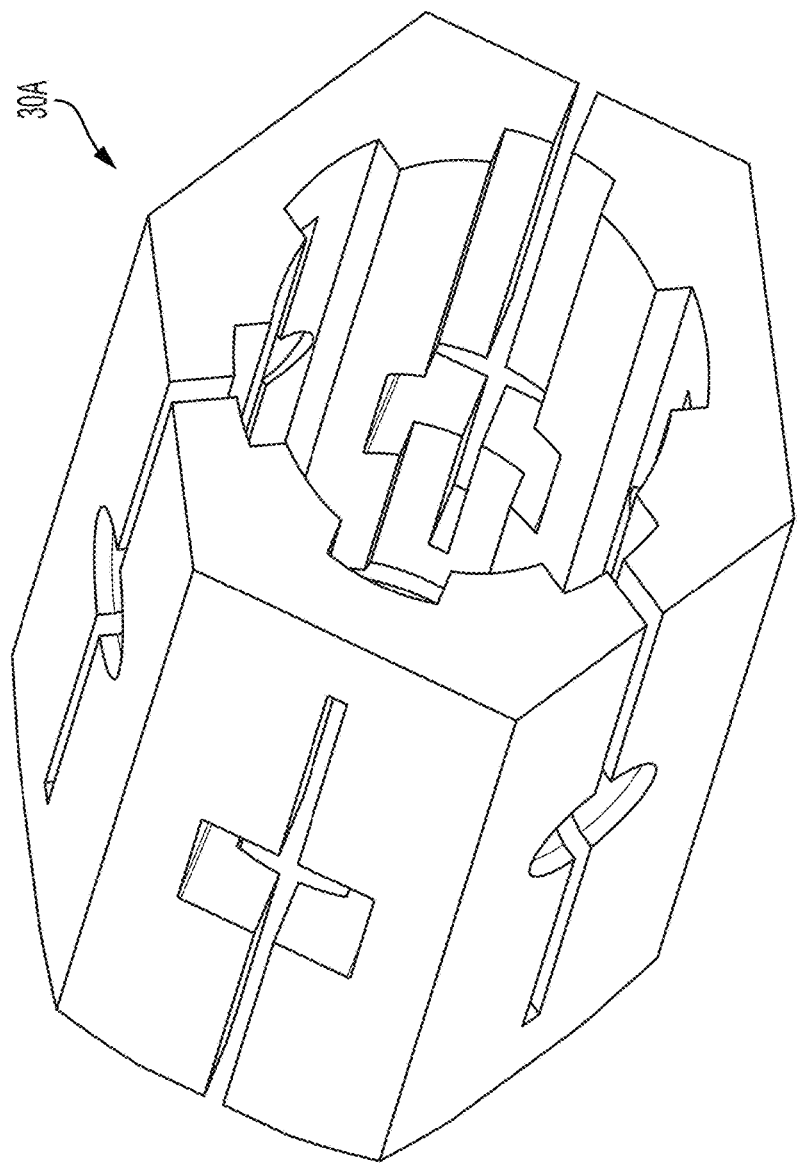
FIG. 48 is a rear perspective view of the insert of FIG. 46.
Figure 49:
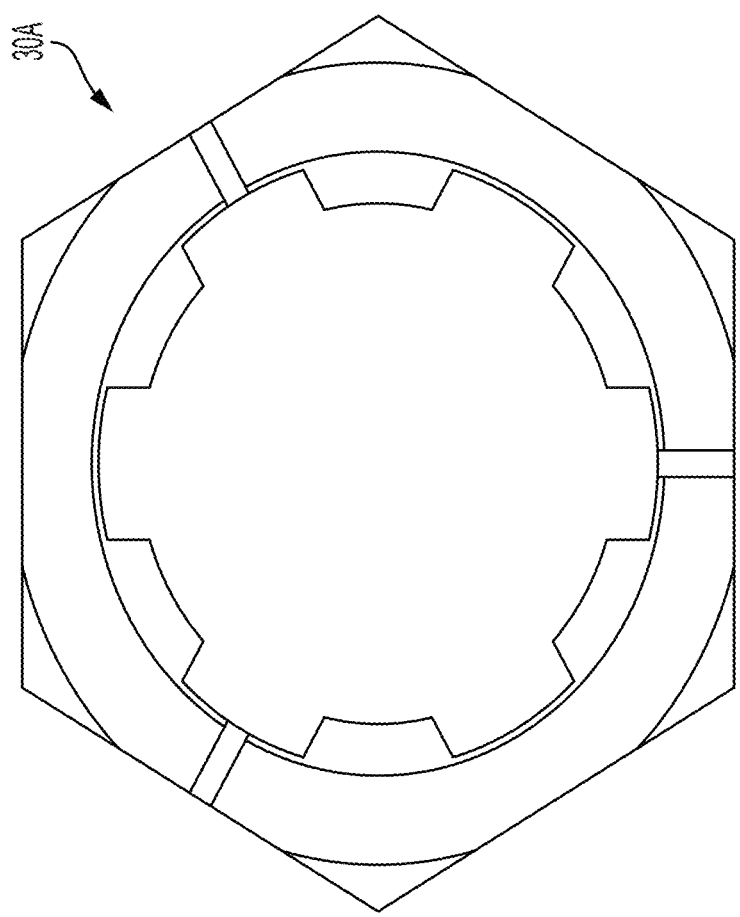
FIG. 49 is a front view of the insert of FIG. 46.
Figure 50:
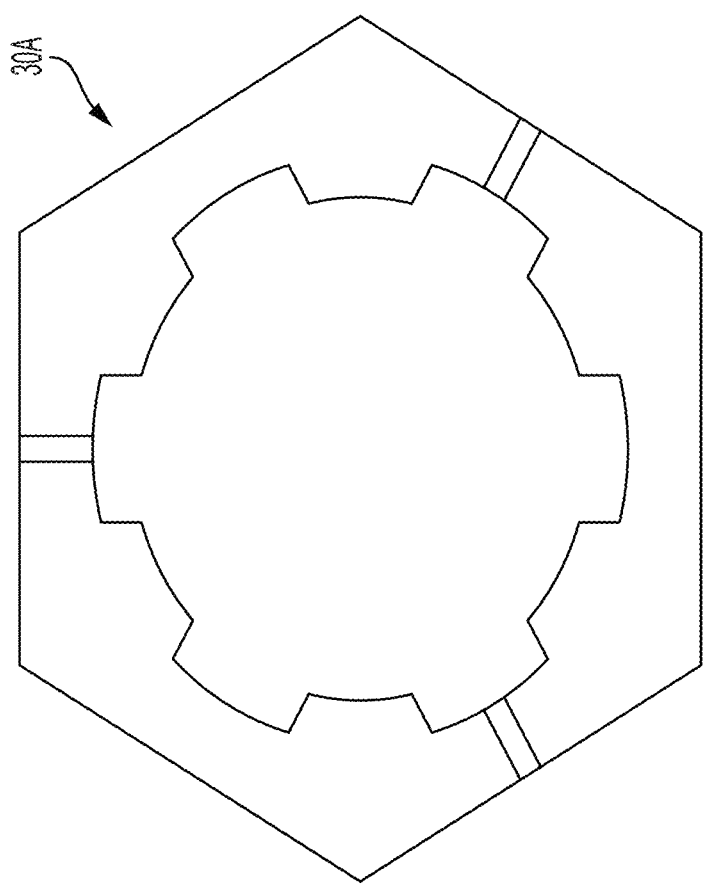
FIG. 50 is a rear view of the insert of FIG. 46.
Figure 51:
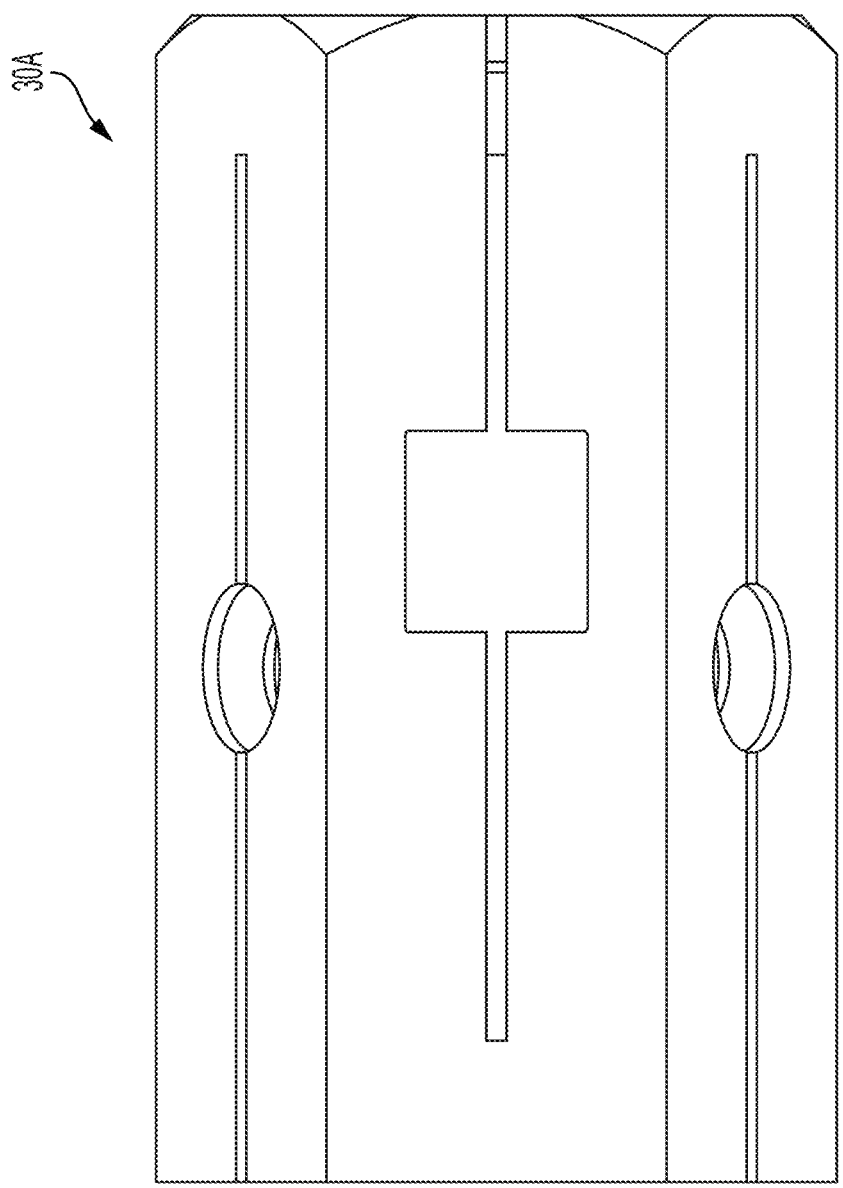
FIG. 51 is a top view of the insert of FIG. 46.
Figure 52:
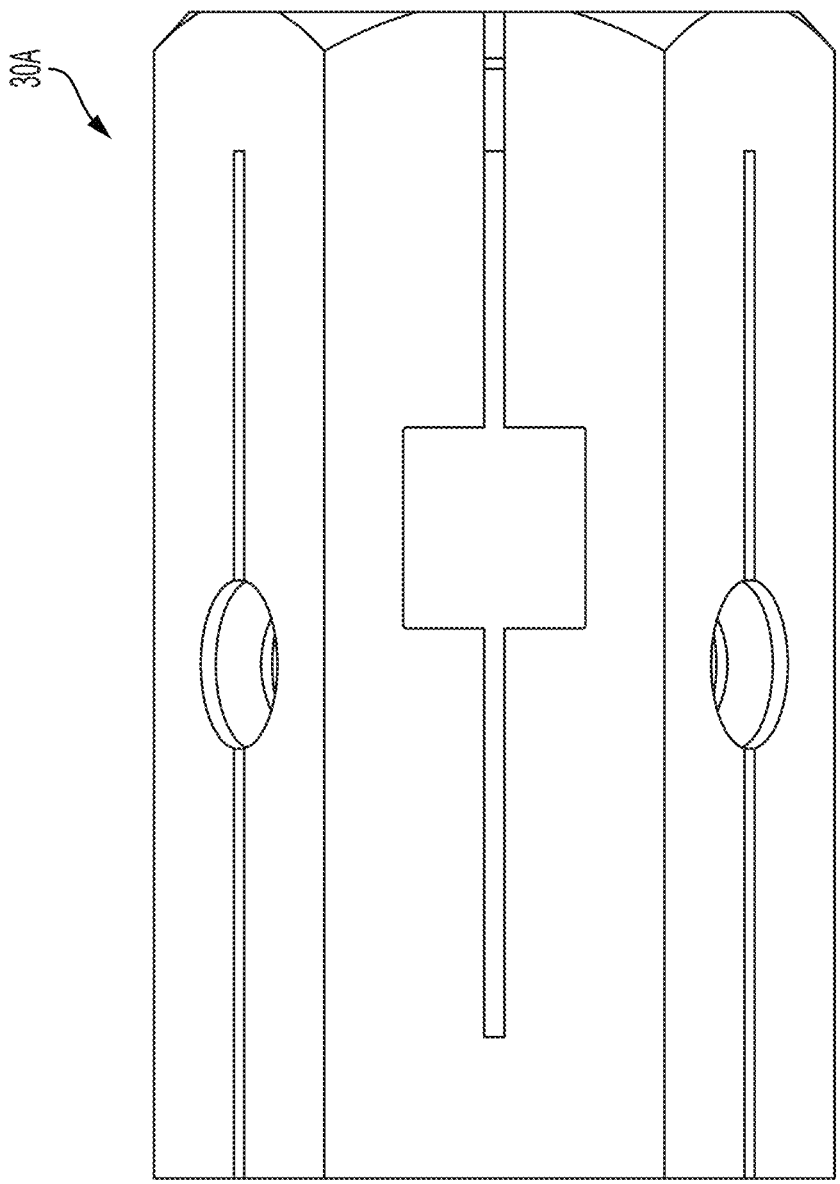
FIG. 52 is a bottom view of the insert of FIG. 46.
Figure 53:
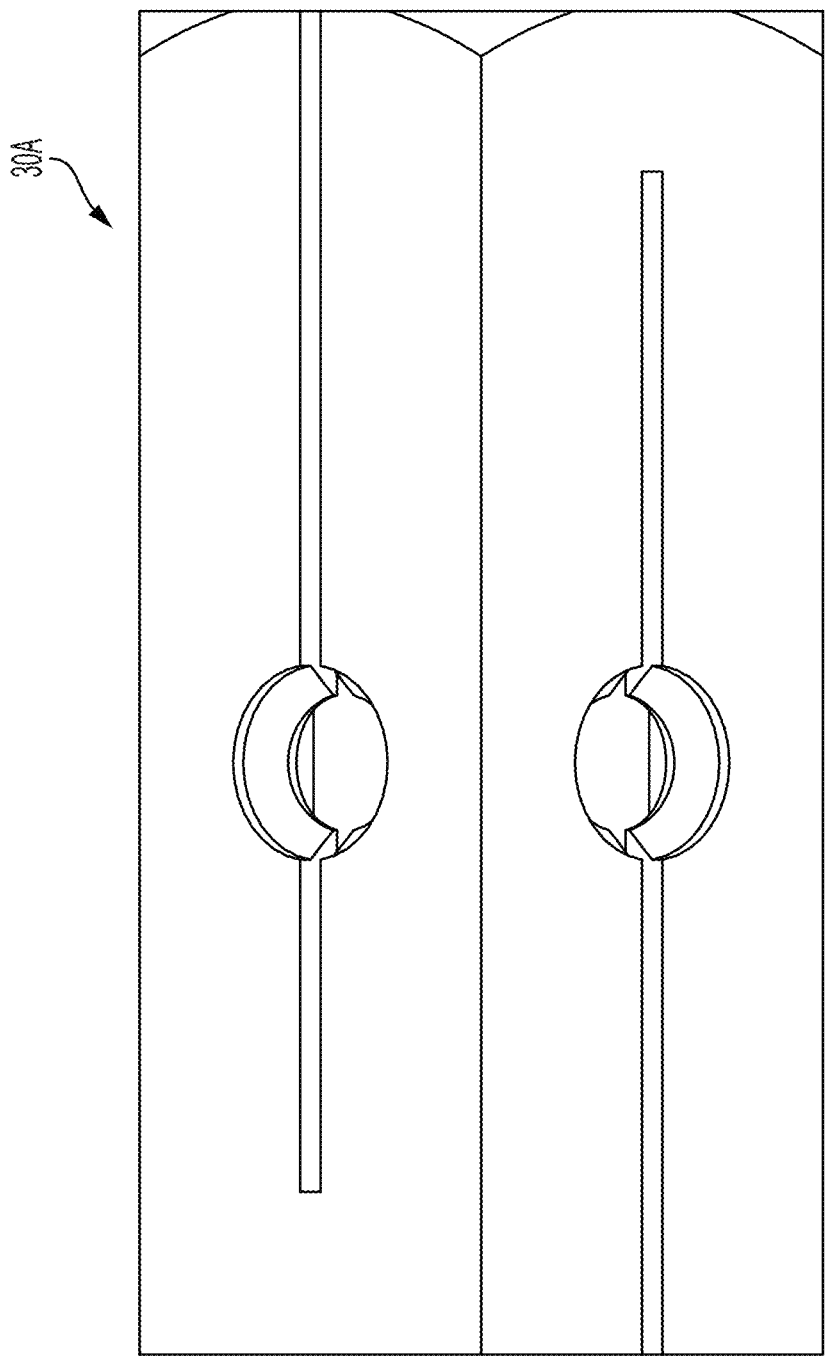
FIG. 53 is a side view of the insert of FIG. 46.
Figure 54:
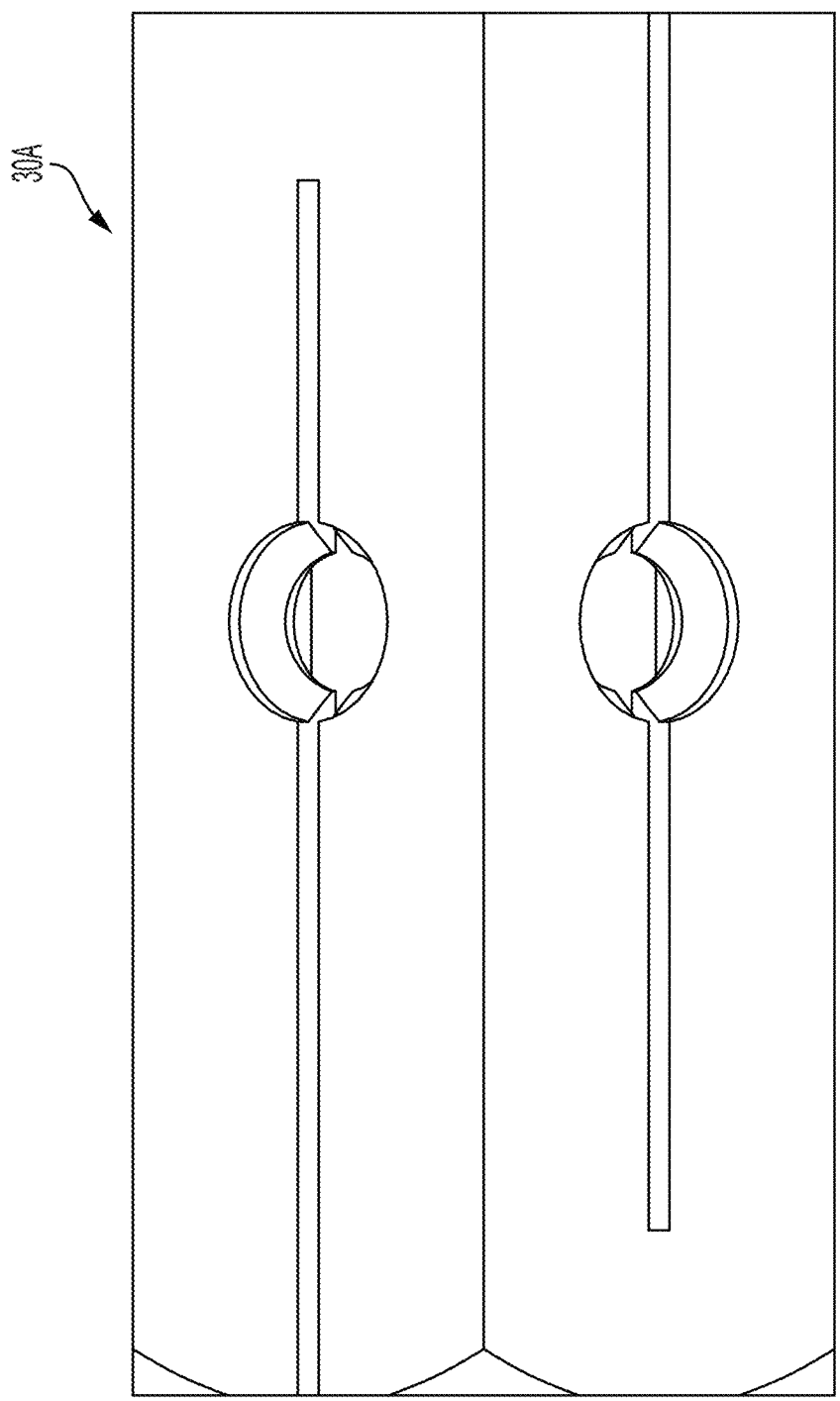
FIG. 54 is an opposite side view of the insert of FIG. 46.
Figure 55:
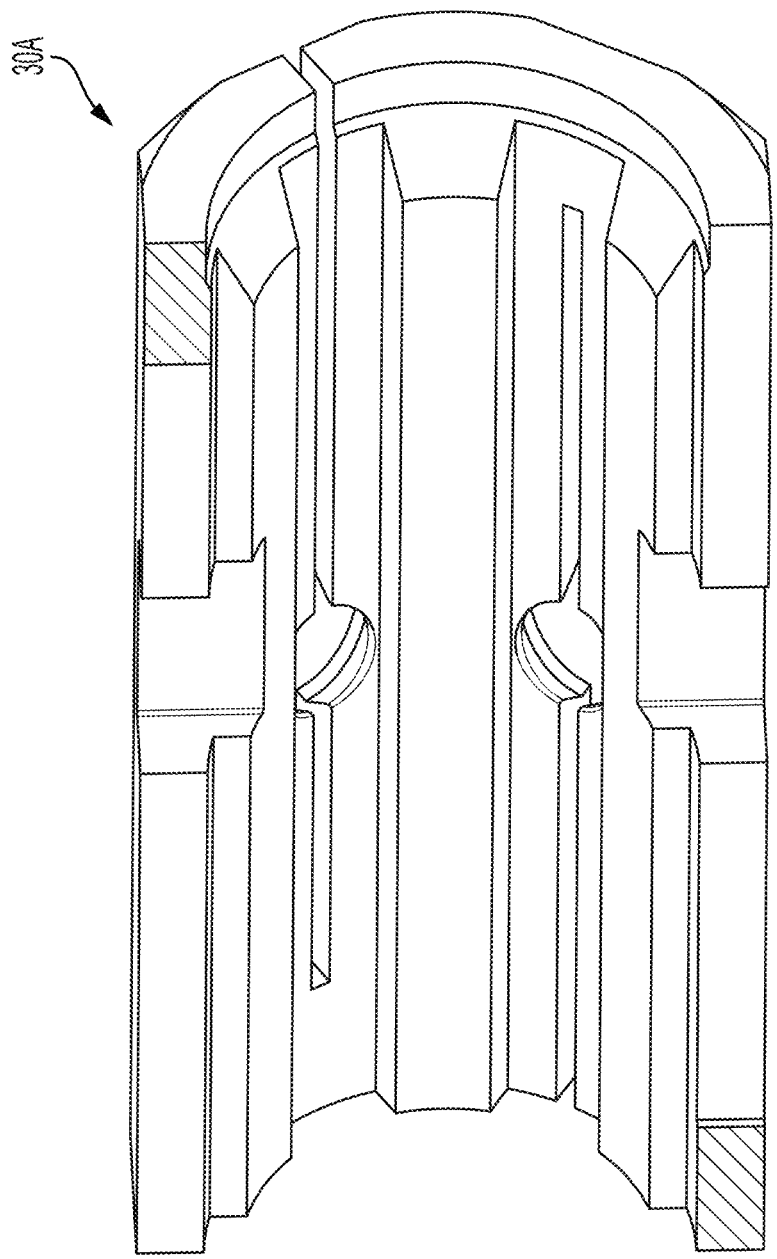
FIG. 55 is a cross-sectional view of the insert of FIG. 46.
Figure 56:
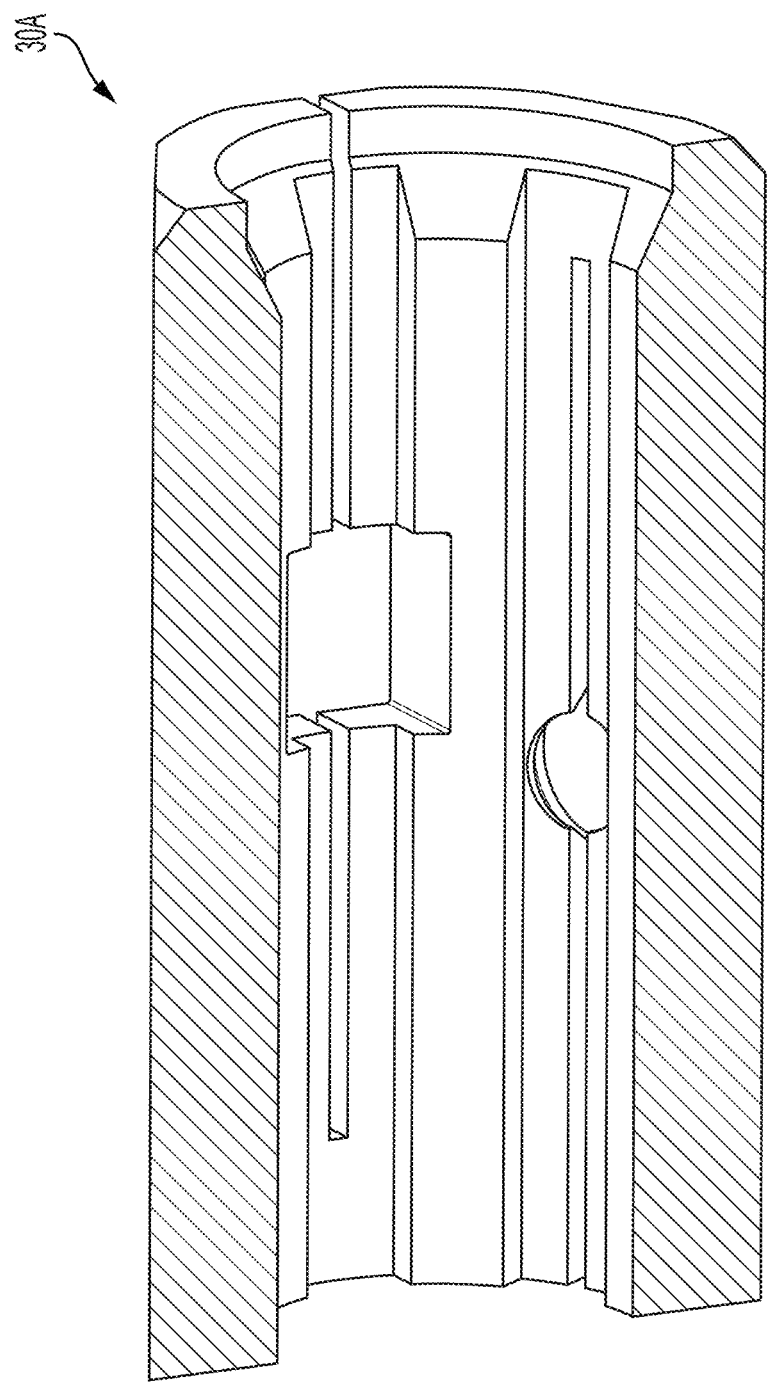
FIG. 56 is another cross-sectional view of the insert of FIG. 46.
Figure 57B:
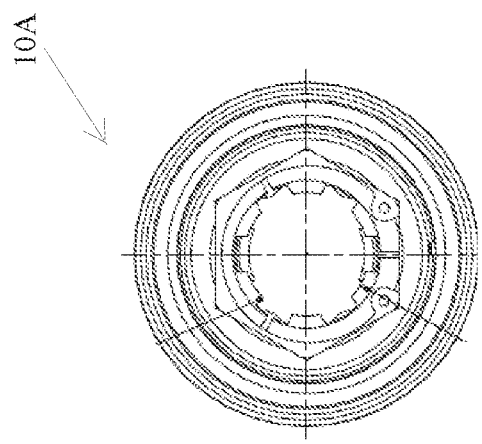
FIG. 57B is a top view of the yoke of FIG. 31.
Figure 57A:
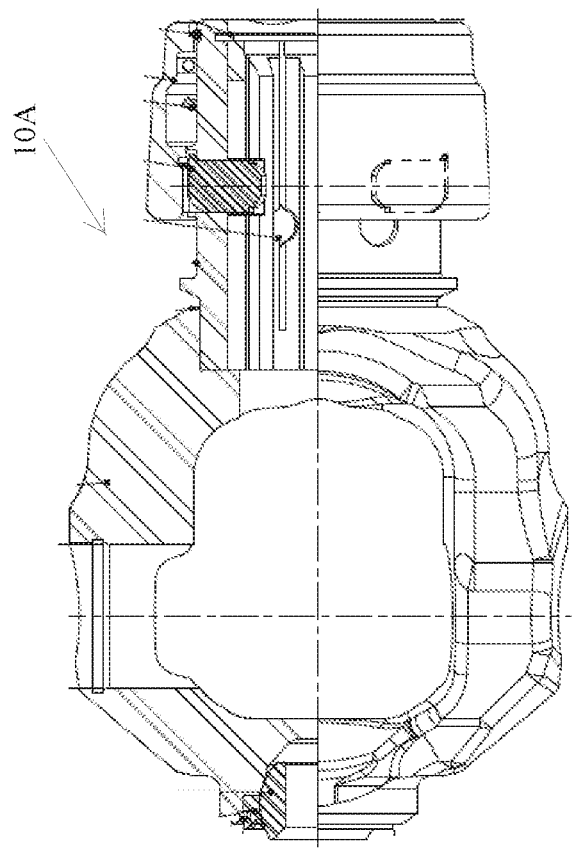
FIG. 57A is a side view of the yoke of FIG. 31.
Figure 59A:
FIG. 59A is a front view of a hub of the yoke of FIG. 31.
Figure 59B:
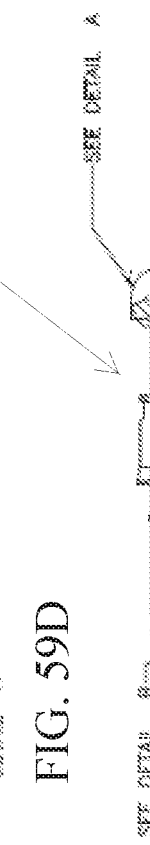
FIG. 59B is a side view of the hub of FIG. 59A.
Figure 59C:
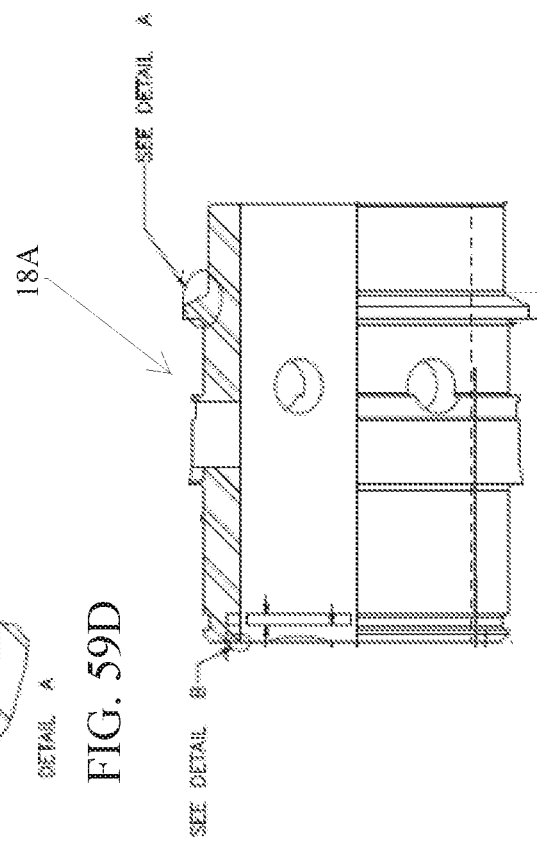
FIG. 59C is an enlarged view of Detail A in FIG. 59B.
Figure 59D:
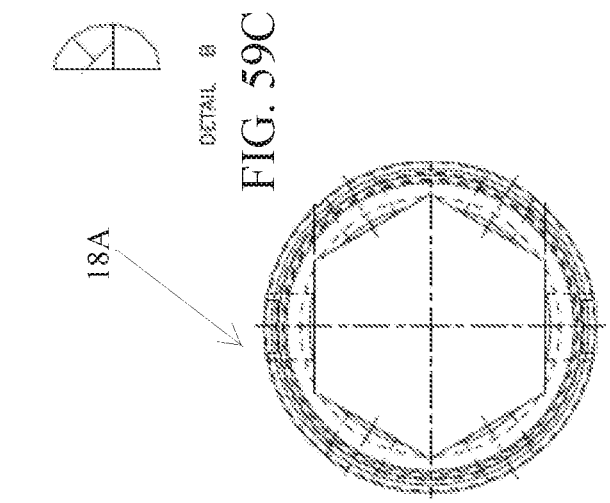
FIG. 59D is an enlarged view of Detail B in FIG. 59B.
Figure 60:
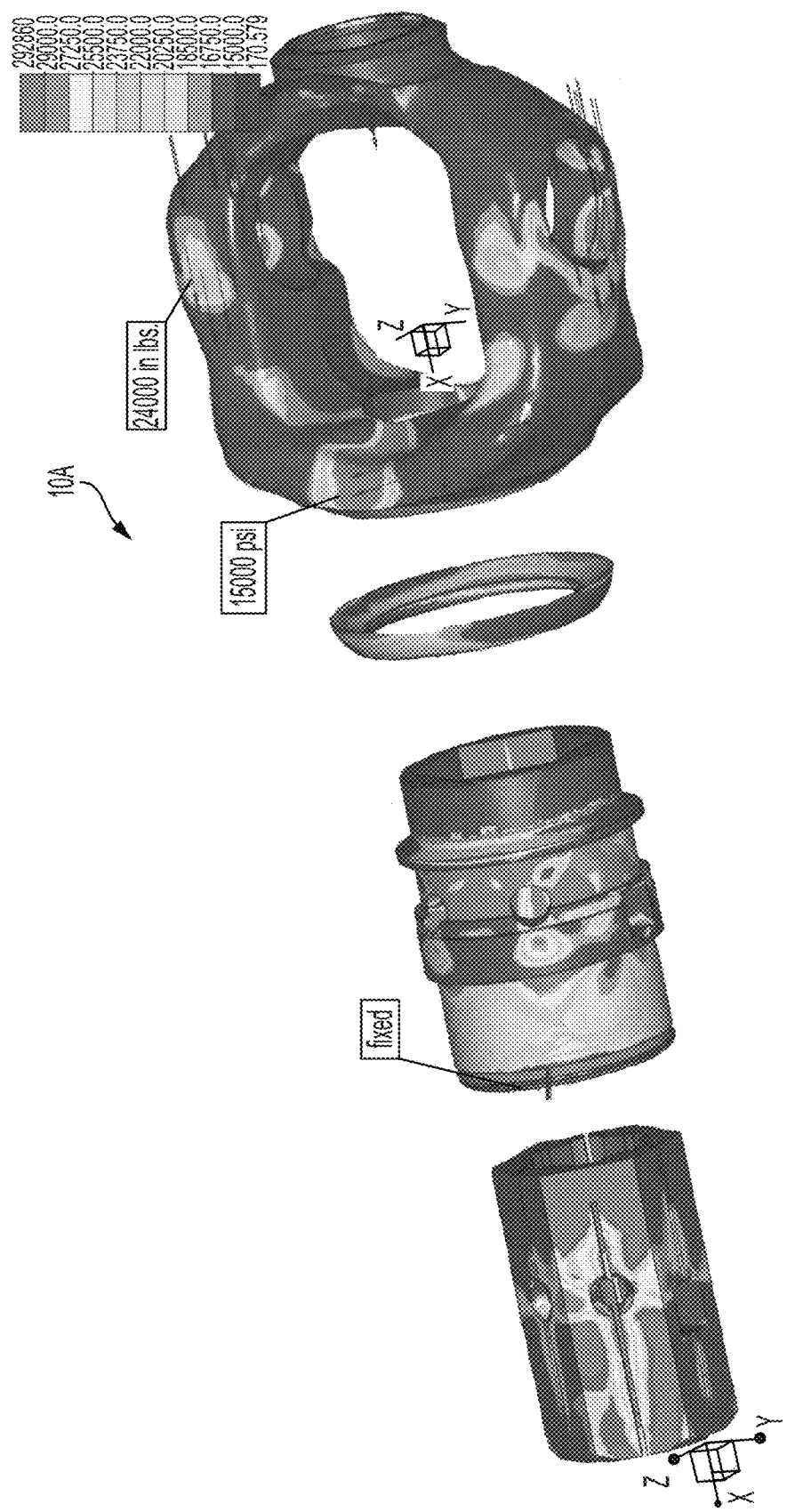
FIG. 60 is a partially exploded view of the yoke of FIG. 31 showing magnitudes of stress from use.
Figure 61:
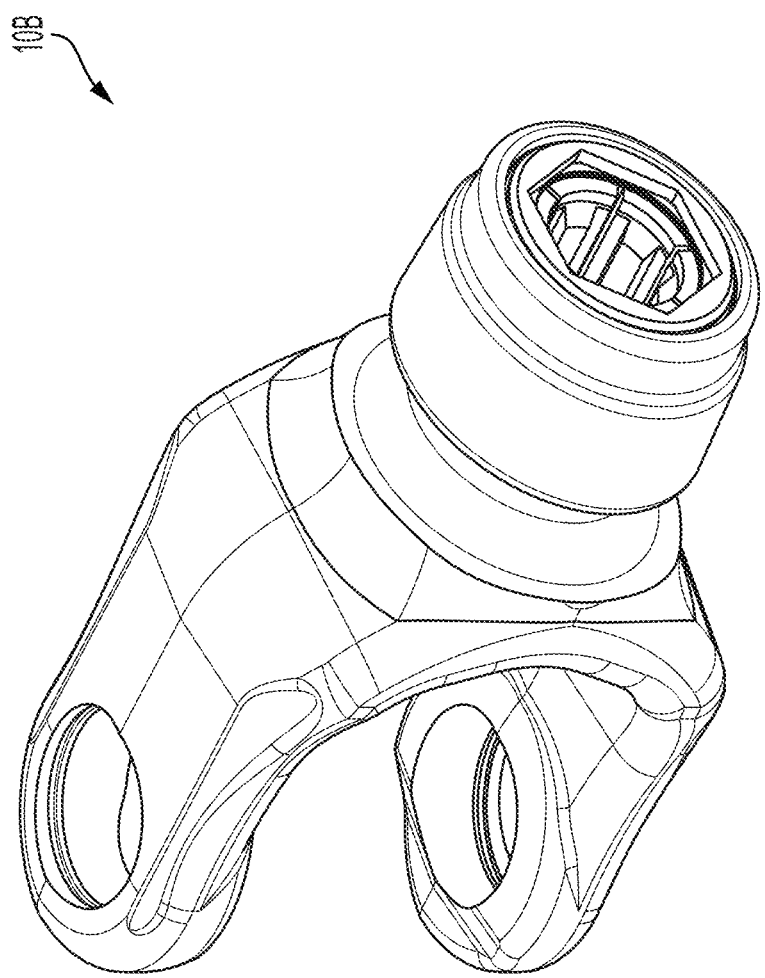
FIG. 61 is a front perspective view of another alternative construction of a collet locking yoke.
Figure 62:
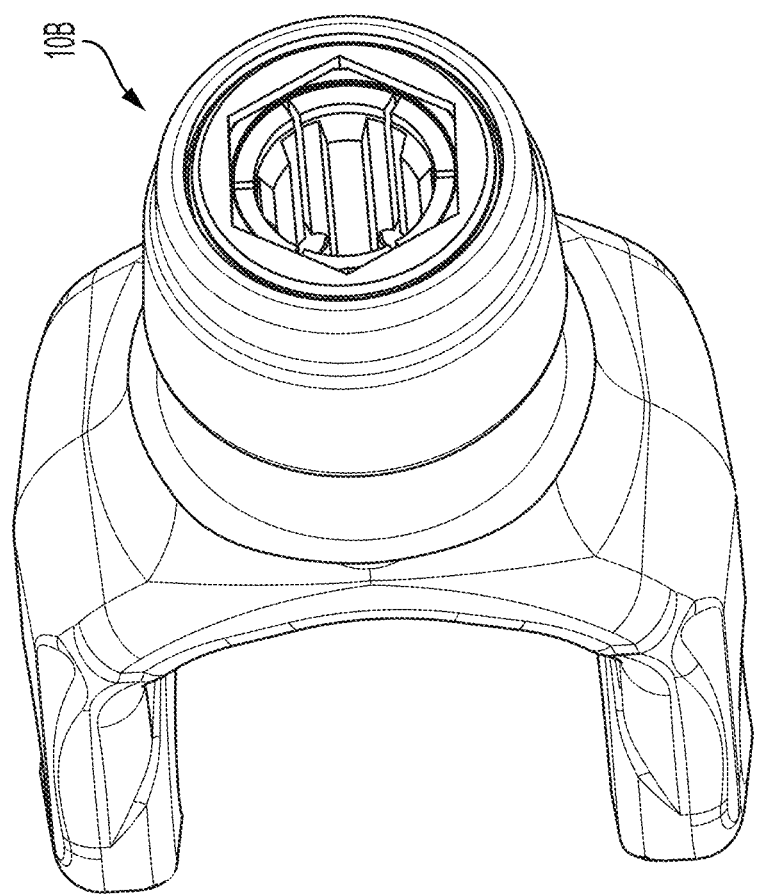
FIG. 62 is a front perspective view of the yoke of FIG. 61 with a retaining ring removed.
Figure 63:
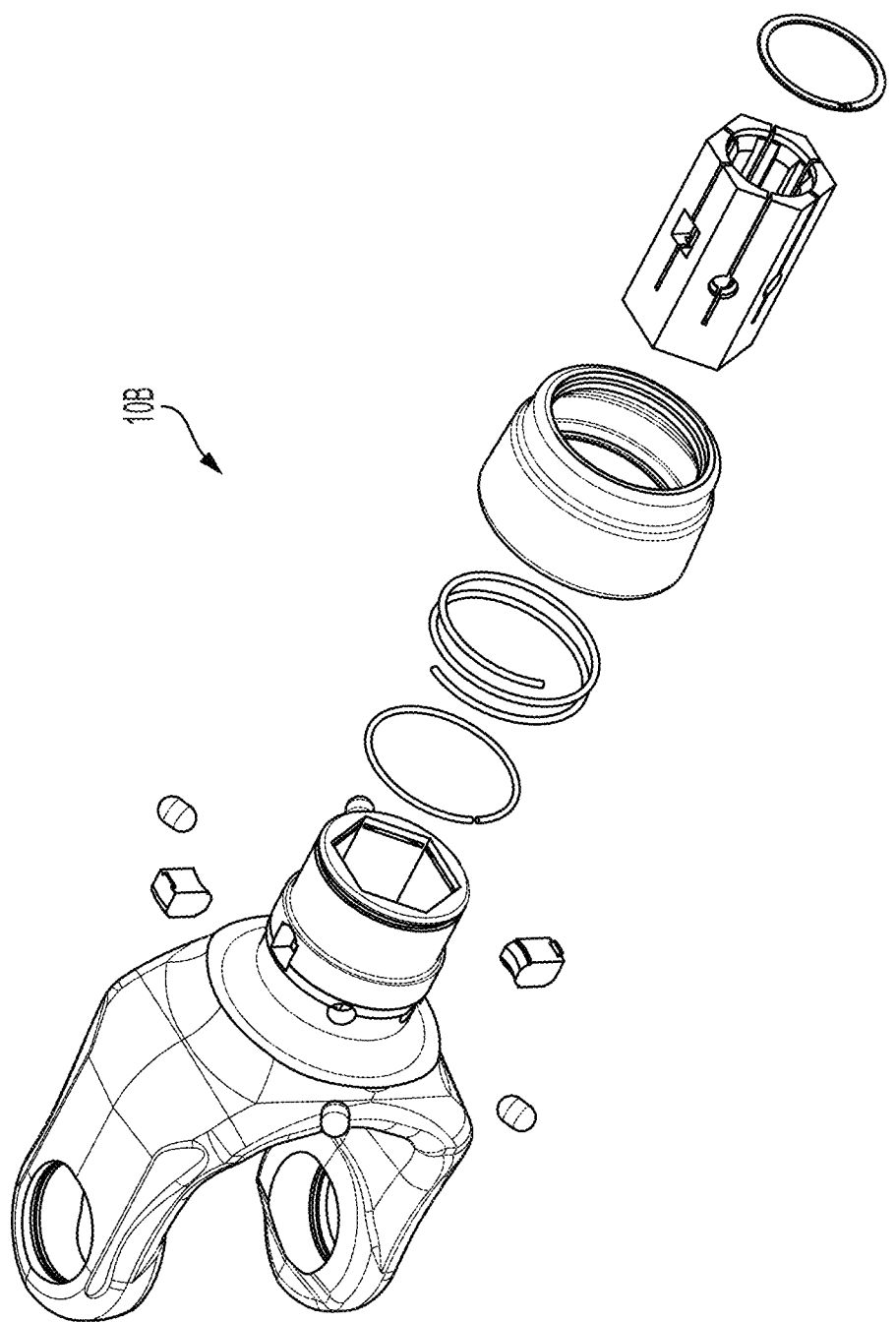
FIG. 63 is an exploded view of the yoke of FIG. 61.
Figure 64:
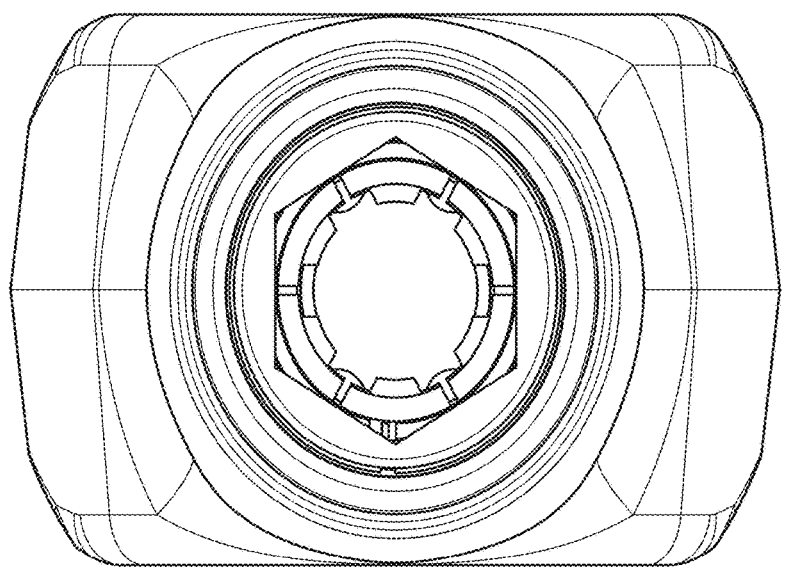
FIG. 64 is a front view of the yoke of FIG. 61 with the retaining ring removed.
Figure 65:
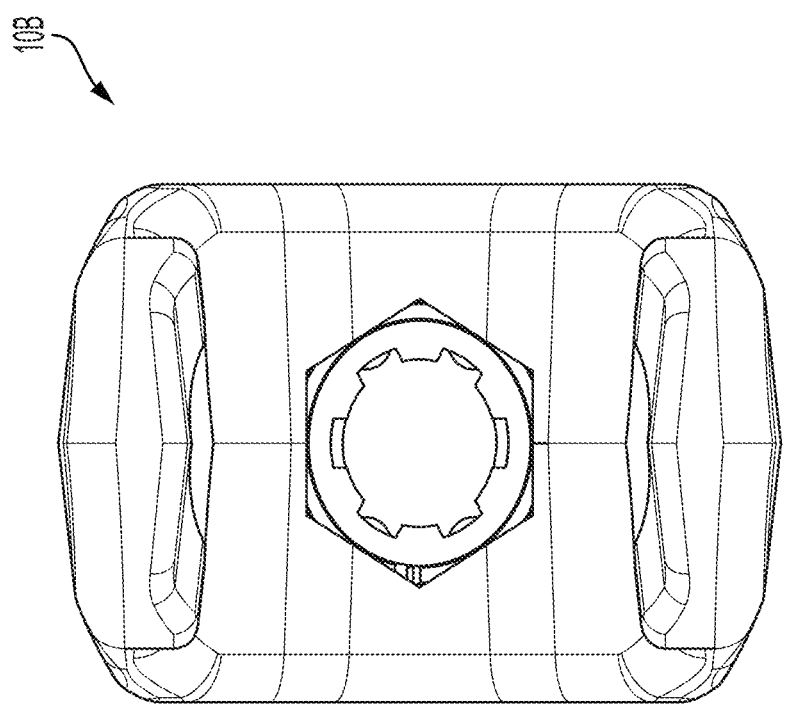
FIG. 65 is a rear view of the yoke of FIG. 61.
Figure 66:
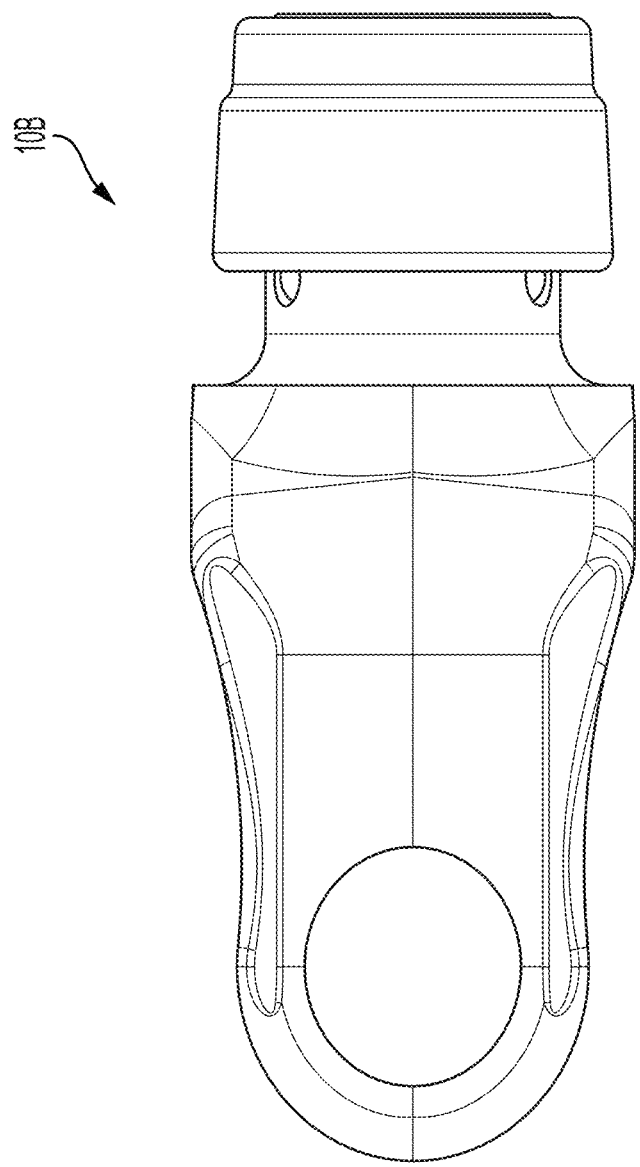
FIG. 66 is a top view of the yoke of FIG. 61.
Figure 67:
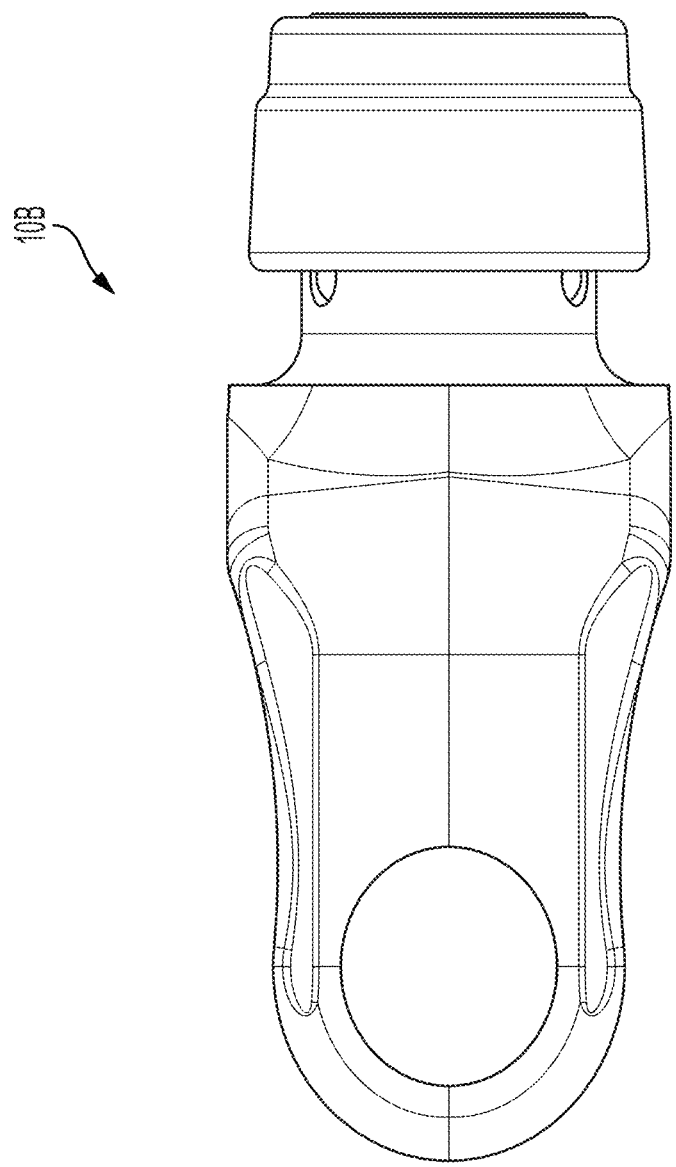
FIG. 67 is a bottom of the yoke of FIG. 61.
Figure 68:
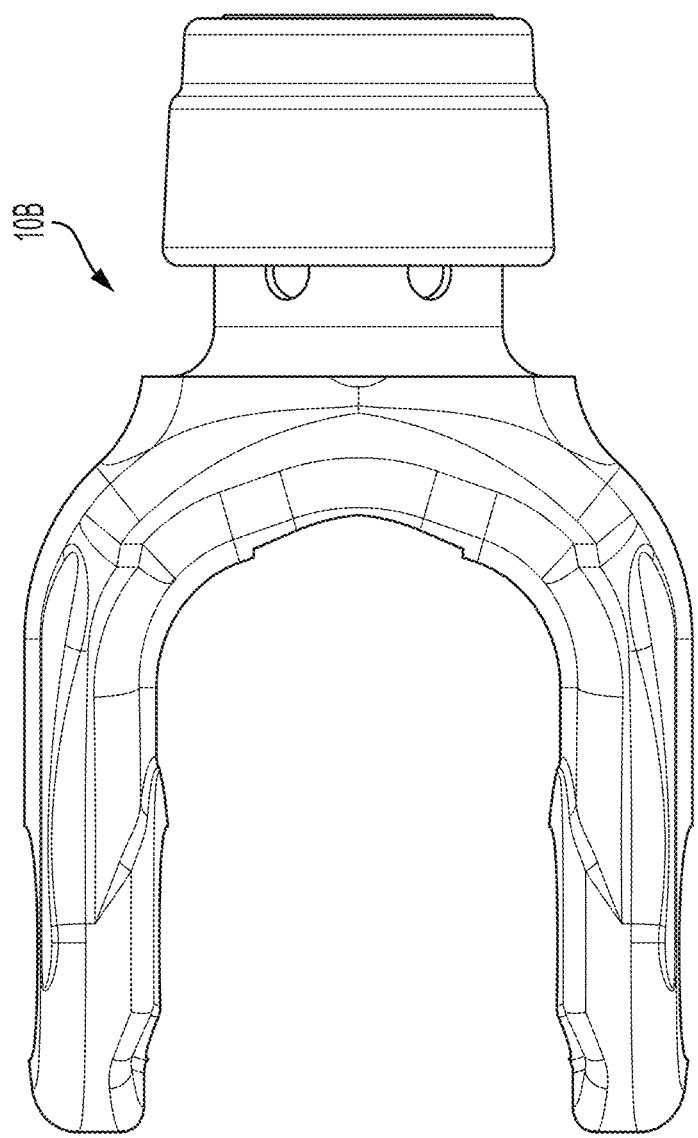
FIG. 68 is a side view of the yoke of FIG. 61.
Figure 69:
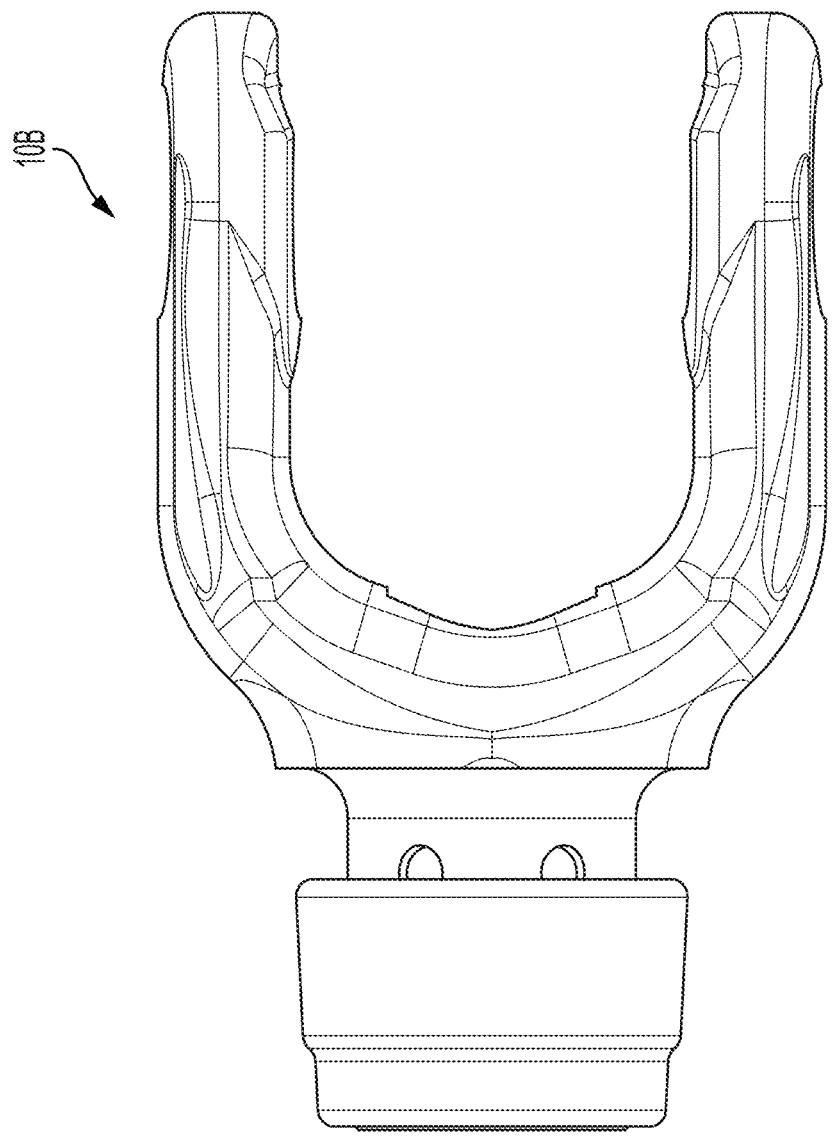
FIG. 69 is an opposite side view of the yoke of FIG. 61.
Figure 70:
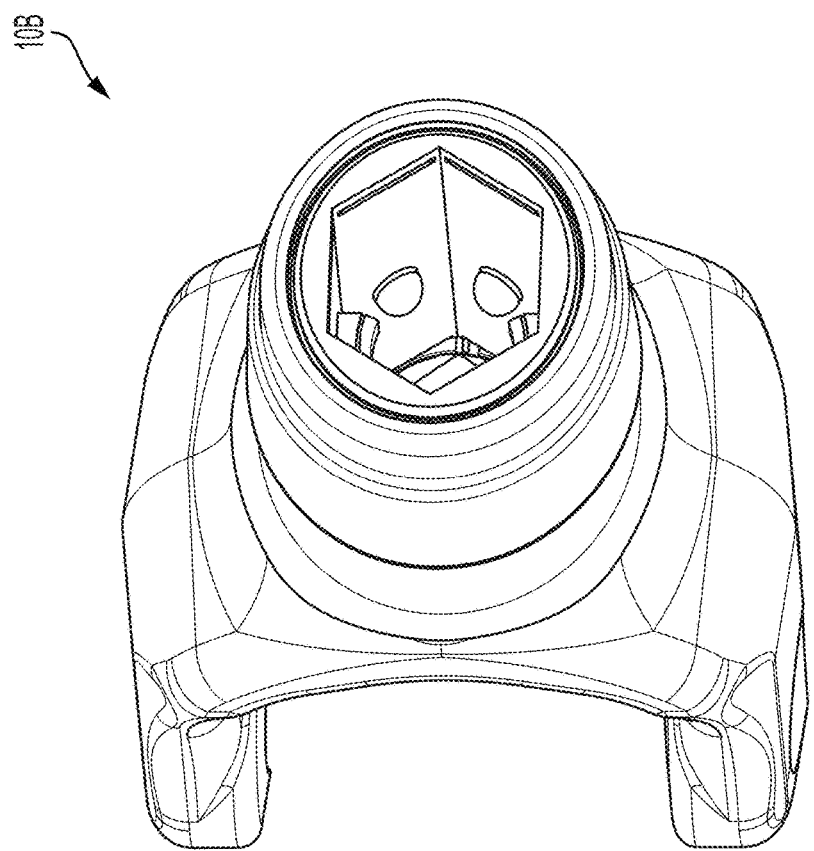
FIG. 70 is a front perspective view of the yoke of FIG. 61 with an insert and the retaining ring removed.
Figure 71:
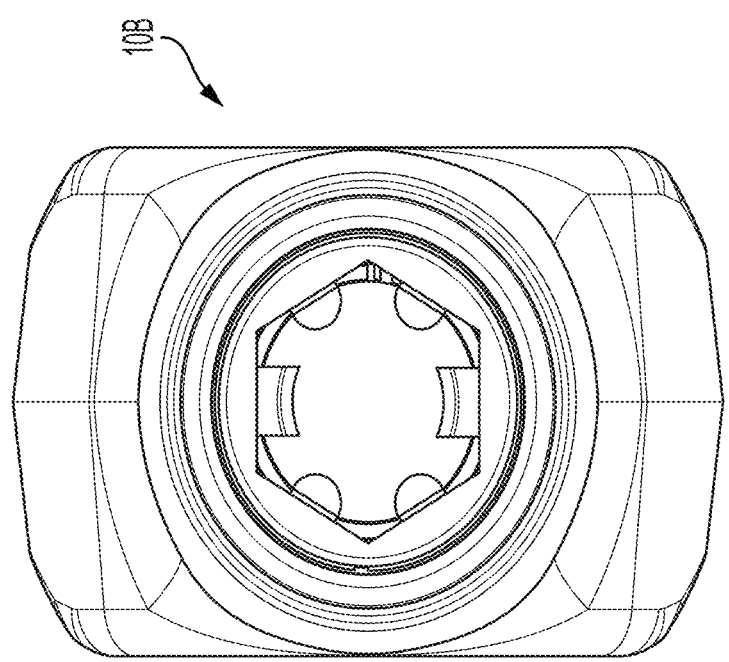
FIG. 71 is a front view of the yoke of FIG. 61 with the insert and the retaining ring removed.
Figure 72:
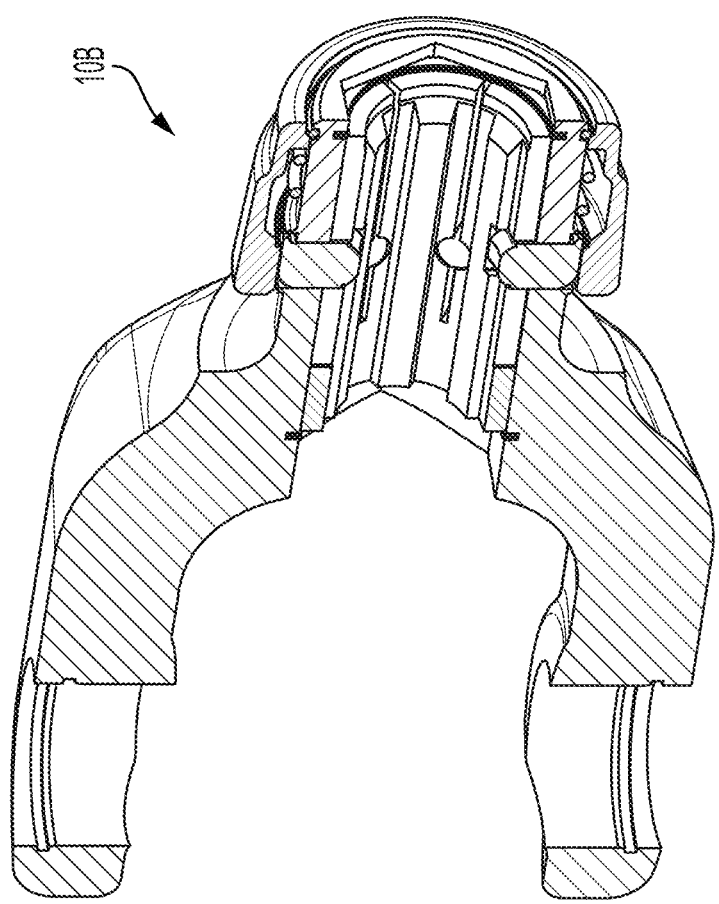
FIG. 72 is a cross-sectional view of the yoke of FIG. 61.
Figure 73:
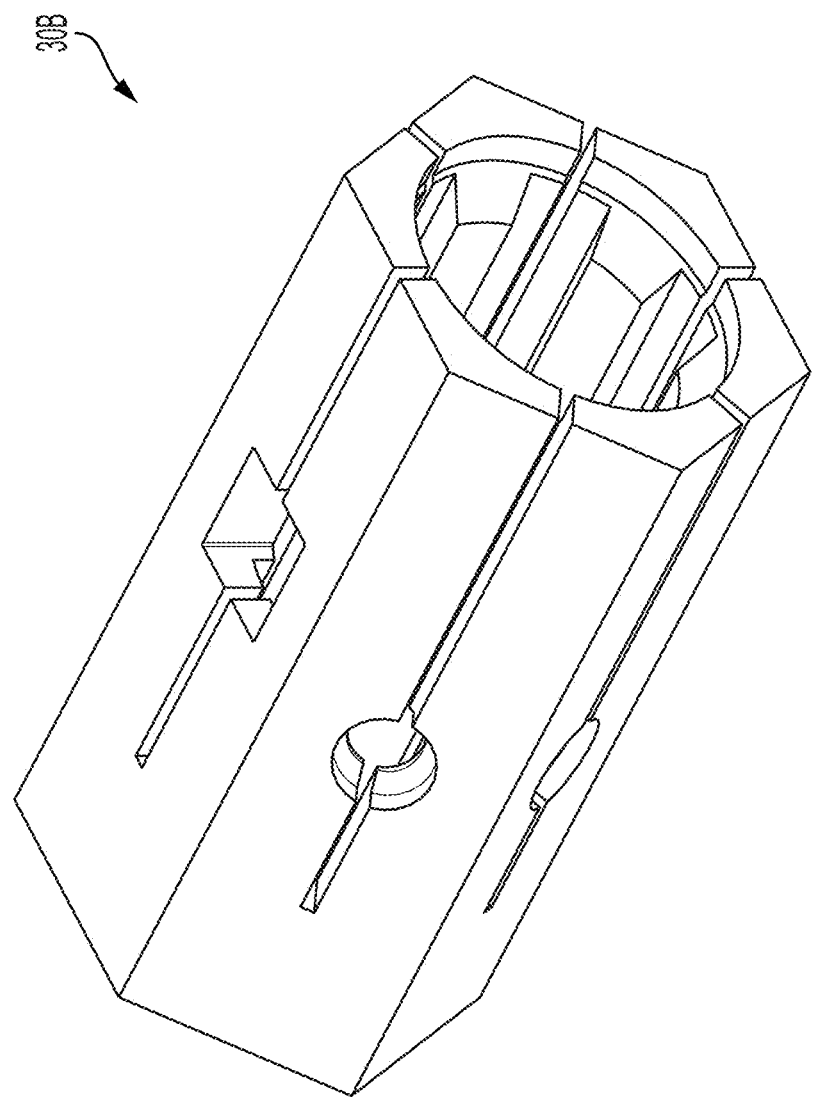
FIG. 73 is a front perspective view of the insert of FIG. 61.
Figure 74:
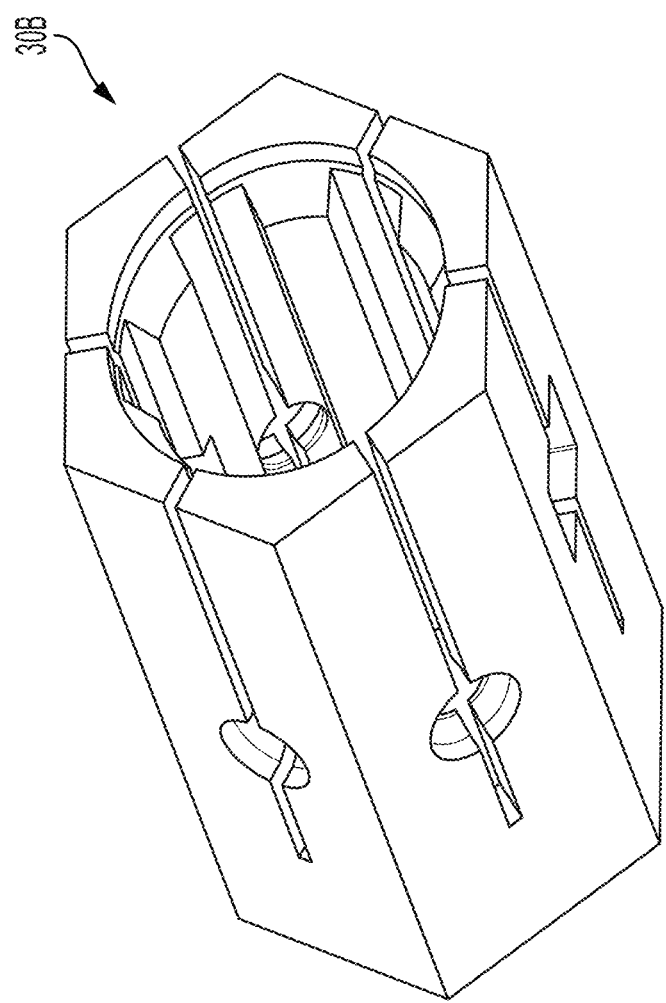
FIG. 74 is another front perspective view of the insert of FIG. 73.
Figure 75:
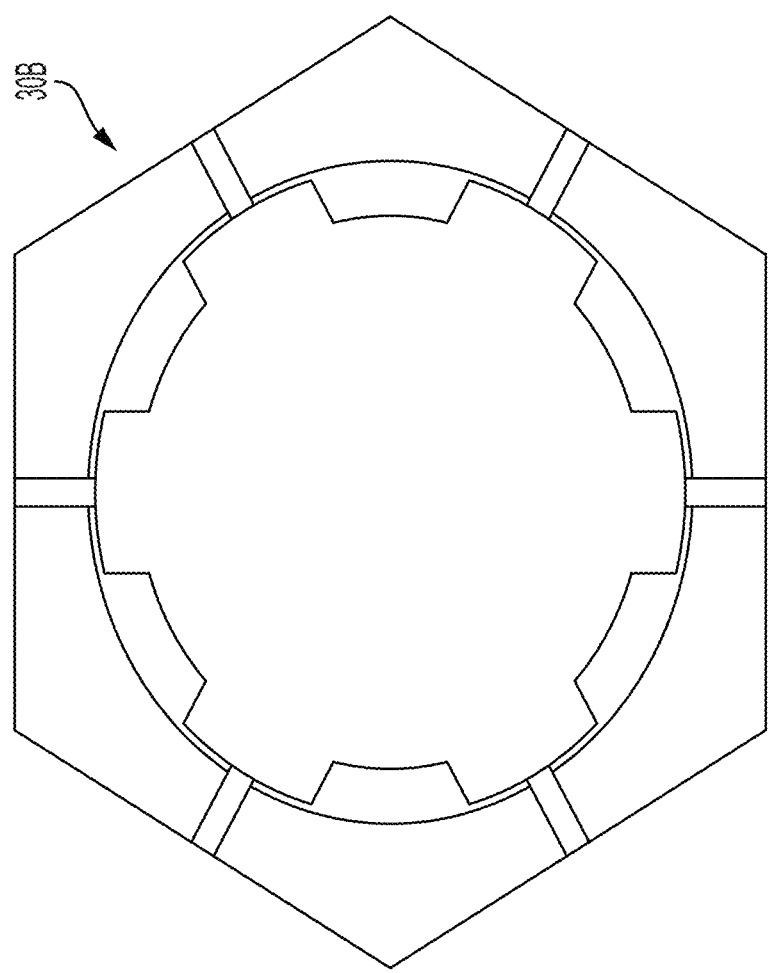
FIG. 75 is a front view of the insert of FIG. 73.
Figure 76:
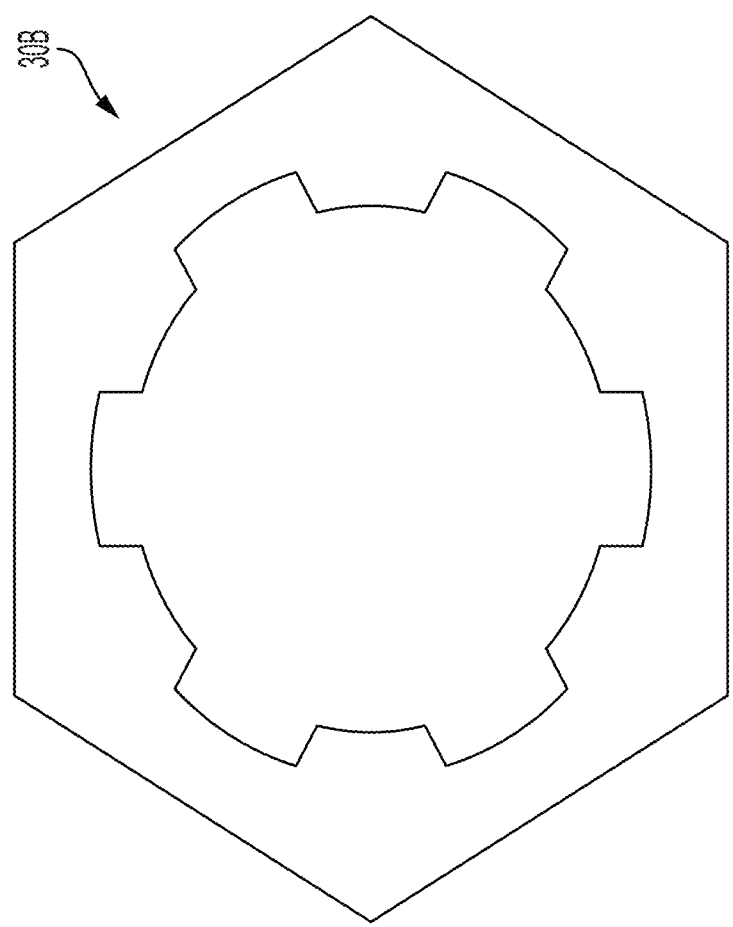
FIG. 76 is a rear view of the insert of FIG. 73.
Figure 77:
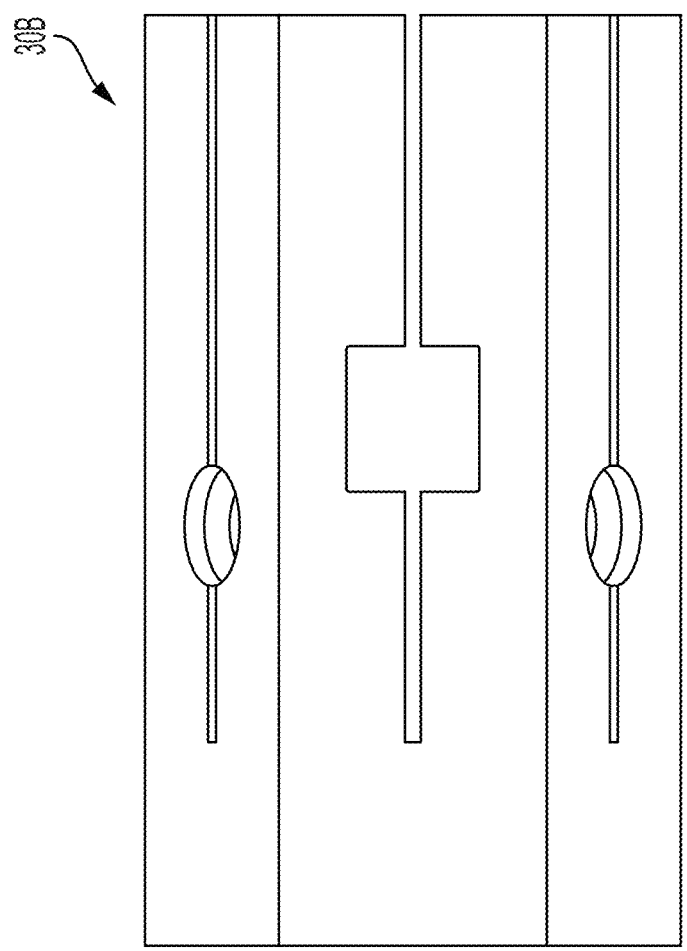
FIG. 77 is a top view of the insert of FIG. 73.
Figure 78:
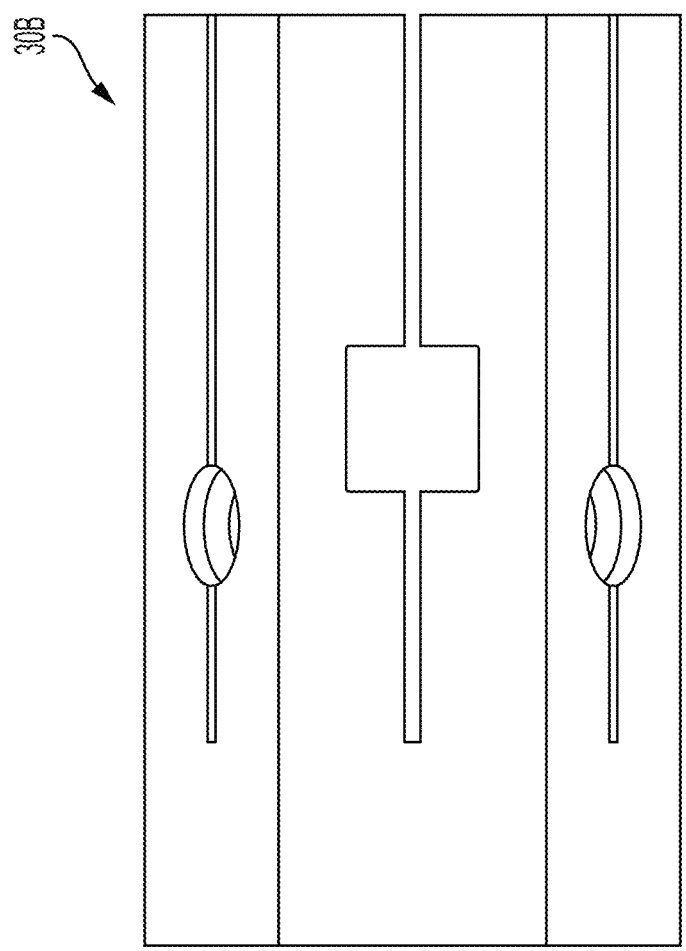
FIG. 78 is a bottom view of the insert of FIG. 73.
Figure 79:
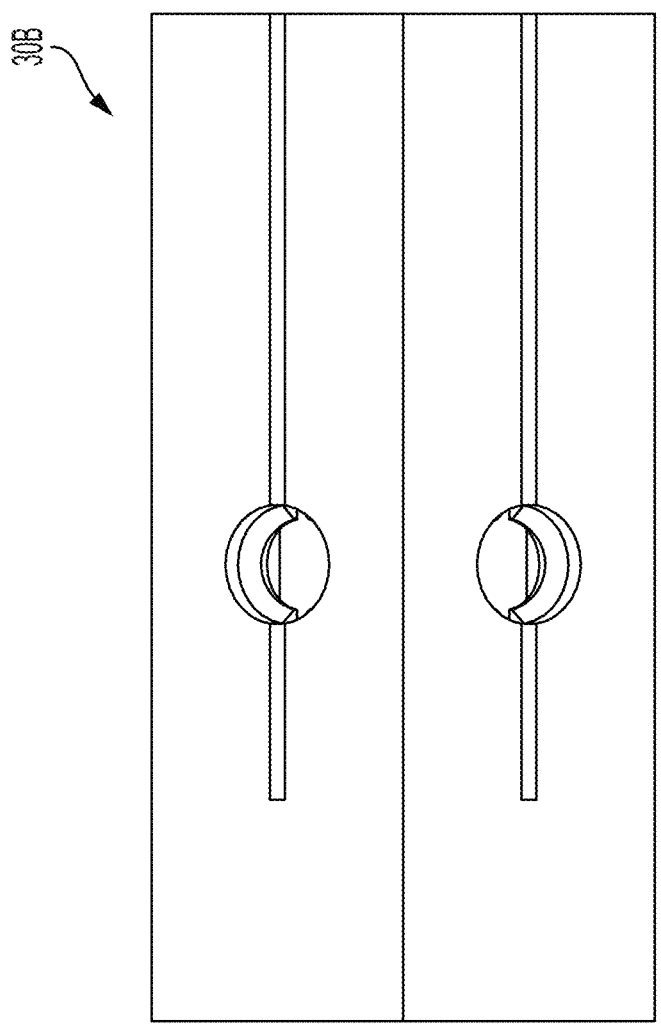
FIG. 79 is a side view of the insert of FIG. 73.
Figure 80:
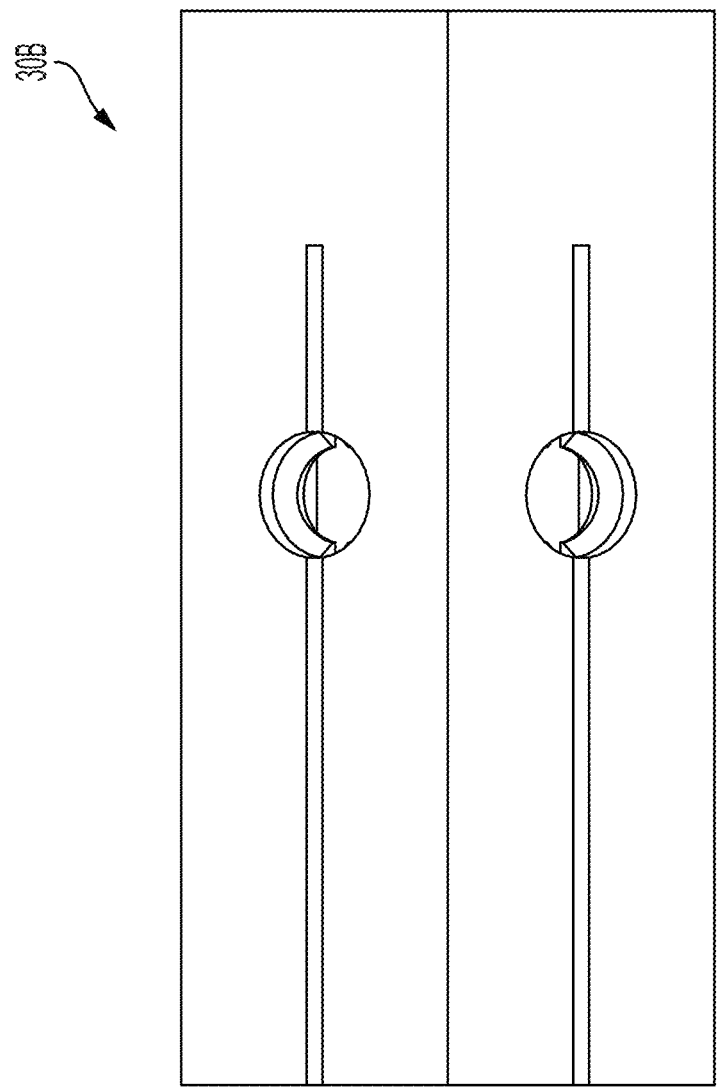
FIG. 80 is an opposite side view of the insert of FIG. 73.
Figure 81:
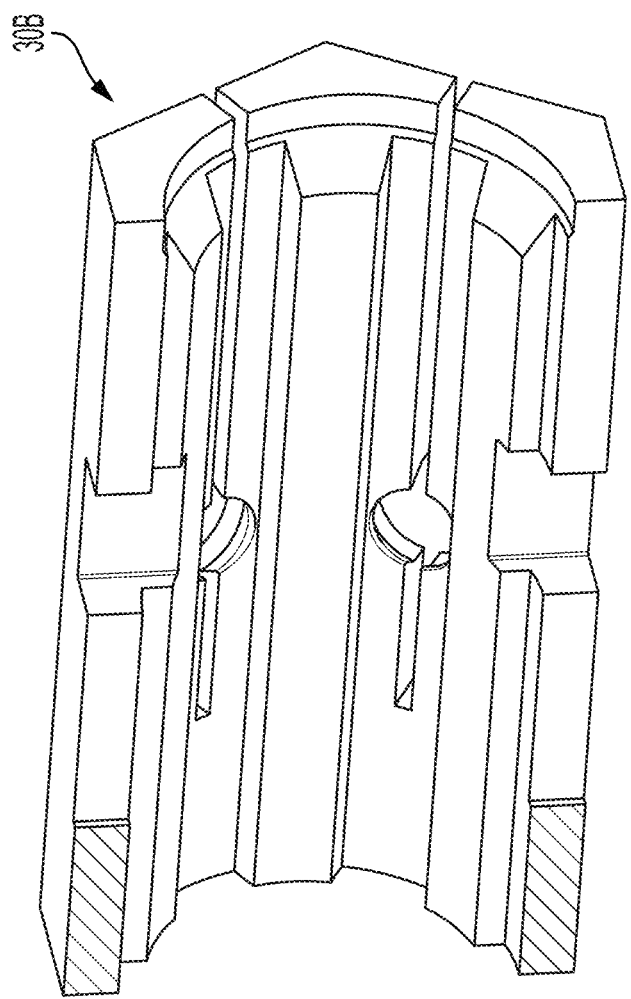
FIG. 81 is a cross-sectional view of the insert of FIG. 73.

The insert 30 has an outer surface 60 shaped and sized to mate with the hub bore 26. In the illustrated construction, the outer surface 60 of the insert 30, as best seen in FIGS. 23-24, has a hexagonal cross-section. The hub bore 26 (see FIG. 10) has a cross-section which is complementary to and provides a driving engagement with the outer surface 60 of the insert 30 (in the illustrated construction, also hexagonal).

Figure 5:
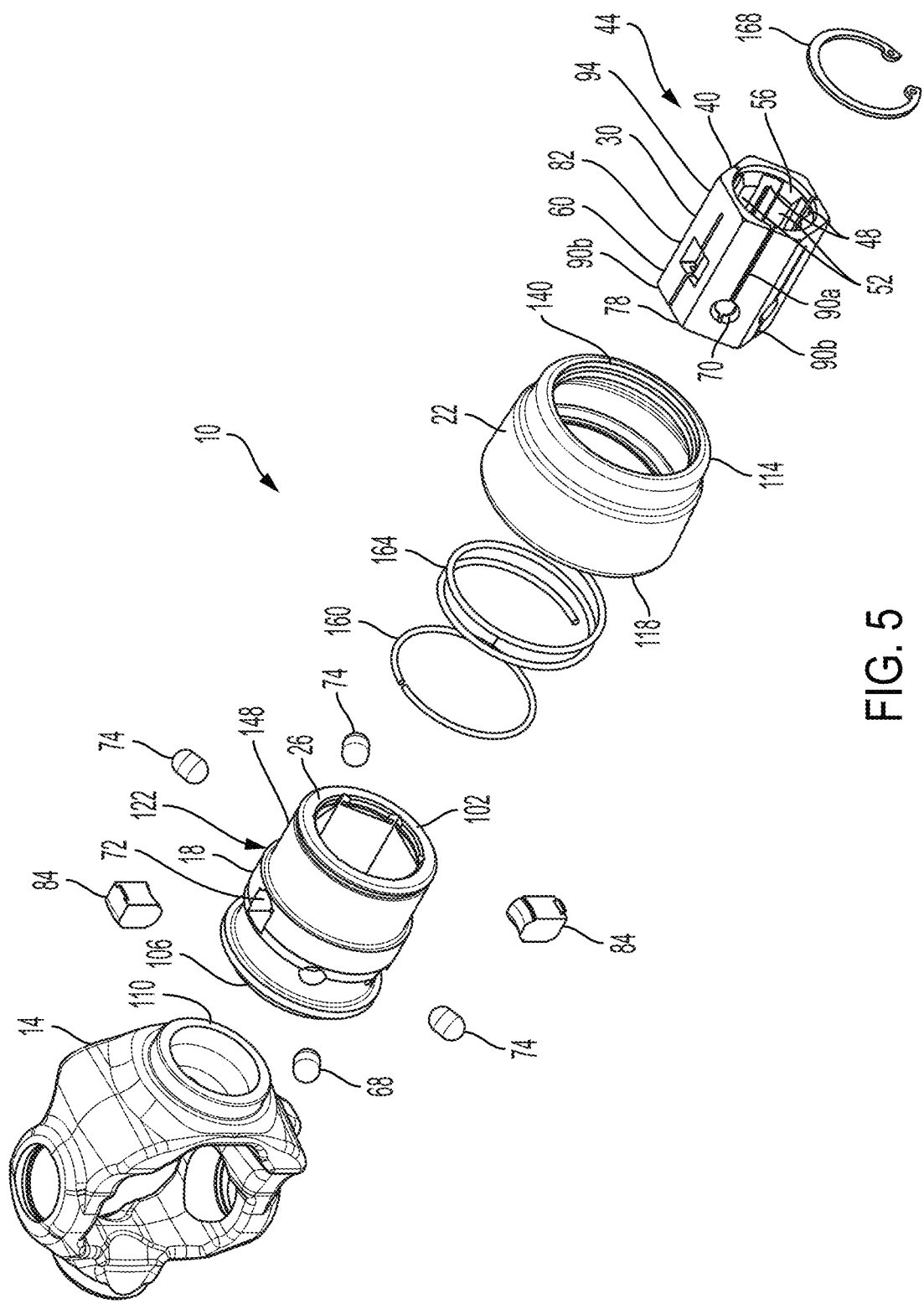
FIG. 5 is an exploded view of the yoke of FIG. 1.
Figure 6:
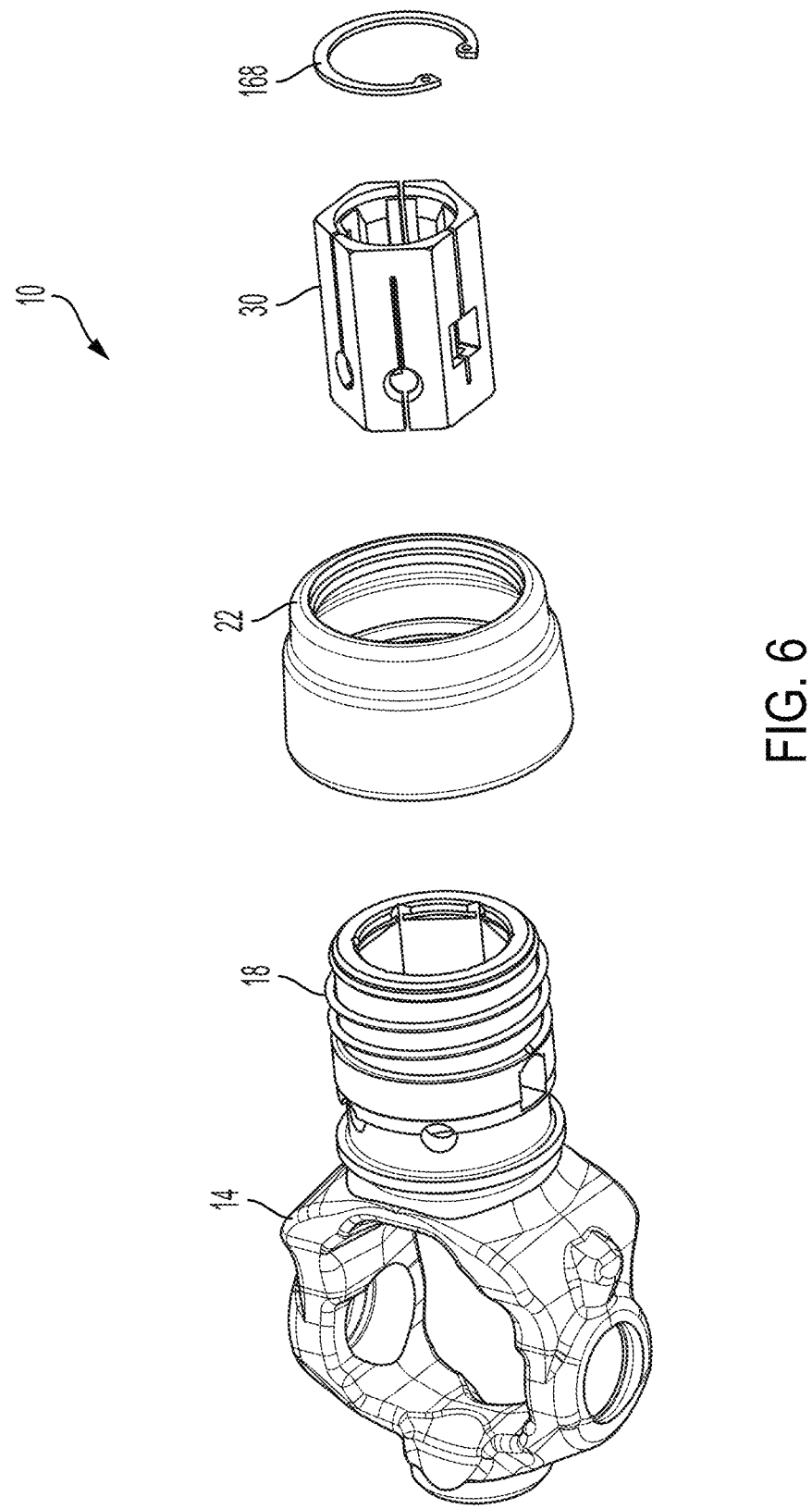
FIG. 6 is a partially exploded view of the yoke of FIG. 1.
Figure 7:
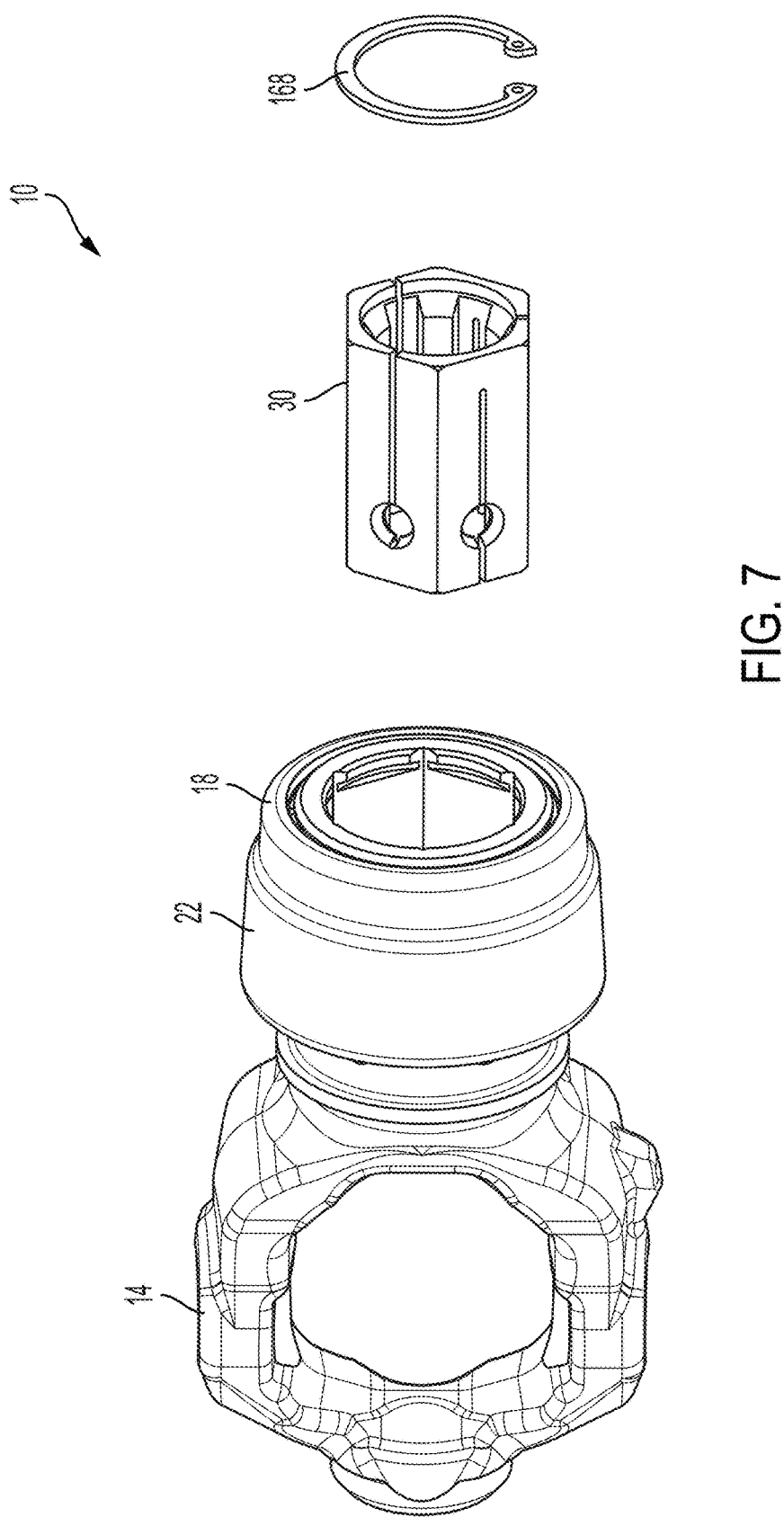
FIG. 7 is a front perspective view of the yoke of FIG. 1 with the insert and the retaining ring removed.
Figure 8:
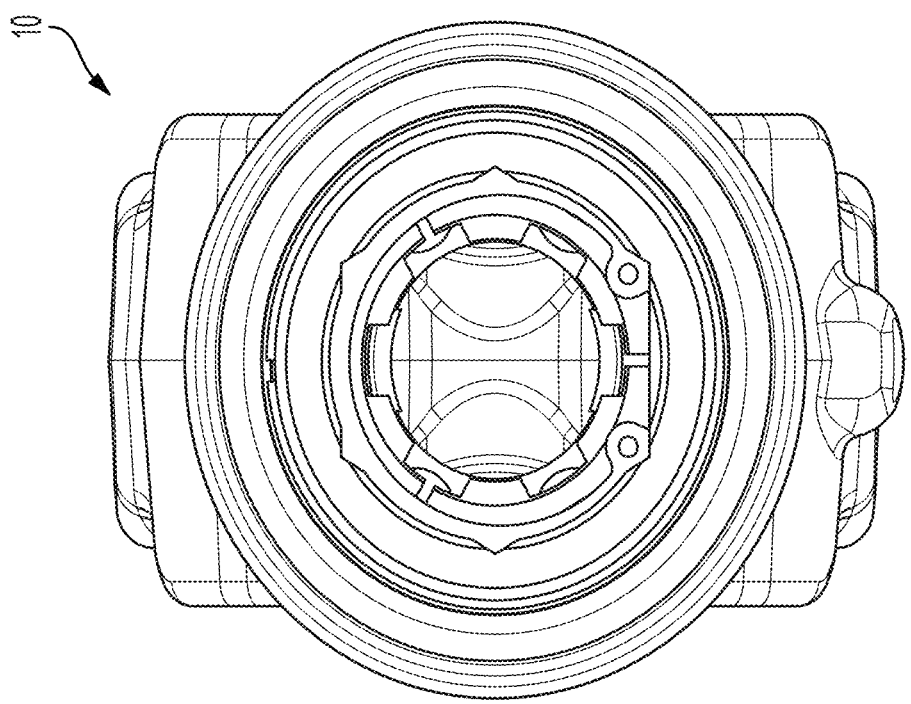
FIG. 8 is a front view of the yoke of FIG. 1.
Figure 9:
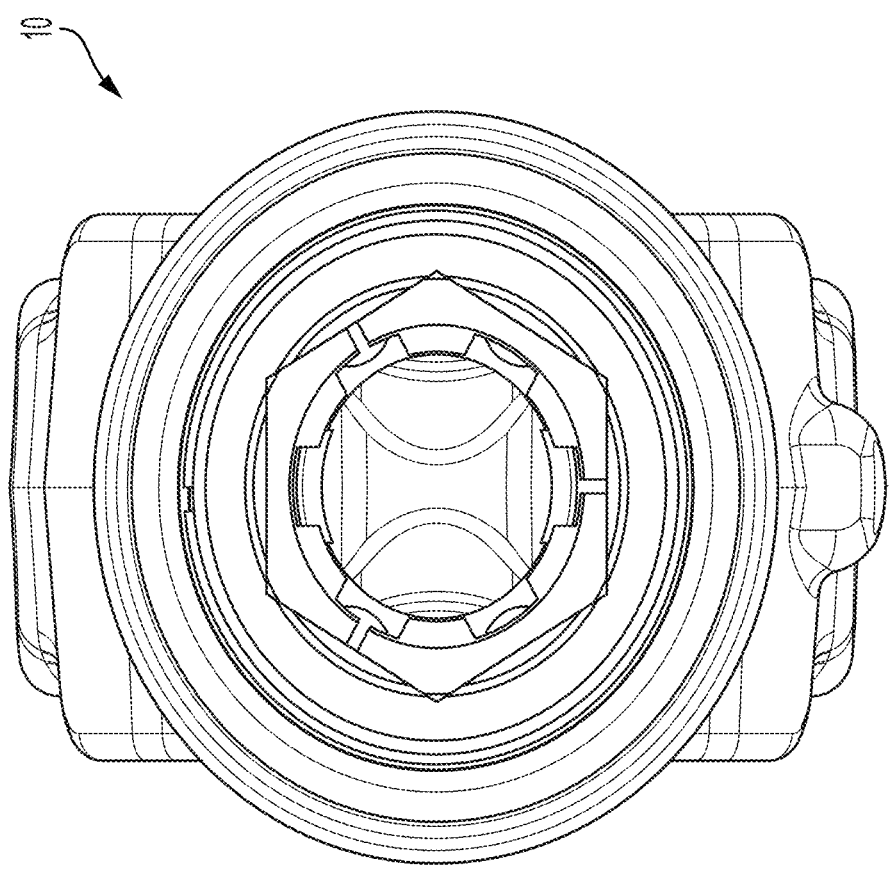
FIG. 9 is a front view of the yoke of FIG. 1 with the retaining ring removed.
Figure 10:
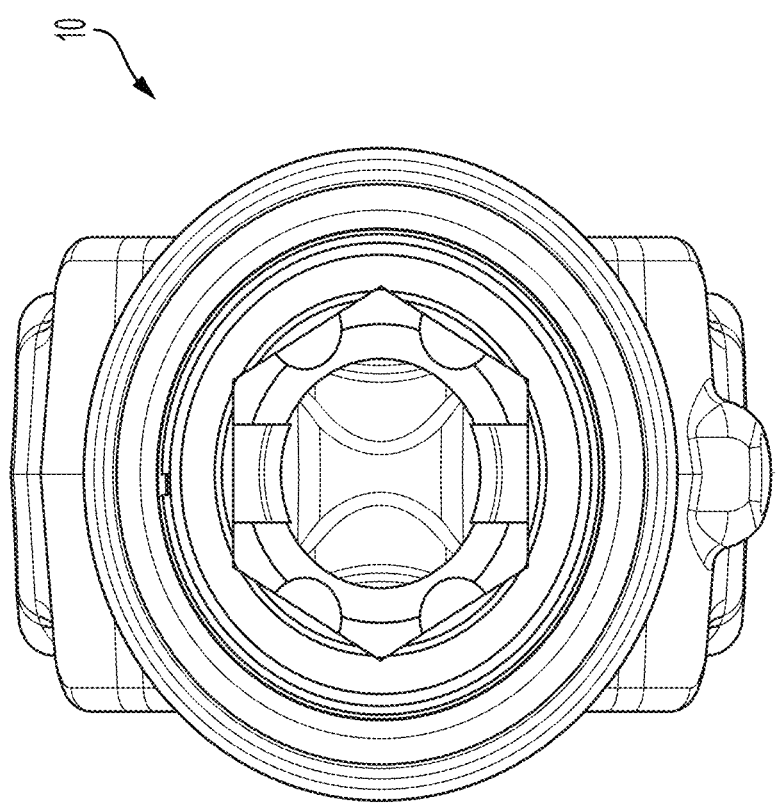
FIG. 10 is a front view of the yoke of FIG. 1 with the insert removed.
Figure 11:
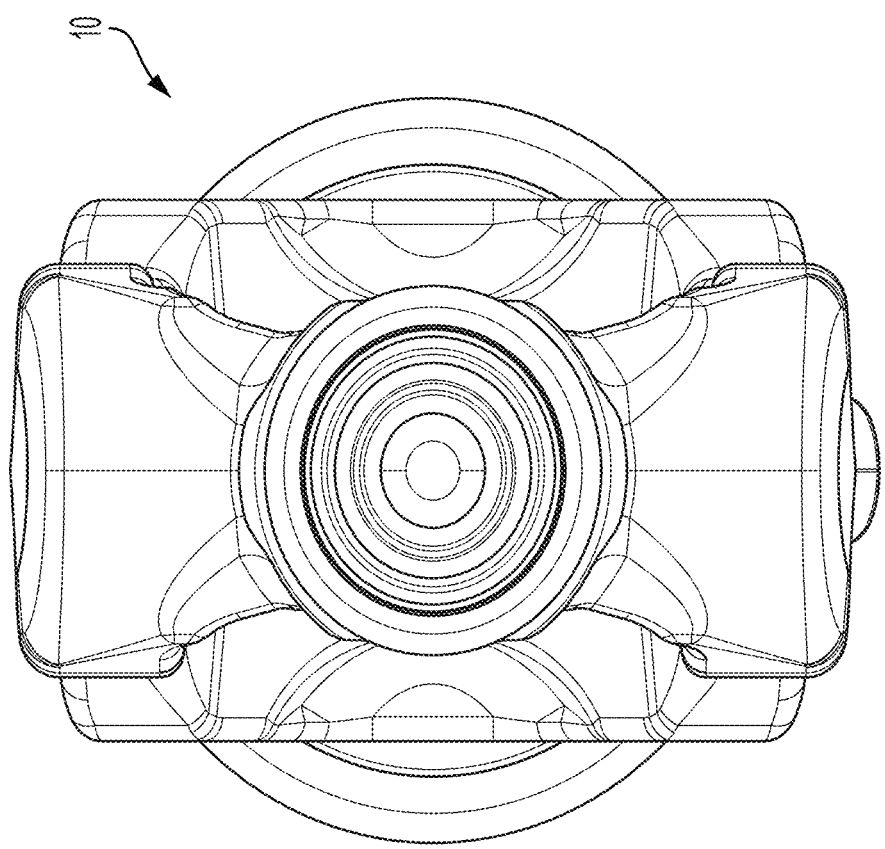
FIG. 11 is a rear view of the yoke of FIG. 1.
Figure 12:
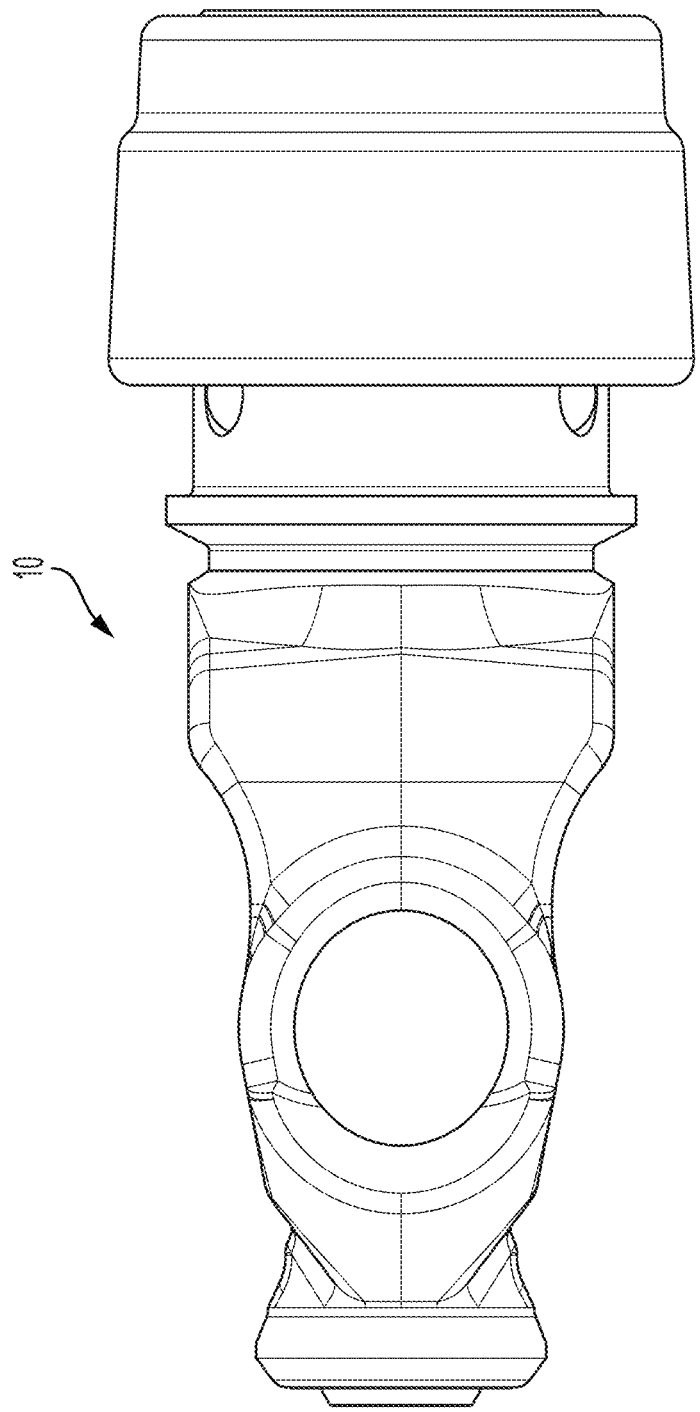
FIG. 12 is a top view of the yoke of FIG. 1.
Figure 13:
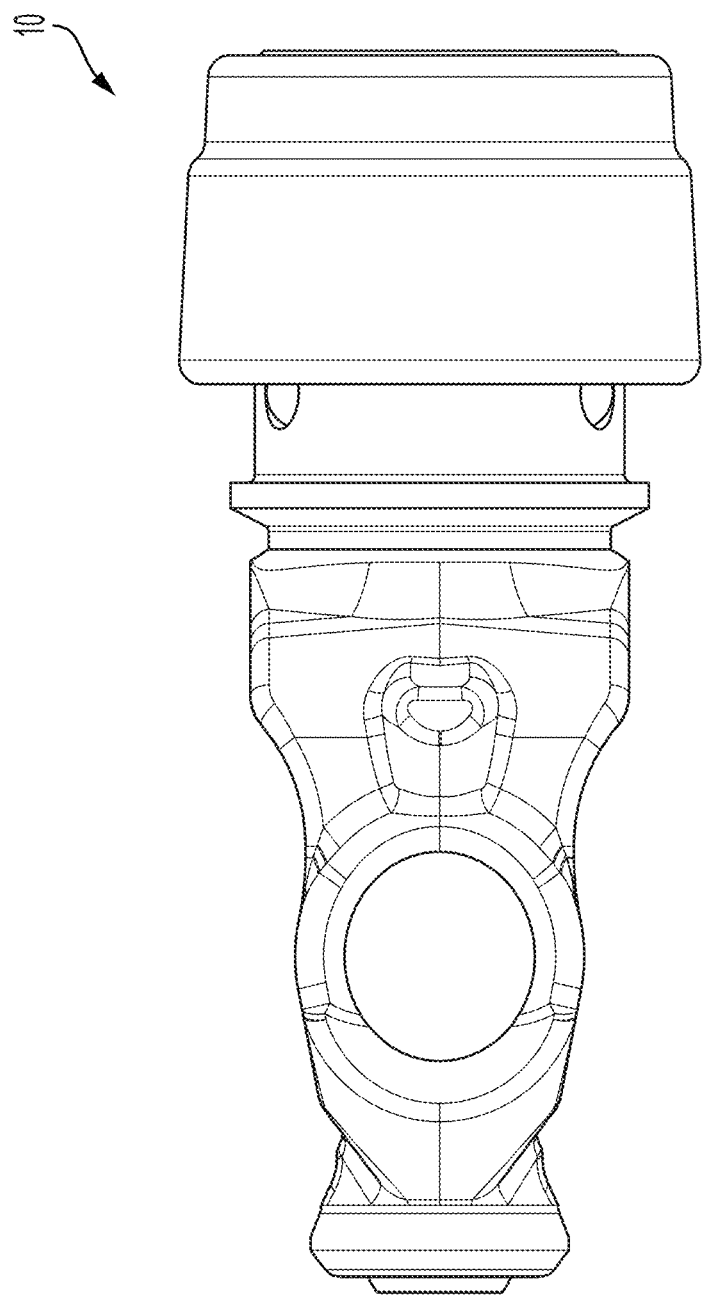
FIG. 13 is a bottom view of the yoke of FIG. 1.
Figure 14:
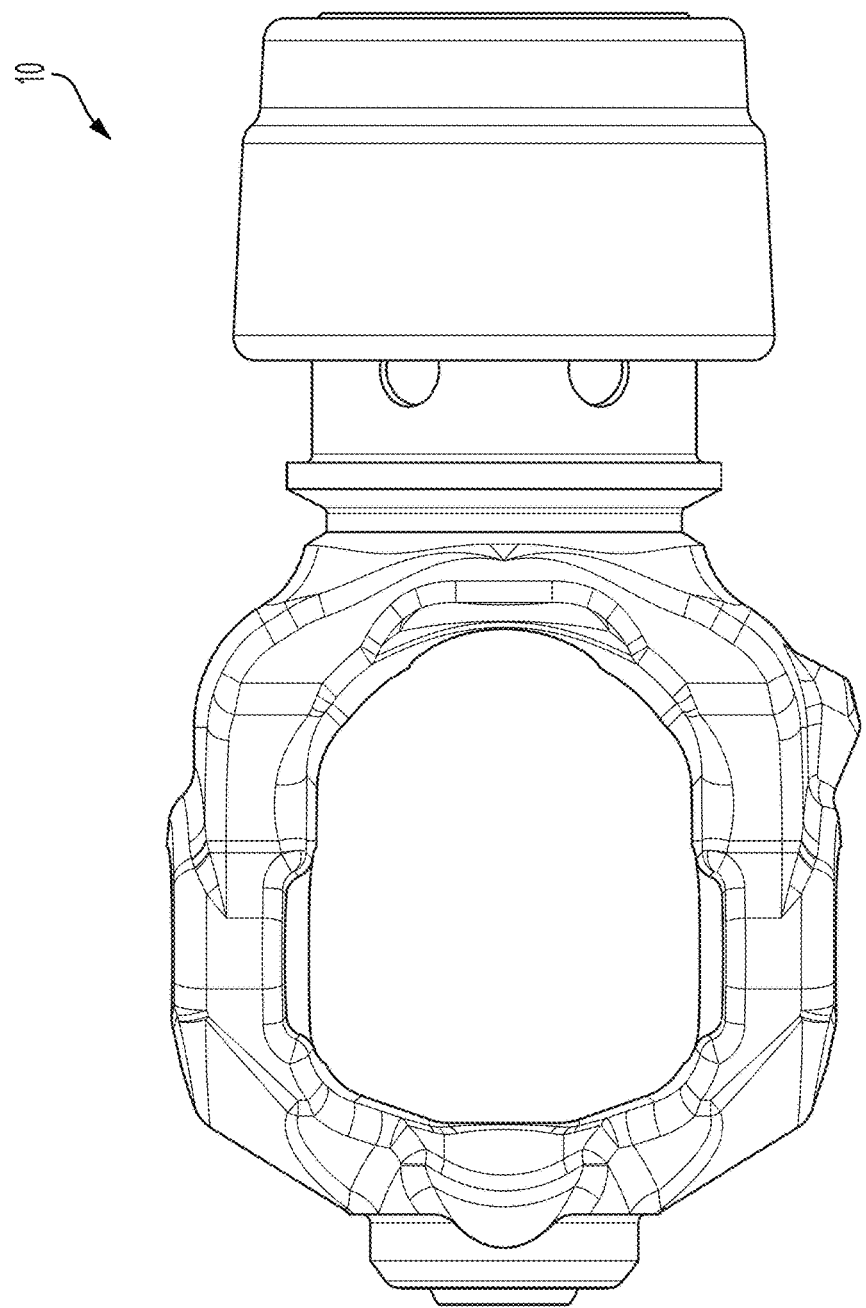
FIG. 14 is a side view of the yoke of FIG. 1.
Figure 15:
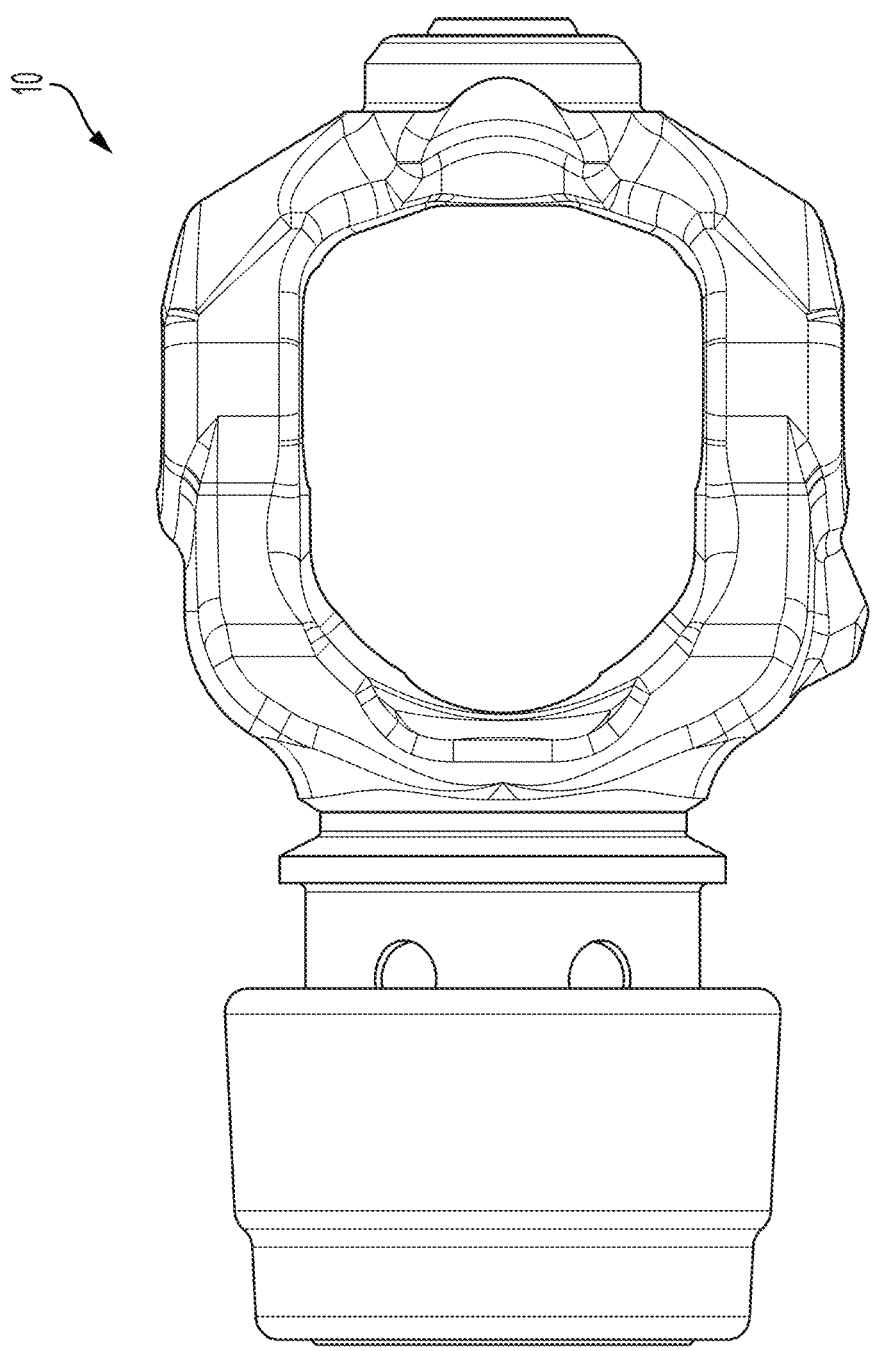
FIG. 15 is an opposite side view of the yoke of FIG. 1.

In the illustrated construction, a releasable insert retainer assembly is provided between the hub 18 and the insert 30. The insert 30 defines a number of retainer openings 70 extending from the outer surface 60 toward the inner surface 56 aligned with the openings 68 in the hub 18 when the insert 30 is supported in the hub 18. Each retainer opening 70 (and each associated hub opening 68) is shaped (e.g., round (as shown), rectangular, etc.) and sized to receive an insert retaining member 74 (e.g., a pin, a ball, etc.). In the illustrated construction, the insert retainer assembly includes four openings 70 and members 74. As shown in FIG. 5, the illustrated insert retainer members 74 are generally cylindrical with rounded ends.

Each retainer opening 70 has a reduced diameter at its radially inward end to prevent the retaining member 74 from extending too far into the bore 44 and/or from falling radially into the bore 44 (e.g., to limit or prevent interference with the shaft). In the illustrated construction, the insert retainer assembly is arranged proximate a rear end 78 of the insert 30 and along a center of the associated side of the insert 30.

The retaining members 74 extend through the hub openings 68 and partially into the insert openings 70 to releasably retain the insert 30 in the hub 18. As best shown in FIGS. 16-29, the retaining members 74 abut the inner surface 140 of the collar 22 proximate the rear end 118 of the collar 22.

In the illustrated construction, a shaft retainer assembly is provided between the hub 18 and the shaft. To accommodate the shaft retainer assembly, the insert 30 also defines a number of openings 82 aligned with the openings 72 in the hub 18 when the insert 30 is supported in the hub 18. Each opening 82 (and each associated hub opening 72) is, each shaped (e.g., round, rectangular (square (as shown)), etc.) and sized to receive a shaft retainer member (e.g., a pawl 84, a pin, a ball, etc.) such that the pawls 84 engage the shaft when the shaft is received in the bore 44 to limit relative movement. In the illustrated construction, the shaft retainer assembly includes two openings 82 and pawls 84.

The illustrated pawls 84 are generally rectangular with angled end surfaces to facilitate insertion and removal of the shaft. Each opening 82 allows movement of the associated pawl 84 during insertion and removal of the shaft. Each opening 82 is also arranged along a center of the associated side of the insert 30 and more toward the rear end 78 than the front end 40.

The pawls 84 engage the inner surface 140 of the collar 22 proximate the rear end 118. The pawls 84 further extend through the hub openings 72 and through the insert openings 82 into the insert bore 44. The ends of the pawls 84 extending into the insert bore 44 mate with a groove in the shaft when the shaft is received in the bore 44 to limit relative movement.

The hub 18 and the insert 30 cooperate to apply a clamping force to the shaft when torque is applied. The insert 30 further defines one or more slots 90 in the side wall 42 to allow movement of the side wall 42 (e.g., compression and expansion of the insert 30). The arrangement of the outer surface 60 of the insert 30 and the inner surface of the hub bore 26 causes compression of the insert 30 when torque is applied, and this compression causes the insert 30 to flex inwardly and apply a clamping force on the shaft.

In general, the outer surface 60 of the insert 30 and/or the inner surface of the hub bore 26 are configured to transmit torque and to provide an inwardly-directed force on the insert 30. In other words, the outer surface 60 of the insert 30 and/or the inner surface of the hub bore 26 have an orientation between a solely circumferential orientation and a solely radial orientation. When torque is applied, the arrangement provides both a torque-transmitting force vector and an inwardly-directed insert-compressing force vector. As mentioned above, in the illustrated construction, the outer surface 60 of the insert 30 and the hub bore 26 have a hexagonal shape, with each engaging surface portion providing both torque transmission and compression.

The clamping force to be applied and the torque to apply the clamping force may be adjusted by changing the engagement between the outer surface 60 of the insert 30 and the hub bore 26. For example, looking at FIGS. 9-10 and 23, increasing the angle (becoming closer to a radial orientation) at the interface between the outer surface 60 of the insert 30 and the hub bore 26 (e.g., proximate the vertex) increases the force vector for torque transmission while decreasing the inwardly-directed insert-compressing force vector. Thus, compared to the illustrated angles, more torque is required to provide a comparable compression of the insert 30, and the insert 30 may be "activated" (to apply a clamping force) relatively later, after reaching the higher torque level. Also, in this arrangement, for a given torque, compression of the insert 30 would be reduced, and less clamping force would be applied by the insert 30.

Meanwhile, decreasing the angle (becoming closer to a circumferential orientation) at the interface decreases the force vector for torque transmission while increasing the inwardly-directed insert-compressing force vector. Thus, compared to the illustrated angles, less torque is required to provide a comparable compression of the insert 30, and the insert 30 may be "activated" (to apply a clamping force) relatively earlier, after reaching the lower torque level. In this arrangement, for a given torque, compression of the insert 30 would be increased, and more clamping force would be applied by the insert 30.

Accordingly, the outer shape of the insert 30 may be initially selected for a desired clamping force/torque relationship. Compared to the illustrated hexagonal cross-section, a square cross-section would provide an increased angle and require more torque to activate the insert 30 while an octagonal cross-section would provide a decreased angle and require less torque to activate the insert 30. In still other constructions (not shown), the outer surface 60 of the insert 30 and/or the hub bore 26 may have a different shape (e.g., star-shaped, scallop-shaped, etc.) with convex portions, non-linear surfaces, etc.

In some constructions (not shown), the angle proximate the interface may change during operation. For example, the shape of the outer surface 60 of the insert 30 and/or the inner surface of the hub bore 26 may not be constant but may change along the interface. As torque is applied, the location where the force is being applied may change along this non-constant interface, and the clamping force/torque level for activation may change. In a specific example, the shape of the outer surface 60 of the insert 30 and/or the inner surface of the hub bore 26 may be arranged to provide early activation of the insert 30 (a shallow angle at the interface) and then to provide a constant clamping force as torque increases (a rising angle). In another example, the shape of the outer surface 60 of the insert 30 and/or the inner surface of the hub bore 26 may be arranged to provide delayed activation of the insert 30 (a steep angle at the interface) and then to provide a rapidly-increasing clamping force as torque increases (a decreasing angle).

In the illustrated construction, the slot(s) 90 extend from one end toward the other end of the insert 30. Each illustrated slot 90 is arranged along the center of the associated side of the insert 30 and through a center of an opening 70 or 82, where provided. A thickness 94 of material is provided at the base of each slot 90, and, in the illustrated construction, the base of each slot 90 is curved.

As illustrated, a number of slots 90*a* (e.g., three) extend from the front end 40 toward the rear end 78, and a number of slots 90*b* (e.g., three) extend from the rear end 78 toward the front end 40, such that, in the illustrated construction, as best shown in FIGS. 21-30, there are six such slots 90. With grooves 90*a*, 90*b* extending from each end 40, 78, the insert 30 is compressed and clamping force is applied to the shaft at each end of the insert 30. The illustrated slots 90*a*, 90*b* alternate circumferentially about the insert 30 which contributes to centering of the shaft in the insert 30.

In other constructions (not shown), the insert 30 can define different numbers of slots 90, including more or fewer than the six slots 90 as illustrated. The slot(s) 90 may be in different locations on the insert 30. For example, in FIGS. 73-82, the slots 90B extend only from one end 40B. As other examples, the slot(s) 90 may not be along the center of the side of the insert 30, may not extend through an end 40, 78 of the insert 30 (be located intermediate the ends 40, 78), etc. The slot(s) 90 may have a different orientation on the insert 30 (e.g., not aligned with the axis of the insert (skewed; not shown), non-linear (curved; not shown), combinations, etc.), shape (e.g., the base of each slot 90 may be square (see FIGS. 73-82)), the slot(s) 90 may have non-parallel walls, etc.), etc.

The flexibility of the insert 30, which may affect the clamping force applied, the torque to apply the clamping force, etc., may be adjusted. For example, the thickness 94 of material can be increased to reduce the flexibility or decreased to increase the flexibility. The thickness of the wall 42 of the insert 30 can similarly be adjusted to increase or decrease the flexibility of the insert 30. Material(s) of the insert 30 may also be selected to provide a desired flexibility/range.

To assemble the yoke 10, the rear end 118 of the hub 18 is coupled to the front end 110 of the yoke 14. The pawls 84 and the retaining members 74 are inserted into the respective openings 68, 72 in the hub 18. The spring 164 is placed about the outer surface of the hub 18 and is compressed towards the rear end 106 of the hub 18. The collar 22 is placed about the outer surface 122 of the hub 18, and, with the spring 164 under compression, the snap ring 160 can be placed in the circumferential groove 148. The spring 164 can then be uncompressed, as the snap ring 160 will hold the front end 114 of the collar 22 in place against the force of the spring 164. The collar 22 radially retains both the pawls 84 and the retaining members 74 within the yoke 10.

To place the insert 30 into the hub 18, the collar 22 is pushed back toward the rear end 106 of the hub 18, allowing the pawls 84 and the retaining members 74 to move radially outwardly and into the pocket 144. The insert 30 is then slip fit into the hub 18, with the insert pawl openings 82 aligned with the hub pawl openings 72 and the insert retaining member openings 70 aligned with the hub retaining member openings 72.

The retaining ring 168 is compressed and inserted into the hub 18 to abut the front end 40 of the insert 30 and to cooperate with the retaining members 74 to retain the insert 30 in the hub 18. The collar 22 is released and moves forward under the force of the spring 164 until engaging the snap ring 160. With assembly of the yoke 10 complete, the retaining members 74 axially retain the insert 30 in the hub 18.

In use, the shaft is inserted into the bore 44 of the insert 30 with a slip fit, with the splines of the shaft within the insert grooves 48 and the splines 52 of the insert 30 between the shaft splines. The pawls 84 move into a circumferential groove in the shaft and shaft splines to axially retain the shaft in the hub 18. The pawls 84 also cooperate to retain the insert 30 in the hub 18.

During operation, a driving force is applied to the motion-transmitting mechanism (e.g., the shaft is driven by an external means (not shown, e.g., a tractor)). The splines of the shaft engage the splines 52 of the insert 30 to transmit torque on the insert 30. The outer surface 60 of the insert 30 engages the hub bore 26. Through engagement of the outer surface 60 of the insert 30 and the hub bore 26, torque is transmitted to the hub 18 and therethrough to the yoke 14 and to any implement (not shown) coupled to the yoke 14.

As discussed above, as torque is applied, the engaging surface portions of the outer surface 60 of the insert 30 and the hub bore 26 provide both torque transmission and compression. The insert 30 is "activated"—compressed and flexes to apply a clamping force to the shaft. As also discussed above, the clamping force applied and the torque for activation of the insert 30 is related to the shape of the interface between the outer surface 60 of the insert 30 and the hub bore 26 as well as the arrangement of the slot(s) 90.

To remove the shaft, rotation of the shaft is first stopped. Ceasing rotation of the shaft and transmission of torque removes the clamping force exerted on the shaft by the insert 30. The collar 22 is retracted to allow the pawls 84 to move outwardly and the shaft to be removed.

To remove the insert 30, the retaining ring 168 is removed. The collar 22 is retracted to allow the pawls 84 and the retaining members 74 to move outwardly from the respective openings 70, 82 in the insert 30. The insert 30 can then be removed. The insert 30 or a new insert (not shown) can be replaced as described above. The new insert may be provided to replace a worn insert 30 or to provide an insert having a different configuration (e.g., different splines (number, shape), grooves, dimensions, material(s), etc.).

FIGS. 31-60 illustrate an alternative embodiment of a collet locking yoke 10A. The yoke 10A and its components are similar to the yoke 10 and components shown in FIGS. 1-30 and described above. Common components have the same reference number "A." The yoke 10A is assembled and operated in a similar fashion as the yoke 10.

The yoke 10A is a larger version of a constant velocity yoke compared to the yoke 10 which is a middle size constant velocity yoke. As illustrated, the insert 30A has (see FIGS. 48 and 51-54) a flat surface at the rear end 78A and (see FIGS. 46-47 and 51-54) an increased taper of the edges at the front end 40A, compared to the insert 30.

FIGS. 61-82 illustrate another alternative embodiment of a collet locking yoke 10B. The yoke 10B and its components are similar to the yoke 10, 10A, and components shown in FIGS. 1-30 and 31-60, respectively, and described above. Common components have the same reference number "B." The yoke 10B is assembled and operated in a similar fashion as the yoke 10, 10A.

The yoke 10B is a large standard yoke and includes an integral yoke 14B and hub 18B. The insert 30B defines only slots 90B extending from one end (e.g., the front end 40B) toward the other end (e.g., the rear end 78). This arrangement of the slots 90B provides clamping force on the shaft proximate the one end (e.g., the front end 40) during torque transmission. The base of the illustrated slots 90B is square.

In the illustrated constructions, the inserts 30, 30A, 30B are formed of steel. The illustrated hexagonal inserts 30, 30A, 30B may be formed from commonly-available steel hex bar stock by machining, forging, etc., to provide the illustrated structure (e.g., the bore 44 (with the grooves 48 and the splines 52), the openings 70, 82, the slot(s) 90). In other constructions, the inserts 30, 30A, 30B may be formed of other suitable materials, such as powdered metal, and in an appropriate process (e.g., forging, investment casting, extrusion, etc.) to provide the illustrated structure.

In the yokes 10, 10A, 10B, clamping of the insert 30, 30A, 30B on the shaft during rotation of the shaft and torque transmission reduces or eliminates vibrations during operation. In other words, play between the insert 30, 30A, 30B and the shaft (beneficial for insertion and removal of the shaft) is reduced when torque is transmitted.

In some constructions, rotation of the shaft at "no load" is sufficient to cause the insert 30, 30A, 30B to compress and apply a clamping force on the shaft sufficient to eliminate vibration, play, etc.

The six spline shaft with which the insert 30, 30A, 30B mates is designed to operate at 540 revolutions per minute (RPM). At higher speeds (e.g., 1,000 RPM), however, vibrations may be experienced. Such vibrations can cause unease to the operator, who may believe the machine is worn or starting to fail, discomfort, etc. Further, vibrations may lead to wear and eventual failure of the shaft and/or components of the yoke 10, 10A, 10B.

With the illustrated slots 90, 90A, 90B spaced about the circumference of the insert 30, 30A, 30B compression of and the clamping force exerted on the shaft by the insert 30, 30A, 30B contributes to centering of the shaft in the insert 30, 30A, 30B and the hub 18, 18A, 18B. Centering the shaft provides smoother operation of the shaft and the yoke 10, 10A, 10B.

This centering of the shaft may be especially useful in a straight sided "type 1" tractor PTO shaft (see, e.g., International Standards Organization (ISO) 500 for agricultural tractors), which is not self-centering, but may also be beneficial for self-centering shafts with involute or curved splines. Further, as discussed above, ceasing rotation of the shaft and torque transmission eliminates the clamping force on the shaft and allows the shaft to be easily removed, as needed.

By using the yokes 10, 10A, 10B and the inserts 30, 30A, 30B shown above, a shaft designed to rotate at one speed (e.g., at 540 RPM) can be operated a higher speed (e.g., at 1,000 RPM or higher) without increased vibration or different components. This ability to increase the operating speed of the shaft without using a different shaft and/or yoke may meet a growing market need. For example, in many PTO systems, the type 1 shaft has to be replaced with a "type 2" or "type 3" shaft for applications at speeds higher (e.g., 1,000 RPM) than the type 1 shaft was designed (540 RPM).

Further, even higher RPMs could be accommodated by use of the yokes 10, 10A, 10B, and the inserts 30, 30A, 30B described above. For example, new, larger and heavier drive shafts (e.g., shafts designed to run at 1540 RPM) are becoming more prominent. These heavier shafts and the associated yokes are even more sensitive to vibration than lighter shafts/yokes and may benefit even further from mating with vibration-reducing, shaft-centering yokes 10, 10A, 10B and inserts 30, 30A, 30B as described above.

In other constructions (not shown), an insert may have a different construction (e.g., a different shaft interface (not shown) to mate with a different shaft, formed of different material(s), etc.) while still being usable with the yoke 10 and insertable into the hub bore 26. For example, such an alternative insert may have an interface configured to receive a twenty-one splined shaft. In such a construction, the twenty-one spline insert may have an outer surface similar to the six spline insert 30 and/or complementary to the shape of/able to be in driving engagement with the hub bore 26.

Independent of the compressible, clamping features, the arrangement of a removable/replaceable insert 30, 30A, 30B in the hub bore 26, 26A, 26B of the yoke 10, 10A, 10B may provide a modular arrangement such that a given yoke 10, 10A, 10B may be used with machines having different shafts (e.g., type 1, 2, 3, etc.). This arrangement may also independently provide replacement of the insert 30, 30A, 30B, as needed, due to wear, failure, etc., for example, of the shaft interface in the insert bore 44.

One or more independent features and/or independent advantages of the invention may be set forth in the following claims:

What is claimed is:

1. An insert for a motion-transmitting mechanism, the motion-transmitting mechanism including a motion-transmitting member defining a bore with a bore surface, and a shaft, the insert comprising:

an insert body receivable in the bore, the insert body having an outer surface at least partially engageable in a driving relationship with the bore surface, the insert body defining an insert bore operable to receive the shaft in a driving relationship, the insert body having a polygonal cross-section with adjacent wall sections, each of the wall sections intersecting each adjacent wall section at an obtuse angle, the insert body defining a first slot and a second slot extending between the outer surface and the insert bore, the first slot being circumferentially spaced from the second slot, each slot accommodating compression of the insert body, torque transmission between the shaft and the motion-transmitting member through the insert body causing a portion of the insert body to compress toward the shaft.

2. The insert of claim 1, wherein the insert bore extends along an axis, and wherein each slot extends along the axis.

3. The insert of claim 2, wherein the insert body has an axial first end and an opposite second end, the first slot extending from the first end toward the second end.

4. The insert of claim 3, wherein the second slot extends from the second end toward the first end.

5. The insert of claim 1, wherein the first slot is circumferentially-centered on a first of the wall sections.

6. The insert of claim 1, wherein one of the side wall sections defines an opening extending from the outer surface toward the insert bore, the opening being operable to receive a retainer member of a retainer assembly.

7. The insert of claim 6, wherein the first slot extends through the opening.

8. The insert of claim 1, wherein the insert body has a hexagonal cross-section.

9. The insert of claim 1, wherein each wall section defines a slot.

10. An insert for a motion-transmitting mechanism, the motion-transmitting mechanism including a motion-transmitting member defining a bore with a bore surface, and a shaft, the insert comprising:
an insert body receivable in the bore, the insert body having an outer surface at least partially engageable in a driving relationship with the bore surface, the insert body defining an insert bore operable to receive the shaft in a driving relationship, torque transmission between the shaft and the motion-transmitting member through the insert body causing a portion of the insert body to compress toward the shaft;
wherein the insert body has a side wall defining a slot between the outer surface and the insert bore, the slot accommodating compression of the insert body;
wherein the side wall has a hexagonal cross-section with adjacent wall sections, each wall section defining a slot.

11. A motion-transmitting mechanism comprising:
a yoke;
a hub supported by the yoke, the hub providing a motion-transmitting member defining a bore with a bore surface;
a shaft having an outer shaft surface; and
an insert including an insert body receivable in the bore, the insert body having an outer surface and defining an insert bore having an insert bore surface and operable to receive the shaft, the insert body having a polygonal cross-section with adjacent wall sections, the insert body defining a first slot and a second slot extending between the outer surface and the insert bore, the first slot being circumferentially spaced from the second slot, engagement between the bore surface and the outer surface providing torque transmission between the insert and the motion-transmitting member and causing a portion of the insert body to compress toward the shaft which causes the insert bore surface to directly engage and apply a clamping force to the outer shaft surface, each slot accommodating said compression of the insert body.

12. The mechanism of claim 11, wherein the shaft includes a power take off shaft.

13. The mechanism of claim 11, wherein the insert bore extends along an axis, wherein the insert body has a side wall defining the slot between the outer surface and the insert bore and extending along the axis.

14. The mechanism of claim 13, wherein the insert body has an axial first end and an opposite second end, the slot extending from the first end toward the second end.

15. The mechanism of claim 14, wherein the slot is a first slot, and wherein the side wall defines a second slot between the outer surface and the insert bore, the second slot being circumferentially spaced from the first slot.

16. The mechanism of claim 15, wherein the second slot extends from the second end toward the first end.

17. The mechanism of claim 13, further comprising a retainer assembly including
an opening defined by the side wall and extending from the outer surface toward the insert bore, the slot extending through the opening, and
a retainer member supported by the motion-transmitting member and extending into the opening.

18. The mechanism of claim 11, wherein the outer surface has a non-circumferential and non-radial orientation, and wherein the bore surface has a complementary orientation.

19. The mechanism of claim 13, wherein the side wall has a hexagonal cross-section with adjacent wall sections, each wall section defining a slot, and wherein the bore surface has a hexagonal cross-section.

20. A method of operating a motion-transmitting mechanism, the motion-transmitting mechanism including a yoke, a hub supported by the yoke, the hub providing a motion-transmitting member defining a bore with a bore surface, a power take off shaft having an outer shaft surface, and an insert, the insert having an insert body received in the bore, the insert body having an outer surface and defining an insert bore for receiving the shaft, the insert bore having an insert bore surface, the insert body having a polygonal cross-section with adjacent wall sections, the insert body defining a first slot and a second slot extending between the outer surface and the insert bore, the first slot being circumferentially spaced from the second slot, the method comprising:
transmitting torque between the shaft and the hub, transmitting including engaging the bore surface and the outer surface to transmit torque between the insert and the motion-transmitting member; and
by torque transmitted between the insert and the hub, causing a portion of the insert body to compress toward the shaft such that the insert bore surface directly engages and applies a clamping force to the outer shaft surface, each slot accommodating said compression of the insert body.

* * * * *